United States Patent
Kimura et al.

(10) Patent No.: US 12,487,192 B2
(45) Date of Patent: Dec. 2, 2025

(54) IMAGING DEVICE AND IMAGING METHOD

(71) Applicant: K-theory Inc., Hyogo (JP)

(72) Inventors: Kenjiro Kimura, Hyogo (JP); Noriaki Kimura, Hyogo (JP); Fumitoshi Kimura, Hyogo (JP)

(73) Assignee: K-THEORY INC., Hyogo (JP)

( * ) Notice: Subject to any disclaimer, the term of this patent is extended or adjusted under 35 U.S.C. 154(b) by 40 days.

(21) Appl. No.: 18/568,490

(22) PCT Filed: Jun. 14, 2022

(86) PCT No.: PCT/JP2022/023828
§ 371 (c)(1),
(2) Date: Dec. 8, 2023

(87) PCT Pub. No.: WO2022/265017
PCT Pub. Date: Dec. 22, 2022

(65) Prior Publication Data
US 2024/0295506 A1    Sep. 5, 2024

(30) Foreign Application Priority Data
Jun. 17, 2021 (JP) ................. 2021-100909

(51) Int. Cl.
*G01N 22/00* (2006.01)
*A61B 5/0507* (2021.01)
(Continued)

(52) U.S. Cl.
CPC ........... *G01N 22/00* (2013.01); *A61B 5/0507* (2013.01); *G03B 42/00* (2013.01);
(Continued)

(58) Field of Classification Search
CPC .... G01N 22/00; G01N 21/4795; G01N 22/02; G01N 21/3581; G03B 42/00; G01S 13/89; A61B 5/0507; G06F 17/10
(Continued)

(56) References Cited

U.S. PATENT DOCUMENTS

| | | | |
|---|---|---|---|
| 4,805,627 A | 2/1989 | Klingenbeck et al. | |
| 2012/0162002 A1* | 6/2012 | Semenov | A61B 5/053 342/22 |

(Continued)

FOREIGN PATENT DOCUMENTS

| | | |
|---|---|---|
| JP | 62-66145 | 3/1987 |
| WO | 2014/125815 | 8/2014 |

(Continued)

OTHER PUBLICATIONS

International Search Report issued Jul. 26, 2022 in International (PCT) Application No. PCT/JP2022/023828.

*Primary Examiner* — Raul J Rios Russo
(74) *Attorney, Agent, or Firm* — Wenderoth, Lind & Ponack, L.L.P.

(57) ABSTRACT

An imaging device includes a transmitter row of transmitters that are aligned in a straight line and transmit a wave to a region, a receiver row of receivers provided at an interval from the transmitter row and alighted in a straight line parallel to the line of transmitters, and receiving the wave from the region, and an information processing circuit that derives an imaging function based on measurement data and a distance and using the imaging function to image the structure of a scatterer included in an object present in the region, the imaging function corresponding to a scattering field function relating to scattering of the wave, the measurement data being obtained by all or some combinations of the transmitters and the receivers, the distance being a
(Continued)

distance between the straight line along which the transmitters are aligned and the different straight line along which the receivers are aligned.

21 Claims, 14 Drawing Sheets

(51) Int. Cl.
    *G01N 21/3581*     (2014.01)
    *G01N 21/47*     (2006.01)
    *G01N 22/02*     (2006.01)
    *G03B 42/00*     (2021.01)

(52) U.S. Cl.
    CPC ..... *G01N 21/3581* (2013.01); *G01N 21/4795* (2013.01); *G01N 22/02* (2013.01)

(58) Field of Classification Search
    USPC .......................................................... 324/637
    See application file for complete search history.

(56) References Cited

U.S. PATENT DOCUMENTS

| | | |
|---|---|---|
| 2015/0377778 A1 | 12/2015 | Kimura et al. |
| 2016/0139258 A1* | 5/2016 | Vellas ............... G01S 7/06 |
| | | 342/52 |
| 2016/0377557 A1 | 12/2016 | Kimura et al. |
| 2020/0003709 A1* | 1/2020 | Wang ............... H01J 37/28 |
| 2022/0268711 A1 | 8/2022 | Kimura et al. |
| 2022/0319067 A1 | 10/2022 | Kimura et al. |

FOREIGN PATENT DOCUMENTS

| | | |
|---|---|---|
| WO | 2015/136936 | 9/2015 |
| WO | 2021/020387 | 2/2021 |
| WO | 2021/053971 | 3/2021 |

\* cited by examiner

IMAGING DEVICE AND IMAGING METHOD

TECHNICAL FIELD

The present disclosure relates to an imaging device or the like for imaging the structure of a scatterer included in an object that is present in a region by using waves.

BACKGROUND ART

As techniques related to an imaging device or the like for imaging the structure of a scatterer included in an object that is present in a region by using waves, there are techniques described in Patent Literatures (PTLs) 1 to 5.

For example, according to the technique described in PTL 1, beams sent out from a microwave sender are incident on an object to be inspected, and the amplitudes and phases of scattered beams are detected by a microwave detector. Then, the distribution of dielectric constants is calculated from output signals output from the microwave detector to display a tomogram of the object to be inspected.

CITATION LIST

Patent Literature

[PTL 1] Japanese Unexamined Patent Application Publication No. S62-66145
[PTL 2] International Publication No. WO2014/125815
[PTL 3] International Publication No. WO2015/136936
[PTL 4] International Publication No. WO2021/020387
[PTL 5] International Publication No. WO2021/053971

SUMMARY OF INVENTION

Technical Problem

However, it is not easy to image the structure of a scatterer included in an object that is present in a region by using waves. Specifically, obtaining data on scattered waves radiated from a region in relation to waves that are incident on the region when the condition in the region is known is called a forward problem and easy. On the other hand, obtaining the condition in a region when data on scattered waves is known is called an inverse problem and not easy.

Moreover, a variety of measurement data is obtained depending on, for example, different arrangements of transmitting elements and receiving elements. This is assumed to increase the spatial resolution for imaging the structure of a scatterer. On the other hand, different arrangements of transmitting elements and receiving elements complicates computational processing and increase processing delays. Thus, it is difficult to increase the spatial resolution for imaging the structure of a scatterer.

In view of this, the present disclosure provides an imaging device or the like that is capable of imaging the structure of a scatterer included in an object that is present in a region by using a wave and increasing the spatial resolution for imaging the structure of the scatterer while avoiding complication of computational processing.

Solution to Problem

An imaging device according to one aspect of the present disclosure includes a transmitter row including a plurality of transmitters that are aligned in a straight line and that transmit a wave to a region to be measured, a receiver row including a plurality of receivers and provided at an interval from the transmitter row, the plurality of receivers being aligned in a different straight line parallel to the straight line along which the plurality of transmitters are aligned, and receiving the wave from the region, and an information processing circuit that derives an imaging function in accordance with measurement data and a distance and uses the imaging function to image a structure of a scatterer included in an object that is present in the region, the imaging function corresponding to a scattering field function relating to scattering of the wave, the measurement data being obtained by all or some combinations of the plurality of transmitters and the plurality of receivers, the distance being a distance between the straight line along which the plurality of transmitters are aligned and the different straight line along which the plurality of receivers are aligned.

Note that comprehensive or specific aspects may be implemented as systems, devices, methods, integrated circuits, computer programs, or non-transitory media such as computer-readable CD-ROMs, or may be implemented as any combination of systems, devices, methods, integrated circuits, computer programs, and recording media.

Advantageous Effects of Invention

According to one aspect of the present disclosure, it becomes possible to image the structure of a scatterer included in an object that is present in a region by using a wave and to increase the spatial resolution for imaging the structure of the scatterer while avoiding complication of computational processing.

DESCRIPTION OF EMBODIMENTS

Figure 1:
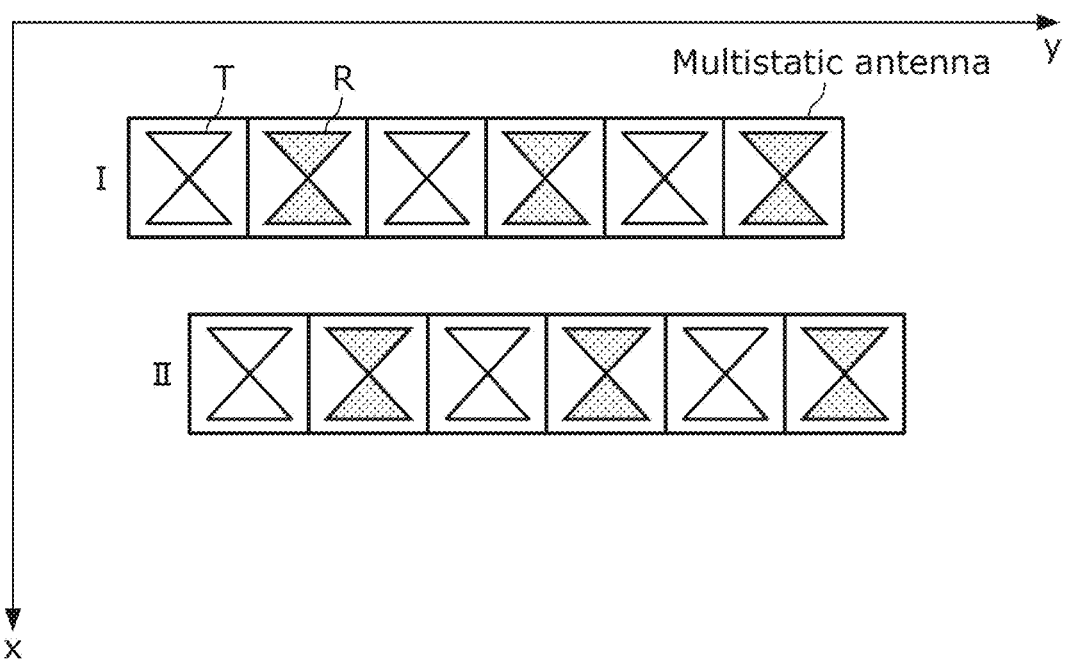
FIG. 1 is a diagram showing multistatic antennas according to a reference example.

An imaging device according to one aspect of the present disclosure includes a transmitter row including a plurality of transmitters that are aligned in a straight line and that transmit a wave to a region to be measured, a receiver row including a plurality of receivers and provided at an interval from the transmitter row, the plurality of receivers being aligned in a different straight line parallel to the straight line along which the plurality of transmitters are aligned, and receiving the wave from the region, and an information processing circuit that derives an imaging function in accordance with measurement data and a distance and uses the imaging function to image a structure of a scatterer included in an object that is present in the region, the imaging function corresponding to a scattering field function relating to scattering of the wave, the measurement data being obtained by all or some combinations of the plurality of transmitters and the plurality of receivers, the distance being a distance between the straight line along which the plurality of transmitters are aligned and the different straight line along which the plurality of receivers are aligned.

This allows the imaging device to acquire enough information as measurement data in accordance with various combinations of the plurality of transmitters in the transmitter row and the plurality of receivers in the receiver row. Since there is spacing between the transmitter row and the receiver row, the imaging device is capable of appropriately transmitting a wave to the region and appropriately receiving a wave from the region. Then, the imaging device is capable of appropriately imaging the structure of the scatterer by using the imaging function derived in accordance with the measurement data on the wave and the distance between the transmitter row and the receiver row.

Furthermore, since the transmitters and the receivers are confined to being arranged on the two straight lines, the imaging device is capable of simplifying computational processing as compared to the case where the transmitters and the receivers are arranged arbitrarily. Accordingly, the imaging device is capable of avoiding complication of computational processing. That is, the imaging device is capable of imaging the structure of the scatterer included in an object that is present in the region by using a wave and increasing the spatial resolution for imaging the structure of the scatterer while avoiding complication of computational processing.

For example, the information processing circuit derives the scattering field function in accordance with the measurement data and the distance and derives the imaging function in accordance with the scattering field function, and the scattering field function is a function expressed by:

[Math. 1]

$$\varphi(x_1, y_1, x_2, y_2, z) = \iiint_D \frac{e^{ik\rho_1}}{\rho_1} \frac{e^{ik\rho_2}}{\rho_2} \varepsilon(\xi, \eta, \zeta) d\xi d\eta d\zeta$$

where $\rho_1$ and $\rho_2$ are defined by:

[Math. 2]

$$\rho_1 = \sqrt{(x_1 - \xi)^2 + (y_1 - \eta)^2 + (z - \zeta)^2}$$
$$\rho_2 = \sqrt{(x_2 - \xi)^2 + (y_2 - \eta)^2 + (z - \zeta)^2}$$

where $(x_1, y_1, z)$ represents a transmission position of the wave, $(x_2, y_2, z)$ represents a reception position of the wave, k represents a wave number of the wave, D represents the region, $(\xi, \eta, \zeta)$ corresponds to a reflecting position of the wave, and $\varepsilon$ corresponds to unknown reflectance at the reflecting position.

This allows the imaging device to derive the scattering field function defined on the precondition that the transmission position and the reception position have the same z coordinate and to derive the imaging function in accordance with the derived scattering field function. Therefore, the imaging device is capable of appropriately deriving the scattering field function and the imaging function in accordance with the measurement data obtained along a plane boundary of the region by using the plurality of transmitters in the transmitter row and the plurality of receivers in the receiver row.

For example, the information processing circuit derives the scattering field function by solving an equation satisfied by the scattering field function, and the equation is expressed by:

[Math. 3]

$$\left\{ \Delta_5^2 - \frac{4}{c^2} \partial_t^2 \partial_z^2 - 4\left(\partial_{x_1}^2 + \partial_{y_1}^2\right)\left(\partial_{x_2}^2 + \partial_{y_2}^2\right) \right\} \varphi = 0$$

where $\Delta_5$ is defined by:

[Math. 4]

$$\Delta_5 = \partial_{x_1}^2 + \partial_{y_1}^2 + \partial_{x_2}^2 + \partial_{y_2}^2 + \partial_z^2$$

where c represents a velocity of propagation of the wave, and t represents a duration of time from transmission of the wave to reception of the wave.

This allows the imaging device to analytically derive the solution to the equation satisfied by the scattering field function as the scattering field function. Accordingly, the imaging device is capable of efficiently deriving the appropriate scattering field function.

For example, the imaging function is expressed by:

[Math. 5]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

where (x, y, z) represents a position to be imaged.

This allows the imaging device to derive the imaging function in accordance with a limit operation for the scattering field function. Accordingly, the imaging device is capable of imaging the condition of scattering in the region and appropriately imaging the structure of the scatterer included in the object that is present in the region.

For example, the information processing circuit derives, as the scattering field function:

[Math. 6]

$$\varphi(x_1, y_1, x_2, y_2, z, k) =$$

$$\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} e^{s_3 x_2} e^{s_4 z} e^{\frac{id(k_{x_1}+is_3)\sqrt{k^2-k_{y_2}^2}}{\sqrt{k^2-k_{y_1}^2}+\sqrt{k^2-k_{y_2}^2}}}$$

$$\Phi(k_x, k_{y_1}, k_{y_2}, k)\left(\frac{d(k_{x_1}+is_3)}{dk_{x_1}}\right) dk_{x_1} dk_{y_1} dk_{y_2}$$

where $k_x$, $s_3$, and $s_4$ are defined by:

[Math. 7]

$$k_x = k_{x_1} + is_3$$

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

$$s_4 = i\sqrt{\left(\sqrt{k^2-k_{y_1}^2}+\sqrt{k^2-k_{y_2}^2}\right)^2 - (k_{x_1}+is_3)^2}$$

where $k_{x1}$, $k_{y1}$, and $k_{y2}$ represent wave numbers of the scattering field function with respect to $x_1$, $y_1$, and $y_2$, and d represents the distance, and $$\Phi(k_x, k_{y_1}, k_{y_2}, k) \quad \text{[Math. 8]}$$

represents the measurement data that has undergone Fourier transform with respect to $x_1$, $y_1$, and $y_2$.

This allows the imaging device to appropriately reflect the measurement data on the wave and the distance between the transmitter row and the receiver row on the scattering field function. Accordingly, the imaging device is capable of derive the scattering field function that appropriately represents the condition of scattering.

[Math. 9]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)} e^{s_4 z} e^{\frac{idk_x\sqrt{k^2-k_{y_2}^2}}{\sqrt{k^2-k_{y_1}^2}+\sqrt{k^2-k_{y_2}^2}}}$$

$$\cdot \Phi(k_x, k_{y_1}, k_{y_2}, k) dk_{x_1} dk_{y_1} dk_{y_2}$$

$$= \frac{1}{(2\pi)^3} \int_{-\infty}^\infty \int_{-\infty}^\infty \int_{-\infty}^\infty e^{-i(k_x x + k_{y_1} y + k_{y_2} y)} e^{ik_z z} e^{\frac{idk_x\sqrt{k^2-k_{y_2}^2}}{\sqrt{k^2-k_{y_1}^2}+\sqrt{k^2-k_{y_2}^2}}}$$

$$\cdot \Phi(k_x, k_{y_1}, k_{y_2}, k)\left(\frac{dk}{dk_z}\right) dk_x dk_{y_1} dk_{y_2} dk_z$$

where $k_x$, $k_z$, k, dk/dL$_z$, and $s_4$ are defined by:

[Math. 10]

$$k_x = k_{x_1} + is_3$$

$$k_z = \sqrt{\left(\sqrt{k^2-k_{y_1}^2}+\sqrt{k^2-k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_2}^2 - k_{y_2}^2)^2}{k_x^2 + k_z^2}}$$

$$\frac{dk}{dk_z} = \frac{k_z\sqrt{k^2-k_{y_1}^2}\sqrt{k^2-k_{y_2}^2}}{k(k_x^2+k_z^2)}$$

$$s_4 = ik_z = i\sqrt{\left(\sqrt{k^2-k_{y_1}^2}+\sqrt{k^2-k_{y_2}^2}\right)^2 - (k_{x_1}+is_3)^2}$$

where $s_3$ is defined by:

[Math. 11]

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

where (x, y, z) represents a position to be imaged, $k_{x1}$, $k_{y1}$, and $k_{y2}$ represent wave numbers of the scattering field function with respect to $x_1$, $y_1$, and $y_2$, d represents the distance, and $$\Phi(k_x, k_{y_1}, k_{y_2}, k) \quad \text{[Math. 12]}$$

represents the measurement data that has undergone Fourier transform with respect to $x_1$, $y_1$, and $y_2$.

This allows the imaging device to appropriately reflect the measurement data on the wave and the distance between the transmitter row and the receiver row on the imaging function. Accordingly, the imaging device is capable of deriving the imaging function that appropriately represents the condition of scattering.

For example, the imaging device may include a plurality of transmitter rows as the transmitter row, a plurality of receiver rows as the receiver row, or a plurality of transmitter rows and a plurality of receiver rows as the transmitter row and the receiver row.

This allows the imaging device to acquire enough information as the measurement data in accordance with a plurality of combinations of the transmitter rows and the receiver rows. This also allows the imaging device to construct a multistatic relation of two directions that are respectively parallel to and orthogonal to the transmitter row(s) and the receiver row(s). Accordingly, the imaging device is capable of appropriately imaging the structure of the scatterer included in the object that is present in the region.

For example, for one transmitter row and n receiver rows that are included as the transmitter row and the receiver row in the imaging device, the information processing circuit derives, as the imaging function:

[Math. 13]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_{-\infty}^\infty \int_{-\infty}^\infty \int_{-\infty}^\infty \int_0^\infty e^{-i(k_x x + k_{y_1} y + k_{y_2} y)} e^{s_4 z}$$

$$\cdot \sum_{j=1,n} \left\{ \exp\left( \frac{i d_j k_x \sqrt{k^2 - k_{y_2}^2}}{\sqrt{k^2 - k_{y_1}^2} + \sqrt{k^2 - k_{y_2}^2}} \right) \Phi_j(k_x, k_{y_1}, k_{y_2}, k) \right\} dk_x dk_{y_1} dk_{y_2} dk$$

$$= \frac{1}{(2\pi)^3} \int_{-\infty}^\infty \int_{-\infty}^\infty \int_{-\infty}^\infty \int_0^\infty e^{-i(k_x x + k_{y_1} y + k_{y_2} y)} e^{i k_z z}$$

$$\cdot \sum_{j=1,n} \left\{ \exp\left( \frac{i d_j k_x \sqrt{k^2 - k_{y_2}^2}}{\sqrt{k^2 - k_{y_1}^2} + \sqrt{k^2 - k_{y_2}^2}} \right) \Phi_j(k_x, k_{y_1}, k_{y_2}, k) \right\} \left( \frac{dk}{dk_z} \right) dk_x dk_{y_1} dk_{y_2} dk_z$$

where $k_x$, k, k, $dk/dk_z$, and $s_4$ are defined by:

[Math. 14]

$$k_x = k_{x_1} + i s_3$$

$$k_z = \sqrt{\left( \sqrt{k^2 - k_{y_1}^2} + \sqrt{k^2 - k_{y_2}^2} \right)^2 - k_x^2}$$

$$k = \frac{1}{2} \sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \sqrt{k^2 - k_{y_1}^2} \sqrt{k^2 - k_{y_2}^2}}{k(k_x^2 + k_z^2)}$$

$$s_4 = i k_z = i \sqrt{\left( \sqrt{k^2 - k_{y_1}^2} + \sqrt{k^2 - k_{y_2}^2} \right)^2 - (k_{x_1} + i s_3)^2}$$

where $s_3$ is defined by:

[Math. 15]

$$s_3 = \frac{-i k_{x_1} \sqrt{k^2 - k_{y_2}^2}}{\sqrt{k^2 - k_{y_1}^2}} = \frac{-i k_x \sqrt{k^2 - k_{y_2}^2}}{\sqrt{k^2 - k_{y_1}^2} + \sqrt{k^2 - k_{y_2}^2}}$$

where (x, y, z) represents a position to be imaged, $k_{x_1}$, $k_{y_1}$, and $k_{y_2}$ represent wave numbers of the scattering field function with respect to $x_1$, $y_1$, and $y_2$, $d_j$ represents the distance, and $$\Phi_j(k_x, k_{y_1}, k_{y_2}, k) \qquad \text{[Math. 16]}$$

represents the measurement data that has undergone Fourier transform with respect to $x_1$, $y_1$, and $y_2$.

This allows the imaging device to appropriately reflect the measurement data on the wave and the distance between the transmitter row and the receiver row on the imaging function. Specifically, the imaging device is capable of deriving the imaging function that appropriately represents the condition of scattering, by performing a linear addition corresponding to the distance between the transmitter row and the receiver row on the measurement data obtained in accordance with a plurality of combinations of the transmitter rows and the receiver rows.

For example, when a dielectric constant that corresponds to the reflectance in the region has frequency dependence, the information processing circuit derives, as the imaging function:

[Math. 17]

$$\rho(x, y, z) = \int_0^\infty \lim_{\substack{x_2 \to x_1 = x \\ y_2 \to y_1 = y}} \varphi(x_1, y_1, x_2, y_2, z, k) d\omega$$

$$= \frac{1}{(2\pi)^3} \int_0^\infty d\omega \int_{-\infty}^\infty \int_{-\infty}^\infty \int_{-\infty}^\infty e^{-i(k_x x + k_{y_1} y + k_{y_2} y)} e^{s_4 z} e^{\frac{i d k_x \sqrt{k^2 - k_{y_2}^2}}{\sqrt{k^2 - k_{y_1}^2} + \sqrt{k^2 - k_{y_2}^2}}}$$

$$\cdot \Phi(k_x, k_{y_1}, k_{y_2}, k) dk_{x_1} dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)} e^{i k_z z} e^{\frac{i d k_x \sqrt{k^2 - k_{y_2}^2}}{\sqrt{k^2 - k_{y_1}^2} + \sqrt{k^2 - k_{y_2}^2}}}$$

$$\cdot \Phi(k_x, k_{y_1}, k_{y_2}, k) \left( \frac{d\omega}{dk} \right) \left( \frac{dk}{dk_z} \right) dk_x dk_{y_1} dk_{y_2} dk_z$$

where $k_x$, $k_z$, k, $dk/dk_z$, $d\omega/dk$, and $s_4$ are defined by:

[Math. 18]

$$k_x = k_{x_1} + i s_3$$

$$k_z = \sqrt{\left( \sqrt{k^2 - k_{y_1}^2} + \sqrt{k^2 - k_{y_2}^2} \right)^2 - k_x^2}$$

$$k = \frac{1}{2} \sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \sqrt{k^2 - k_{y_1}^2} \sqrt{k^2 - k_{y_2}^2}}{k(k_x^2 + k_z^2)}$$

$$\frac{d\omega}{dk} = \frac{c_0^2 k + \alpha c_0^2 \omega^2 k}{(a+b)\omega + 2 a \alpha \omega^2 - \alpha c_0^2 \omega k^2}$$

$$s_4 = i k_z = i \sqrt{\left( \sqrt{k^2 - k_{y_1}^2} + \sqrt{k^2 - k_{y_2}^2} \right)^2 - (k_{x_1} + i s_3)^2}$$

where $s_3$ is defined by:

[Math. 19]

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

where (x, y, z) represents a position to be imaged, $k_{x_1}$, $k_{y_1}$, and $k_{y_2}$ represent wave numbers of the scattering field function with respect to $x_1$, $y_1$, and $y_2$, d represents the distance, w represents an angular frequency of the wave, $c_0$ represents a velocity of propagation of the wave in vacuum, a, b, and α represent parameters relating to Debye's relaxation, and $$\tilde{\Phi} > (k_x, k_{y_1}, k_{y_2}, k) \quad \text{[Math. 20]}$$

represents the measurement data that has undergone Fourier transform with respect to $x_1$, $y_1$, and $y_2$.

This allows the imaging device to derive the imaging function that reflects the parameters relating to Debye's relaxation. Accordingly, the imaging device is capable of avoiding accuracy degradation that may occur depending on the frequency of the wave.

For example, the information processing circuit derives the scattering field function in accordance with the measurement data and the distance and derives the imaging function in accordance with the scattering field function, and the scattering field function is a function expressed by:

[Math. 21]

$$\varphi(x_1, y_1, x_2, y_2, z_1, z_2, k) = \int\int_D\int \frac{e^{ik\rho_1}}{\rho_1}\frac{e^{ik\rho_2}}{\rho_2}\varepsilon(\xi, \eta, \zeta)d\xi d\eta d\zeta$$

where $\rho_1$ and $\rho_2$ are defined by:

[Math. 22]

$$\rho_1 = \sqrt{(x_1-\xi)^2+(y_1-\eta)^2+(z_1-\zeta)^2}$$
$$\rho_2 = \sqrt{(x_2-\xi)^2+(y_2-\eta)^2+(z_2-\zeta)^2}$$

where ($x_1$, $y_1$, $z_1$) represents a transmission position of the wave, ($x_2$, $y_2$, $z_2$) represents a reception position of the wave, k represents a wave number of the wave, D represents the region, (ξ, η, ζ) corresponds to a reflecting position of the wave, and ε corresponds to unknown reflectance at the reflecting position.

This allows the imaging device to derive the scattering field function that is defined on the precondition that the transmission position and the reception position may have different z coordinates and to derive the imaging function in accordance with the derived scattering field function. Accordingly, the imaging device is capable of appropriately deriving the scattering field function and the imaging function in accordance with the measurement data obtained along a tangential plane of the region having a curved boundary by using the plurality of transmitters in the transmitter row and the plurality of receivers in the receiver row.

For example, the information processing circuit derives the scattering field function by solving an equation satisfied by the scattering field function, and the equation is expressed by:

[Math. 23]

$$\{\Delta_6 - 2(ik)^2\}\varphi(x_1, y_1, x_2, y_2, z_1, z_2, k) = 0$$

where $\Delta_6$ is defined by:

[Math. 24]

$$\Delta_6 = \partial_{x_1}^2 + \partial_{x_2}^2 + \partial_{y_1}^2 + \partial_{y_2}^2 + \partial_{z_1}^2 + \partial_{z_2}^2$$

This allows the imaging device to analytically derive the solution to the equation satisfied by the scattering field function as the scattering field function. Accordingly, the imaging device is capable of efficiently deriving the appropriate scattering field function.

For example, the imaging function is expressed by:

[Math. 25]

$$\rho(x, y, z) = \int_0^\infty \phi(x, y, x, y, z, z, k)dk$$

where (x, y, z) represents a position to be imaged.

This allows the imaging device to derive the imaging function by using the scattering field function that has received input of the position to be imaged. Accordingly, the imaging device is capable of imaging the condition of scattering in the region and appropriately imaging the structure of the scatterer included in the object that is present in the region.

For example, the information processing circuit derives, as the scattering field function:

[Math. 26]

$$\varphi(x_1, y_1, x_2, y_2, z_1, z_2, k) = \frac{1}{(2\pi)^3}\int_{-\infty}^\infty\int_{-\infty}^\infty\int_{-\infty}^\infty e^{-i(k_{x_1}x_1+k_{y_1}y_1+k_{y_2}y_2)}$$

$$\sum_{I,J}\Phi(x_I, y_I, y_J, z_I, z_J, k)\cdot e^{i(k_{x_1}x_I+k_{y_1}y_I+k_{y_2}y_J)}e^{-s_3d}e^{-s_4z_I}e^{-s_5z_J}$$

$$e^{s_3x_2}e^{s_4z_1}e^{s_5z_2}\frac{d(k_x+is_3)}{dk_{x_1}}dk_{x_1}dk_{y_1}dk_{y_2}$$

where $k_x$, $s_3$, $s_4$, and $s_5$ are defined by:

[Math. 27]

$$k_x = k_{x_1} + is_3$$

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

$$s_4 = \frac{i\sqrt{k^2-k_{y_1}^2}\sqrt{\left(\sqrt{k^2-k_{y_1}^2}+\sqrt{k^2-k_{y_2}^2}\right)^2-k_x^2}}{\sqrt{k^2-k_{y_1}^2}+\sqrt{k^2-k_{y_2}^2}}$$

-continued $$s_5 = \frac{i\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

where $k_{x1}$, $k_{y1}$, and $k_{y2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

This allow the imaging device to appropriately reflect the measurement data on the wave and the distance between the transmitter row and the receiver row on the scattering field function. Accordingly, the imaging device is capable of deriving the scattering field function that appropriately represents the condition of scattering.

For example, the information processing circuit derives, as the imaging function:

[Math. 28]

$$\rho(x, y, z) = \int_0^\infty \varphi(x, y, x, y, z, z, k)dk$$

$$= \frac{1}{(2\pi)^3} \int_0^\infty dk \int_{-\infty}^\infty \int_{-\infty}^\infty \int_{-\infty}^\infty e^{-i(k_x x + k_{y_1} y_1 + k_{y_2} y_2)} e^{-s_3 d} e^{ik_z z}$$

$$\sum_{I,J} \{\Phi(x_I, y_I, y_J, z_I, z_J, k) \cdot$$

$$e^{i(k_x x_I + k_{y_1} y_I + k_{y_2} y_J)} e^{s_4 z_I} e^{s_5 z_J} \} dk_{x_1} dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y_1 + k_{y_2} y_2)} e^{-s_3 d} e^{ik_z z}$$

$$\sum_{I,J} \{\Phi(x_I, y_I, y_J, z_I, z_J, k) \cdot e^{i(k_x x_I + k_{y_1} y_I + k_{y_2} y_J)}$$

$$e^{-s_4 z_I} e^{-s_5 z_J} \} \left(\frac{dk}{dk_z}\right) dk_x dk_{y_1} dk_{y_2} dk_z$$

where $k_x$, $k_z$, $k$, $dk/dk_z$, $s_3$, $s_4$, and $s_5$ are defined by:

[Math. 29]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\left\{1 - \frac{(k_{y_1}^2 - k_{y_2}^2)^2}{(k_x^2) + (k_z^2)^2}\right\}}{2\sqrt{k_x^2 + k_z^2 + 2(k_{y_1}^2 + k_{y_2}^2) + \frac{(k_{y_1}^2 - k_{y_2}^2)}{k_x^2 + k_z^2}}}$$

$$s_3 = \frac{-ik_{x_1}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

where $(x, y, z)$ represents a position to be imaged, $k_{x1}$, $k_{y1}$, and $k_{y2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_1, y_I, z_I)$ and the reception position is located at $(x_I+d, y_J, z_J)$.

This allows the imaging device to appropriately reflect the measurement data on the wave and the distance between the transmitter row and the receiver row on the imaging function. Accordingly, the imaging device is capable of deriving the imaging function that appropriately represents the condition of scattering.

For example, the information processing circuit derives the imaging function by merging of a plurality of scattering field functions that correspond to a plurality of combinations relating to the transmitter row and the receiver row, and each of the plurality of scattering field functions corresponds to the scattering field function and is expressed by:

[Math. 30]

$$\varphi(x_1, y_1, x_2, y_2, z_1, z_2, k) = \frac{1}{(2\pi)^3} \int_{-\infty}^\infty \int_{-\infty}^\infty \int_{-\infty}^\infty e^{-i(k_{x_1} x_1 + k_{y_1} y_1 + k_{y_2} y_2)}$$

$$\sum_{I,J} \left\{ \Phi(x_I, y_I, y_J, z_I, z_J, k) \cdot e^{-i(k_{x_1} x_I + k_{y_1} y_I + k_{y_2} y_J)} e^{-s_3 d} e^{-s_4 z_I} e^{-s_5 z_J} \right\}$$

$$e^{s_3 x_2} e^{s_4 z_1} e^{s_5 z_2} \frac{d(k_x + is_3)}{dk_{x_1}} dk_{x_1} dk_{y_1} dk_{y_2}$$

where $k_x$, $s_3$, $s_4$, and $s_5$ are defined by:

[Math. 31]

$$k_x = k_{x_1} + is_3$$

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

$$s_4 = \frac{i\sqrt{k - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_5 = \frac{i\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

where $k_{x1}$, $k_{y1}$, and $k_{y2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

This allows the imaging device to derive the imaging function that appropriately represents the condition of scattering, by merging of the plurality of scattering field functions that reflect the measurement data on the wave and the distance between the transmitter row and the receiver row.

For example, when a dielectric constant that corresponds to the reflectance in the region has frequency dependence, the information processing circuit derives, as the imaging function:

[Math. 32]

$$\rho(x, y, z) = \int_0^\infty \varphi(x, y, x, y, z, z, k) d\omega$$

$$= \frac{1}{(2\pi)^3} \int_0^\infty d\omega \int_{-\infty}^{\infty} \int_{-\infty}^{\infty} \int_{-\infty}^{\infty} e^{-i(k_x x + k_{y_1} y_1 + k_{y_2} y_2)}$$

$$e^{-s_3 d} e^{ik_z z} \sum_{I,J} \{\Phi(x_I, y_I, y_J, z_I, z_J, k) \cdot$$

$$e^{i(k_{x_1} x_I + k_{y_1} y_I + k_{y_2} y_J)} e^{-s_4 z_I} e^{s_5 z_J} \} dk_{x_1} dk_{y_1} dk_{y_2}$$

$$= \frac{1}{(2\pi)^3} \int_0^\infty \int_{-\infty}^{\infty} \int_{-\infty}^{\infty} \int_{-\infty}^{\infty} e^{-i(k_x x + k_{y_1} y_1 + k_{y_2} y_2)}$$

$$e^{-s_3 d} e^{ik_z z} \sum_{I,J} \{\Phi(x_I, y_I, y_J, z_I, z_J, k) \cdot$$

$$e^{i(k_{x_1} x_I + k_{y_1} y_I + k_{y_2} y_J)} e^{-s_4 z_I} e^{-s_5 z_J} \}$$

$$\left(\frac{d\omega}{dk}\right)\left(\frac{dk}{dk_z}\right) dk_x dk_{y_1} dk_{y_2} dk_z$$

where $k_x$, $k_z$, $k$, $dk/dk_z$, $d\omega/dk$, $s_3$, $s_4$, and $s_5$ are defined by:

[Math. 33]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

$$s_3 = \frac{-ik_{x_1}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

where (x, y, z) represents a position to be imaged, $k_{x_1}$, $k_{y_1}$, and $k_{y_2}$ represent wave numbers of the scattering field function with respect to $x_1$, $y_1$, and $y_2$, d represents the distance, w represents an angular frequency of the wave, ω represents a velocity of propagation of the wave in vacuum, a, b, and a represent parameters relating to Debye's relaxation, and $$\Phi(k_x, k_{y_1}, k_{y_2}, k)$$ [Math. 34]

represents the measurement data that has undergone Fourier transform with respect to $x_1$, $y_1$, and $y_2$.

This allows the imaging device to derive the imaging function that reflects the parameters relating to Debye's relaxation. Accordingly, the imaging device is capable of avoiding accuracy degradation that may occur depending on the frequency of the wave.

An imaging method according to one aspect of the present disclosure includes causing a plurality of transmitters included in a transmitter row and aligned in a straight line to transmit a wave to a region to be measured, causing a plurality of receivers included in a receiver row provided at an interval from the transmitter row to receive the wave from the region, the plurality of receivers being aligned in a different straight line that is parallel to the straight line along which the plurality of transmitters are aligned, and deriving an imaging function in accordance with measurement data and a distance and using the imaging function to image a structure of a scatterer included in an object that is present in the region, the imaging function corresponding to a scattering field function relating to scattering of the wave, the measurement data being obtained by all or some combinations of the plurality of transmitters and the plurality of receivers, the distance being a distance between the straight line along which the plurality of transmitters are aligned and the different straight line along which the plurality of receivers are aligned.

This method enables acquiring enough information as the measurement data in accordance with different combinations of the plurality of transmitters in the transmitter row and the plurality of receivers in the receiver row. Since there is spacing between the transmitter row and the receiver row, it is possible to appropriately transmit the wave to the region and to appropriately receive the wave from the region. Then, it is possible to appropriately image the structure of the scatterer by using the imaging function that is derived in accordance with the measurement data on the wave and the distance between the transmitter row and the receiver row.

Moreover, since the transmitters and the receivers are constrained to being arranged on the two straight lines, it is possible to simplify computational processing as compared to the case where the transmitters and the receivers are arranged arbitrarily. Accordingly, it becomes possible to avoid complication of computational processing. That is, it is possible to image the structure of the scatterer included in the object that is present in the region by using the wave and to increase the spatial resolution for imaging the structure of the scatterer while avoiding complication of computational processing.

Hereinafter, an embodiment will be described with reference to the drawings. Note that the embodiment described below illustrates one generic or specific example. Numerical values, shapes, materials, constituent elements, positions in the arrangement of the constituent elements, the form of connection of the constituent elements, steps, a sequence of steps, and so on in the following embodiment are merely one example, and do not intend to limit the scope of the present disclosure.

In the following description, in particular the techniques or the like described in PTLs 2 to 5 given above may be referenced to as existing techniques. Although radio waves such as microwaves are primarily assumed as waves in the following description, the waves are not limited to radio waves such as microwaves. Imaging based on scattering may be expressed as scattering tomography. Thus, an imaging device and an imaging method given in the following description may also be expressed as a scattering tomographic device and a scattering tomographic method, respectively Embodiment An imaging device according to the present embodiment images the structure of a scatterer included in an object that is present in a region by using a wave. Hereinafter, the imaging device according to the present embodiment, including techniques and theories serving as the basis of the imaging device, will be described in detail.

<I. Overview>

The present disclosure describes microwave imaging technology based on a super-array (S-Array) scattering field theory.

FIG. 1 is a diagram showing multistatic (MS) antennas according to a reference example. Each multistatic antenna includes a plurality of transmitting antenna elements T and a plurality of receiving antenna elements R that are alternately arranged in a row. The transmitting antenna elements T and the receiving antenna elements R may also be simply referred to as transmitting elements and receiving elements, respectively Each antenna element has a half-wavelength ($\lambda/2$) size. Thus, the resolution in the y-axial direction is a half-wavelength ($\lambda/2$). This does not satisfy the Nyquist criterion of sampling and therefore a phenomenon called aliasing occurs. Thus, it is conceivable to shift the antenna array by $\lambda/4$ in the y direction and scan the antenna array in the x direction. Alternatively, it is also conceivable to use a method for tying two independent array antenna systems in a bundle from the beginning and scanning these array antenna systems together.

However, the array antenna of this type can obtain only a very small number of data in relation to its length in the y direction.

For example, the number of data items obtained by the multistatic antennas shown in FIG. 1 is a total of 18 pairs of data, including each nine pairs obtained at each of positions I and II of the multistatic antennas. Moreover, the number of data that can be obtained when electromagnetically induced coupling is eliminated between each adjacent pair of transmitting and receiving elements is only a total of eight pairs of data, including each four pairs obtained at each of positions I and II. Even in any conceivable arrangement of the antenna elements, it is difficult to realize a single array antenna system that satisfies the Nyquist's theorem of sampling.

Figure 2:
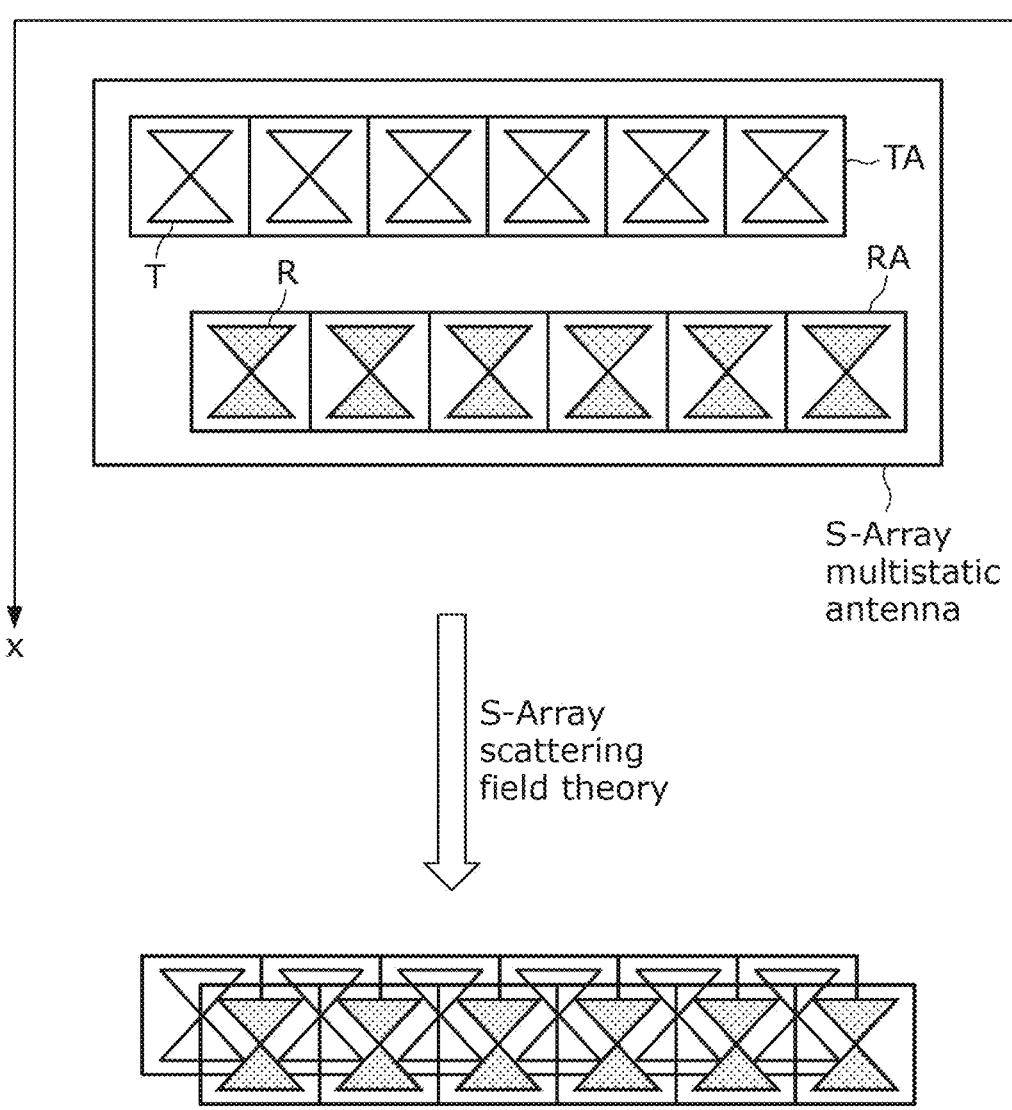
FIG. 2 is a diagram showing an example of an S-Array multistatic antenna according to an embodiment.

FIG. 2 is a diagram showing an example of an S-Array multistatic antenna according to the present embodiment. The S-Array multistatic antenna may be simply referred to as the S-Array. In this example, the S-Array multistatic array antenna includes two rows of array antennas including transmitting array antenna TA and receiving array antenna RA. The S-Array multistatic array antenna is capable of obtaining 36 pairs of data during transmission and reception.

However, until now, there is practically no inverse-scattering analysis techniques for obtaining correct video of a target object from the above data. It has been an extremely difficult challenge to construct a theory for properly incorporating phases based on the distance between transmitting and receiving array antennas.

An S-Array scattering field theory according to the present disclosure solves this challenge and realizes a virtual high-density S-Array that satisfies the Nyquist criterion of sampling as shown in the lower section in FIG. 2. That is, according to the S-Array scattering field theory, two rows of array antennas including transmitting array antenna TA and receiving array antenna RA are theoretically converted into a single row of transmitting and receiving array antennas. Accordingly, $\lambda/4$ resolution is achieved in the y direction. Also, arbitrary resolution is achieved in the x direction by scanning in the x direction.

The S-Array scattering field theory according to the present disclosure is decisively different in the following point from existing scattering field theories relating to two-dimensional array antennas.

According to an existing method, a two-dimensional array antenna is scanned in the x direction in order to satisfy sampling conditions. In this case, the dimension of a multiple integral in the inverse analysis algorithm for scattering is one dimension higher than that in the S-Array. Thus, the required analysis time becomes n times or more, where n is the number of samples in the x direction and in the range of, for example, 128 to 256. Therefore, it is difficult to put the existing scattering field analysis methods relating to two-dimensional array antennas into practical use through the ability of existing calculators.

For example, according to an existing method relating to two dimensions, a signal is transmitted from an arbitrary element in a two-dimensional planar grid array antenna and received by a different arbitrary element in the two-dimensional array antenna. Accordingly, $n^4$ sets of data are obtained, where n is the number of elements on one side of a tetragonal lattice. Each set of data is time-series data with a bandwidth of 10 GHz or higher. An algorithm using such two-dimensional multistatic data to reconfigure video of a target object has already been justified by a reconstitution theory.

However, as described above, imaging using the two-dimensional array antenna is not always realistic because of device complexity and difficulty in achieving valid resolution. There are also challenges in terms of resolution as long as scanning is not performed in the x direction. In contrast, the S-Array scattering field theory is greatly refined as will be described below and extremely highly realizable because an inverse analysis algorithm for scattering is also obtained by slight modification of an existing one-dimensional algorithm.

Figure 3:
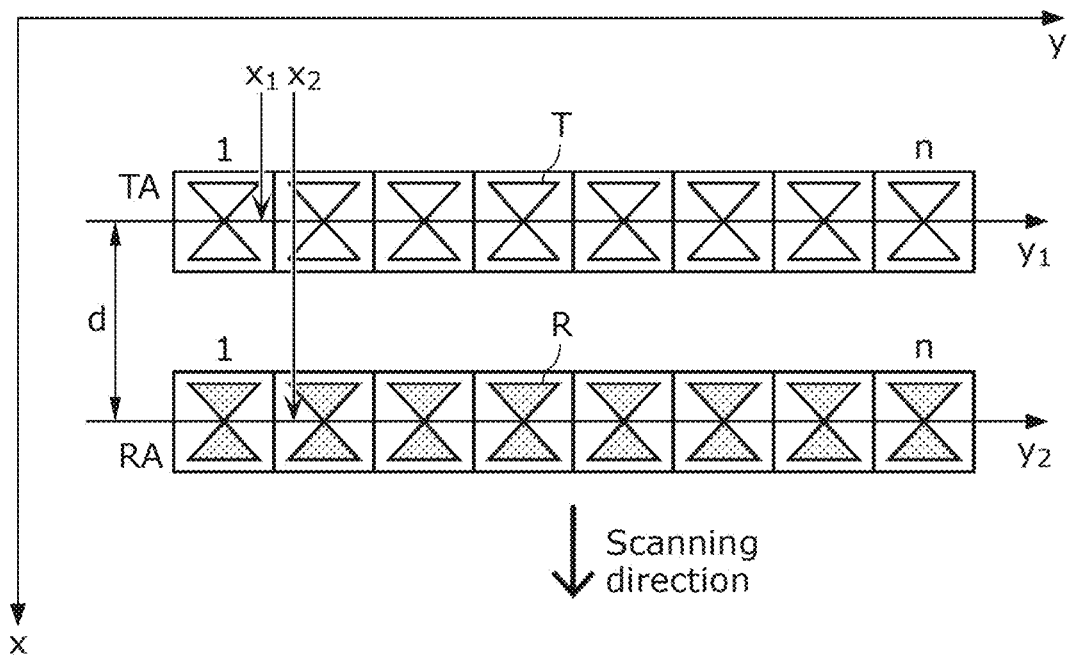
FIG. 3 is a diagram showing an example of coordinates relating to an S-Array according to the embodiment.

FIG. 3 is a diagram showing an example of coordinates in the S-Array according to the present embodiment. The S-Array is a semi-two-dimensional array antenna configured by two linear array antennas including single-row transmitting array antenna TA and single-row receiving array antenna RA as shown in FIG. 3.

Specifically, transmitting array antenna TA includes n transmitting antenna elements T. Receiving array antenna RA includes n receiving antenna elements R. The x coordinate of transmitting array antenna TA is expressed as $x_1$, the x coordinate of receiving array antenna RA is expressed as $x_2$, and the distance in the x direction between transmitting array antenna TA and receiving array antenna RA is expressed as d. This configuration is capable of obtaining $n^2$ sets of time-series data, each being an arbitrary combination of n transmitting elements and n receiving elements at each point x in the scanning direction.

Figure 4:
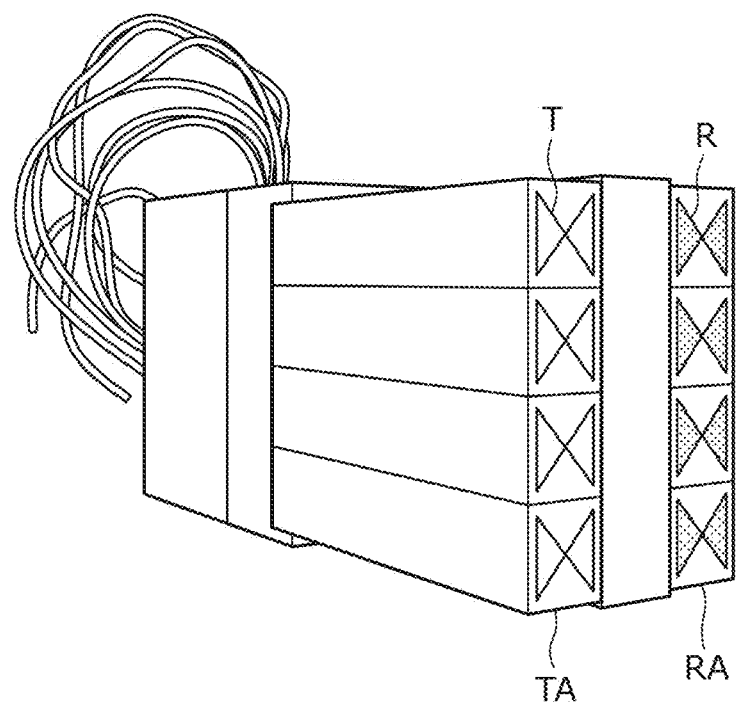
FIG. 4 is an outside drawing of the S-Array according to the embodiment.

FIG. 4 is an outside drawing of the S-Array according to the present embodiment. Transmitting array antenna TA that includes transmitting antenna elements T and receiving array antenna RA that includes receiving antenna elements R are configured away from each other. That is, transmitting antenna elements T and receiving antenna elements R are arranged in semi-two dimensions.

If the reconstitution theory for existing two-dimensional array antennas is applied to this arrangement of the semi-two-dimensional array antennas, a significant amount of time is required because the dimension becomes one dimension higher. Thus, commercialization is still difficult. A method of calculation with excellent efficiency is called for, such as reconstitution using an analytic solution in the case of a linear array antenna in which a plurality of transmitting antenna elements T and a plurality of receiving antenna elements R are arranged in a single row. Such a highly efficient calculation method is effective for commercialization of a semi-two-dimensional array antenna.

Surprisingly, the inventors of the present disclosure have only recently found an analytic solution for reconstitution in the case of a semi-two-dimensional array. That is, a method acting as a bridge between the theory for one-dimensional arrays and the theory for two-dimensional arrays has been found, and a reconstitutive equation used in the case of semi-two-dimensional arrays has been obtained analytically. This theory (S-Array scattering field theory) enables constructing a practical inverse scattering theory in the case of a linear antenna that includes spatially separated transmitting and receiving array antennas TA and RA. Hereinafter, the contents of this theory and the application of the theory will be described in detail.

<II. Preparation from Existing Theory>
<II-1. MS Inverse Scattering Theory Applied to One-Dimensional Array Near Plane Boundary>

A method used to image a target object by an imaging device using a one-dimensional array antenna is extremely simple and merely to solve a wave equation given by expression (2-1-1) below.

[Math. 35]

$$(\Delta + k^2)\varphi = 0 \quad (2-1-1)$$

$$\Delta = \partial_x^2 + \partial_y^2 + \partial_z^2$$

Here,

[Math. 36]

$$\varphi$$

represents the unknown function, k represents the wave number, Δ represents the Laplace operator, and ∂ represents the partial differential of each variable with a suffix.

This method is called monostatic. According to this method, pair elements, each obtained by integrating a transmitting element and a receiving element, are arranged along the y axis. If there are n pair elements for transmission and reception, n sets of data can be obtained. However, the accuracy obtained by this method is basically twice the size of each antenna element for transmission and reception. Therefore, it is difficult to obtain a high-resolution image.

Figure 5:
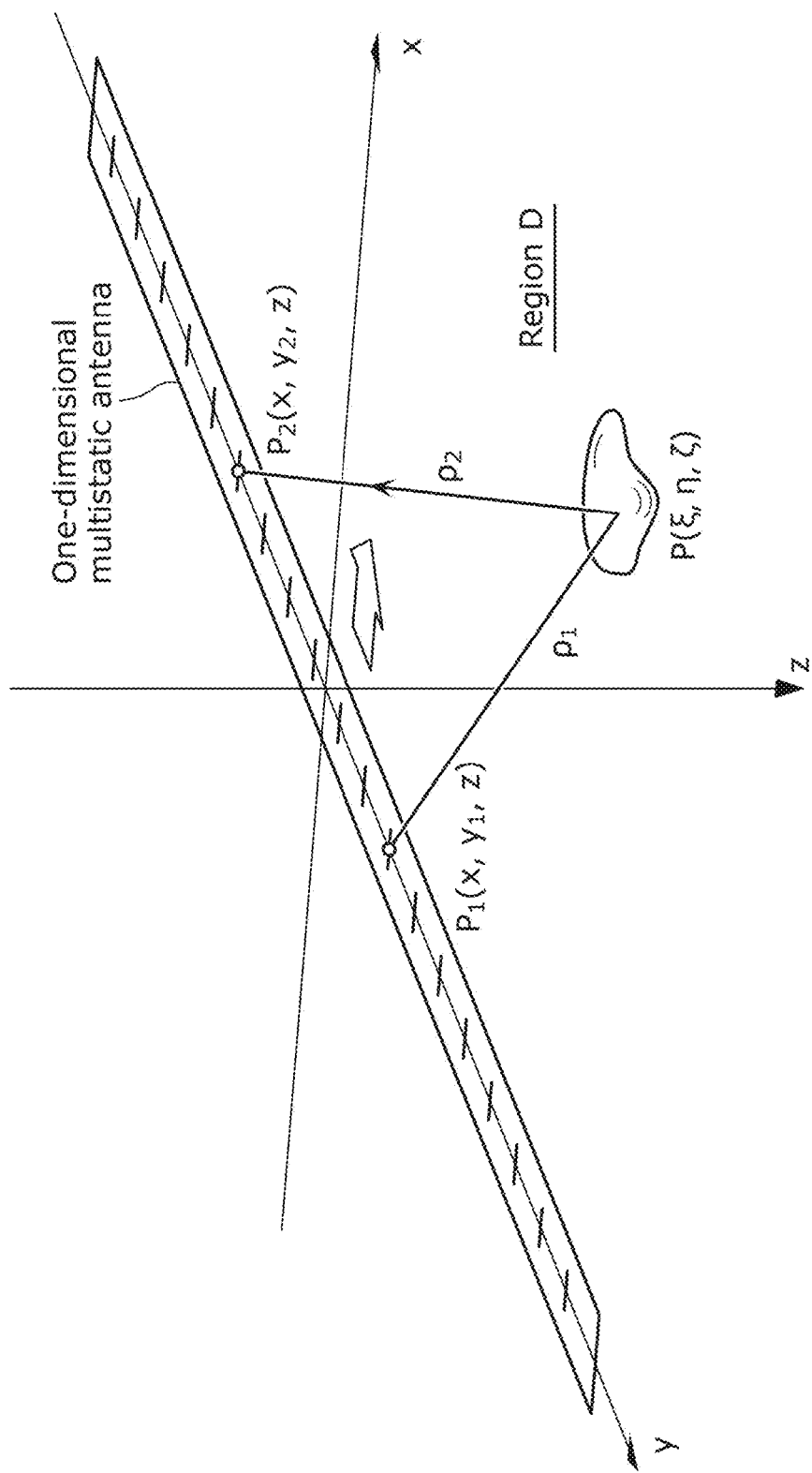
FIG. 5 is a conceptual diagram showing a one-dimensional multistatic array antenna.

FIG. 5 is a conceptual diagram showing a one-dimensional multistatic array antenna. In the case where arbitrary two elements are selected as a transmitting element and a receiving element from among n elements as shown in FIG. 5, the spatial resolution becomes twice. Moreover, singles can be received with a high S/N ratio at a range of distances from short distance to long distance. This considerably improves the quality of an ultimate image. Whereas, as a matter of course, the amount of data is increased to n times, the time required for reconstitution is also shortened dramatically according to the theory described below.

Here, a situation is examined in which a radio wave radiated from point $P_1$ (x, $y_1$, z) is reflected at point P ($\xi$, $\eta$, $\zeta$) and received at point $P_2$ (x, $y_2$, z) as shown in FIG. 5. In the case where point P is assumed to move in entire region D, the signal received at point $P_2$ is represented by expression (2-1-2) below.

[Math. 37]

$$\varphi(x, y_1, y_2, z) = \iint_D \frac{e^{ik\rho_1}}{\rho_1} \frac{e^{ik\rho_2}}{\rho_2} \varepsilon(\xi, \eta, \zeta) d\xi d\eta d\zeta \quad (2-1-2)$$

$$\rho_1 = \sqrt{(x-\xi)^2 + (y_1-\eta)^2 + (z-\zeta)^2}$$

$$\rho_2 = \sqrt{(x-\xi)^2 + (y_2-\eta)^2 + (z-\zeta)^2}$$

Here, ε ($\xi$, $\eta$, $\zeta$) represents the function of the dielectric constant at point P ($\xi$, $\eta$, $\zeta$) and corresponds to the reflectance at point P ($\xi$, $\eta$, $\zeta$). Point P ($\xi$, $\eta$, $\zeta$) corresponds to the reflection point. Note that ε ($\xi$, $\eta$, $\zeta$) is unknown. It is also assumed that the time factor is proportional to exp(−iωt). The kernel function in the integrand term of the above equation is represented as φ in expression (2-1-3) below.

[Math. 38]

$$\phi = \frac{e^{ik\rho_1}}{\rho_1} \frac{e^{ik\rho_2}}{\rho_2} \quad (2-1-3)$$

Next, a partial differential equation that has expression (2-1-3) as an asymptotical solution is examined. Thus, calculation is performed while ignoring a high-order term with respect to 1/ρ obtained as a result of differentiation. Here, an abridged notation for differentiation is defined by expression (2-1-4).

[Math. 39]

$$\frac{\partial}{\partial i} \to \partial_i, \frac{\partial}{\partial x} \to \partial_x, \frac{\partial}{\partial y_1} \to \partial_{y_1}, \frac{\partial}{\partial y_2} \to \partial_{y_2}, \frac{\partial}{\partial z} \to \partial_z \quad (2-1-4)$$

Here, a partial differential equation that has expression (2-1-3) as an asymptotical solution at short wavelengths (at high frequency or when k is large) is examined. This solution to the partial differential equation may be regarded as almost an exact solution in imaging using microwaves. First, the result of differentiation of each order of φ is represented by expression (2-1-5) below.

[Math. 40]

$$\partial_x \phi = ik(x-\xi)\left(\frac{1}{\rho_1} + \frac{1}{\rho_2}\right)\phi + o(\rho^{-3}) \quad (2-1-5)$$

$$\partial_{y_2} \phi = ik\left(\frac{y_2-\eta}{\rho_2}\right)\phi + o(\rho^{-3})$$

-continued $$\partial_x \partial_x \phi = (ik)^2 (x-\xi)^2 \left(\frac{1}{\rho_1} + \frac{1}{\rho_2}\right)^2 \phi + o(\rho^{-3})$$

$$\partial_z \partial_z \phi = (ik)^2 (z-\zeta)^2 \left(\frac{1}{\rho_1} + \frac{1}{\rho_2}\right)^2 \phi + o(\rho^{-3})$$

$$\partial_{y_1} \partial_{y_1} \phi = (ik)^2 \left(\frac{y_1-\eta}{\rho_1}\right)^2 \phi + o(\rho^{-3})$$

$$\partial_{y_2} \partial_{y_2} \phi = (ik)^2 \left(\frac{y_2-\eta}{\rho_2}\right)^2 \phi + o(\rho^{-3})$$

$$\partial_{y_1} \phi = ik \left(\frac{y_1-\eta}{\rho_1}\right) \phi + o(\rho^{-3})$$

$$\partial_z \phi = ik(z-\zeta) \left(\frac{1}{\rho_1} + \frac{1}{\rho_2}\right) \phi + o(\rho^{-3})$$

Hereinafter, a complicated term of o (*) is omitted. In accordance with the sum of four differential equations of the second order, expression (2-1-6) below is obtained.

[Math. 41]

$$\Delta_4 \phi = \left(\partial_x^2 + \partial_{y_1}^2 + \partial_{y_2}^2 + \partial_z^2\right) \phi \qquad (2\text{-}1\text{-}6)$$

$$= (ik)^2 \left\{2 + 2\frac{(x-\xi)^2 + (z-\zeta)^2}{\rho_1 \rho_2}\right\} \phi$$

Accordingly, expression (2-1-7) below is obtained from expression (2-1-6).

[Math. 42]

$$\{\Delta_4 - 2(ik)^2\} \phi = 2(ik)^2 \frac{\rho_1^2 - (y_1-\eta)^2}{\rho_1 \rho_2} \qquad (2\text{-}1\text{-}7)$$

$$= 2(ik)^2 \frac{\rho_2^2 - (y_2-\eta)^2}{\rho_1 \rho_2} \phi$$

By acting the operator on the right-hand side of expression (2-1-7) two times, expression (2-1-8) below is obtained.

[Math. 43]

$$\{\Delta_4 - 2(ik)^2\}^2 \phi = 4(ik)^4 \frac{\{\rho_1^2 - (y_1-\eta)^2\}\{\rho_2^2 - (y_2-\eta)^2\}}{\rho_1^2 \rho_2^2} \phi \qquad (2\text{-}1\text{-}8)$$

$$= 4(ik)^4 \{1 - (ik)^{-2} \partial_{y_1}^2\}\{1 - (ik)^{-2} \partial_{y_2}^2\} \phi$$

Expression (2-1-8) is summarized to obtain expression (2-1-9) below.

[Math. 44]

$$\left[\frac{1}{4}\{\Delta_4 - 2(ik)^2\}^2 - \partial_{y_1}^2 \partial_{y_2}^2 + (ik)^2 \left(\partial_{y_1}^2 + \partial_{y_2}^2\right) - (ik)^4\right] \phi = 0 \qquad (2\text{-}1\text{-}9)$$

Although expression (2-1-9) is derived assuming a steady state, it is easy to extend expression (2-1-9) to a non-steady state. Thus, variables are substituted as given by expression (2-1-10) below, using partial differential $\partial_t$ with respect to time t and using propagation velocity c of radio waves.

[Math. 45]

$$-ik \rightarrow \frac{1}{c} \partial_t \qquad (2\text{-}1\text{-}10)$$

Through the process described above, an equation represented by expression (2-1-11) below is ultimately obtained.

[Math. 46]

$$\left\{\Delta_4^2 - \frac{4}{c^2}\left(\partial_t^2 \partial_x^2 + \partial_t^2 \partial_z^2\right) - 4\partial_{y_1}^2 \partial_{y_2}^2\right\} \phi = 0 \qquad (2\text{-}1\text{-}11)$$

$$\Delta_4 = \partial_x^2 + \partial_{y_1}^2 + \partial_{y_2}^2 + \partial_z^2$$

Expression (2-1-11) described above is a partial differential equation that has φ in expression (2-1-3) as a solution. By applying differentiation to the kernel of expression (2-1-2), φ    [Math. 47]

of expression (2-1-2) also satisfies the partial differential equation described above. This equation is a four-dimensional pseudo wave equation configured by five variables (t, x, $y_1$, $y_2$, z).

Next, this equation is solved by Fourier transformation. First,

φ    [Math. 48]

is subjected to multiplex Fourier transform with respect to t, x, $y_1$, $y_2$ as given by expression (2-1-12) below.

[Math. 49]

$$\tilde{\varphi}(k_x, k_{y_1}, k_{y_2}, z, \omega) = \qquad (2\text{-}1\text{-}12)$$

$$\int_{-\infty}^{\infty} e^{i\omega t} dt \int_{-\infty}^{\infty}\int_{-\infty}^{\infty}\int_{-\infty}^{\infty} e^{i(k_x x + k_{y_1} y_1 + k_{y_2} y_2)} \varphi(x, y_1, y_2, z, t) dx dy_1 dy_2$$

When differentiation with respect to z is expressed as $D_z$, expression (2-1-13) below is obtained from expressions (2-1-11) and (2-1-12).

[Math. 50]

$$\{(D_z^2 - k_x^2 - k_{y_1}^2 - k_{y_2}^2)^2 + 4k^2(D_z^2 - k_x^2) - 4k_{y_1}^2 k_{y_2}^2\} \tilde{\varphi} = 0 \qquad (2\text{-}1\text{-}13)$$

Here, the relationship of ω=ck is used. Four basic solutions to this equation are expressed as given by expression (2-1-14) below.

[Math. 51]

$$E_1 = e^{i\left\{\sqrt{\left(\sqrt{k^2 - k_{y_1}^2} + \sqrt{k^2 - k_{y_2}^2}\right)^2 - k_x^2}\right\} z} \qquad (2\text{-}1\text{-}14)$$

$$E_2 = e^{-i\left\{\sqrt{\left(\sqrt{k^2 - k_{y_1}^2} + \sqrt{k^2 - k_{y_2}^2}\right)^2 - k_x^2}\right\} z}$$

$$E_3 = e^{i\left\{\sqrt{\left(\sqrt{k^2 - k_{y_1}^2} - \sqrt{k^2 - k_{y_2}^2}\right)^2 - k_x^2}\right\} z}$$

$$E_4 = e^{-i\left\{\sqrt{\left(\sqrt{k^2 - k_{y_1}^2} - \sqrt{k^2 - k_{y_2}^2}\right)^2 - k_x^2}\right\} z}$$

Considering the facts that the time factor is $e^{-i\omega t}$, the phase is added using the path of radiated radio waves, and radio waves reflected off the object are bounced off toward a measurement surface (measurement plane), $E_1$ is the unique meaningful solution. Therefore, expression (2-1-15) below is obtained.

[Math. 52]

$$\varphi(k_x, k_{y_1}, k_{y_2}, z, k) = \qquad (2\text{-}1\text{-}15)$$
$$a(k_x, k_{y_1}, k_{y_2}, k)e^{i\left\{\sqrt{\left(\sqrt{k^2-k_{y_1}^2}+\sqrt{k^2-k_{y_2}^2}\right)^2-k_x^2}\right\}z}$$

By substituting z=0 in expression (2-1-15), a $(k_x, k_{y1}, k_{y2}, k)$ is obtained as given by expression (2-1-16) below.

[Math. 53]

$$a(k_x,k_{y_1},k_{y_2},k)=\tilde{\varphi}(k_x,k_{y_1},k_{y_2},0,k) \qquad (2\text{-}1\text{-}16)$$

Ultimately, $$\varphi \qquad \text{[Math. 54]}$$

is obtained as given by expression (2-1-17) below.

[Math. 55]

$$\varphi(x, y_1, y_2, z, k) = \qquad (2\text{-}1\text{-}17)$$
$$\frac{1}{(2\pi)^3} \int_{-\infty}^{\infty}\int_{-\infty}^{\infty}\int_{-\infty}^{\infty} e^{-i(k_x x+k_{y_1} y_1+k_{y_2} y_2)} a(k_x, k_{y_1}, k_{y_2}, k) \cdot$$
$$e^{i\left\{\sqrt{\left(\sqrt{k^2-k_{y_1}^2}+\sqrt{k^2-k_{y_2}^2}\right)^2-k_x^2}\right\}z} dk_x dk_{y_1} dk_{y_2}$$

By applying a limit operation $(y_2 \to y_1 = y)$ to expression (2-1-17) on condition that k and z are fixed and integrating the result with respect to k, the imaging function is obtained as given by expression (2-1-18) below.

[Math. 56]

$$\phi(x, y, y, z, k) = \underset{y_2 \to y_1 = y}{\text{Lim}} [\phi(x, y, y_2, z, k)] \qquad (2\text{-}1\text{-}18)$$
$$= \underset{y_2 \to y_1 = y}{\text{Lim}} \left[ \frac{1}{(2\pi)^3} \int_{-\infty}^{\infty}\int_{-\infty}^{\infty}\int_{-\infty}^{\infty} e^{-i(k_x x+k_{y_1} y+k_{y_2} y_2)} \right.$$
$$a(k_x, k_{y_1}, k_{y_2}, k) \cdot$$
$$\left. e^{i\left\{\sqrt{\left(\sqrt{k^2-k_{y_1}^2}+\sqrt{k^2-k_{y_2}^2}\right)^2-k_1^2}\right\}z} dk_x dk_{y_1} dk_{y_2} \right]$$

$$\rho(x, y, z) = \int_0^{\infty} \phi(x, y, y, z, k) dk$$

As described above, it becomes possible to analytically solve a multistatic inverse scattering problem with a one-dimensional array. However, there is the considerable constraint that transmitting elements and receiving elements be arranged in a one-dimensional array. Besides, there are hardware challenges such as a requirement for provision of a gap in order to avoid inductive coupling between transmitting elements and receiving elements, and an inability to switch the role of transmission and reception when an active balun is employed. Furthermore, there is also a challenge that the time required to acquire data becomes long due to difficulty in parallelization of measurements.

<II-2. MS Inverse Scattering Theory Applied to Backscattering and One-Dimensional Array Near Curved Boundary>

An inverse scattering theory for the case where a region has a curved boundary surface will be described.

Figure 6:
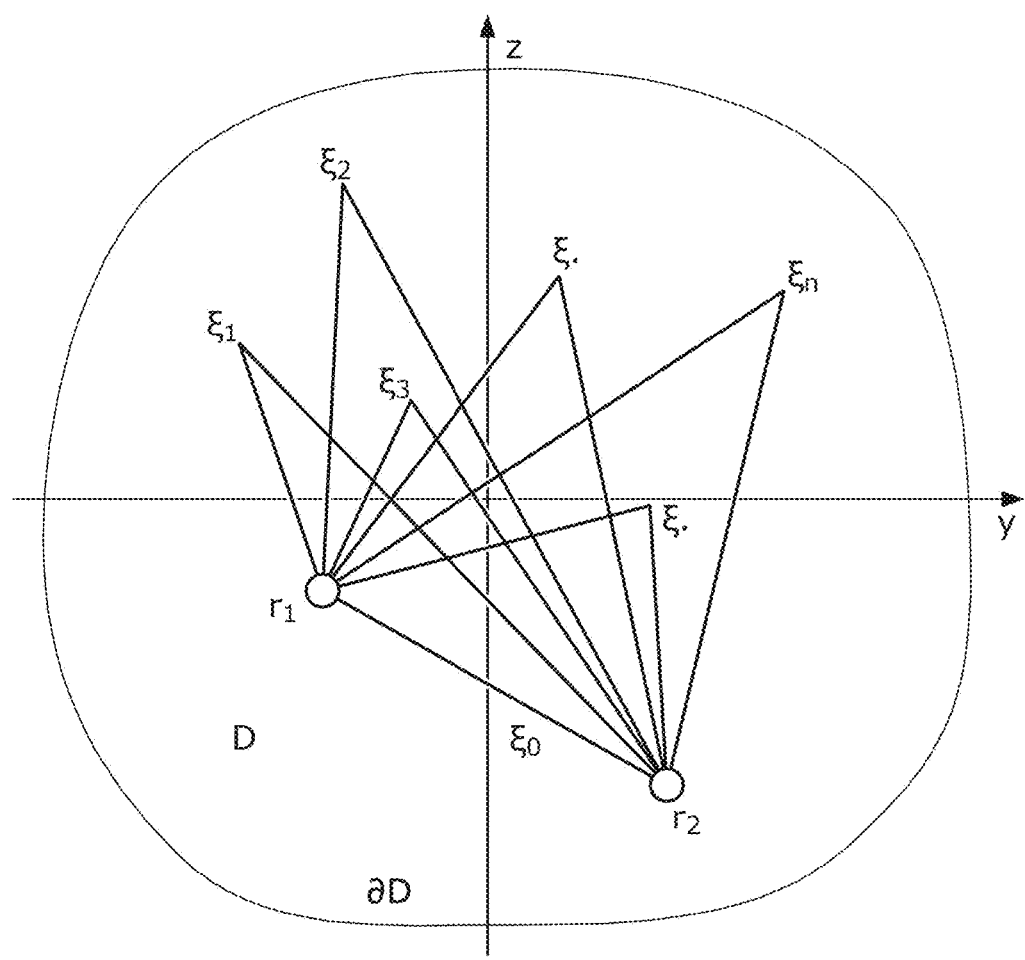
FIG. 6 is a conceptual diagram showing the relationship between a transmission point and a reception point.

FIG. 6 is a conceptual diagram showing the relationship between a transmission point and a reception point. FIG. 6 shows a situation in which a wave radiated from point $r_1$ is reflected at point $\xi$ ($\xi_1$, $\xi_2$, . . . ) and returns to point $r_2$.

For example, transmission point $r_1$ and reception point $r_2$ of the wave freely and independently move in x-section D while satisfying a certain constraint on condition that angular frequency $\omega$ (=2$\pi$f) is constant. If data obtained at this time is expressed as function G ($r_1$, $r_2$, $\omega$), function G ($r_1$, $r_2$, $\omega$) is supposed to be related to the distribution of reflection points in the region.

Here, G ($r_1$, $r_2$, $\omega$) is the sum of reflected signals from all points $\xi$. Since there is a large number of reflection points in the region, G ($r_1$, $r_2$, $\omega$) may be represented by expression (2-2-1) below.

[Math. 57]

$$G(r_1, r_2, \omega) = \iiint_D \varphi(r_1 \to r_2, \omega) d\xi \qquad (2\text{-}2\text{-}1)$$

Here, $$\varphi(r_1 \to \xi \to r_2, \omega) \qquad \text{[Math. 58]}$$

represents the signal strength of the wave that comes out from point $r_1$ and returns to point $r_2$ by being reflected at point $\xi$.

The constraint imposed on transmission point $r_1$ and reception point $r_2$ of the wave is that points $r_1$ and $r_2$ always have the same x coordinate.

Hereinafter, a theoretical structure of an inverse scattering problem will be described using function G ($r_1$, $r_2$, $\omega$). Here, a partial region in a three-dimensional space is expressed as D, and a boundary of the partial region is expressed as $\partial$D. In this case, function G ($r_1$, $r_2$, $\omega$) becomes a solution in region D to the differential equation as given by expression (2-2-2) below.

[Math. 59]

$$L\left(\frac{\partial}{\partial t}, \frac{\partial}{\partial r_1}, \frac{\partial}{\partial r_2}\right) \overline{G}(r_1, r_2, t) = 0 \qquad (2\text{-}2\text{-}2)$$

Here,

[Math. 60]

$$\overline{G}(r_1, r_2, t)$$

represents the function obtained by Fourier transform of function G ($r_1$, $r_2$, $\omega$) with respect to $\omega$. The value of G ($r_1$, $r_2$, $\omega$) at boundary $\partial$D is the value measured by the receiving elements. The above equation is solved under this boundary condition. From this result, $\rho$(r) is defined as given by expression (2-2-3) below.

[Math. 61]

$$\rho(r) = \underset{t \to 0}{\text{Lim}} [Tr[\overline{G}(r_1, r_2, t)]] = \overline{G}(r, r, 0) \qquad (2\text{-}2\text{-}3)$$

Here, Tr represents the trace operation. This $\rho$(r) is the function relating to the gradient of the dielectric constant that is to be obtained in region D. In actuality, it is difficult to obtain differential operator L ($\partial/\partial t$, $\partial/\partial r_1$, $\partial/\partial r_2$) appearing here.

Hereinafter, a method for obtaining this differential operator will be described. On an arbitrary curve, $r_1$ and $r_2$ do not always have the same y and z coordinates. Specifically, $r_1$ and $r_2$ are respectively expressed as follows: $r_1$=(x, $y_1$, $z_1$) and $r_2$=(x, $y_2$, $z_2$). Then, function G is defined as follows.

[Math. 62]

$$G(r_1, r_2, \omega) = \iiint_D \varphi(r_1 \to r_2, \omega) d\xi \qquad (2\text{-}2\text{-}4)$$

Next, an equation satisfied by function G ($r_1$, $r_2$, $\omega$) is examined. Here, $\omega$=ck. Also, c represents the velocity of propagation and k represents the wave number. When $\lambda$ represents the wavelength, the relationship of k=2n/$\lambda$ holds true.

Figure 7:
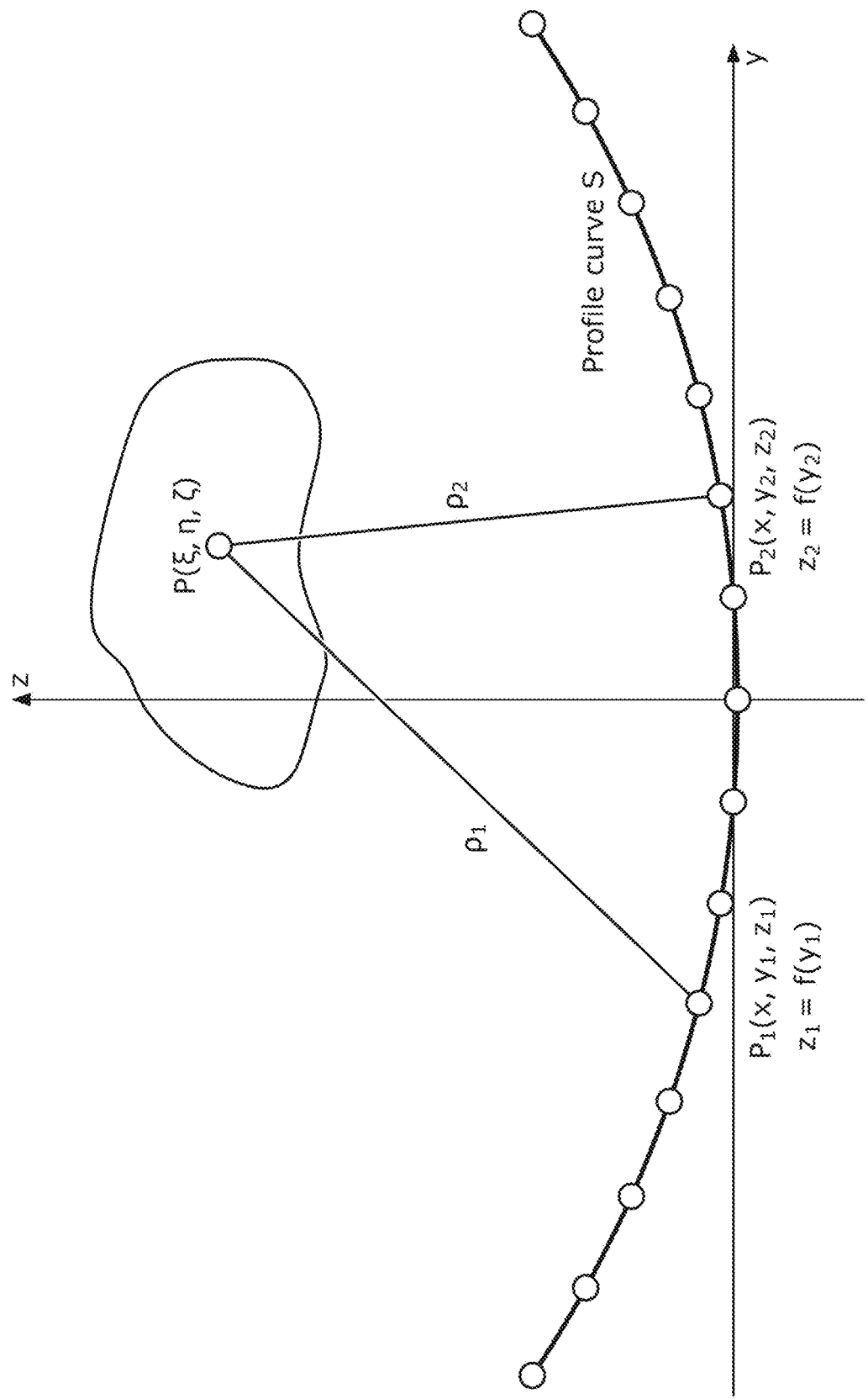
FIG. 7 is a conceptual diagram showing coordinates of a transmission point and a reception point.

FIG. 7 is a conceptual diagram showing the coordinates of a transmission point and a reception point. In FIG. 7, the transmission point is located at $P_1$ (x, $y_1$, $z_1$) and the reception point is located at $P_2$ (x, $y_2$, $z_2$). The wave radiated from transmission point $P_1$ is reflected at point P ($\xi$, $\eta$, $\zeta$) and reaches reception point $P_2$.

For example, $z_1$ and $z_2$ are arbitrary. Measurement points that correspond to transmission point $P_1$ and reception point $P_2$ move on profile curve S. Profile curve S may be expressed by z=f(y). Thus, $z_1$=f($y_1$) and $z_2$=f($y_2$) hold true. The distance between $P_1$ and P is expressed as $\rho_1$, and the distance between $P_2$ and P is expressed as $\rho_2$.

In the above-described case, function $\varphi$ as given by expression (2-2-5) below is introduced as the scattering field function.

[Math. 63]

$$\phi(x, y_1, y_2, z_1, z_2, \omega) = \iint_D \frac{e^{ik\rho_1}}{\rho_1} \frac{e^{ik\rho_2}}{\rho_2} \varepsilon(\xi, \eta, \zeta) d\xi d\eta d\zeta \qquad (2\text{-}2\text{-}5)$$

$$\rho_1 = \sqrt{(x-\xi)^2 + (y_1-\eta)^2 + (z_1-\zeta)^2}$$

$$\rho_2 = \sqrt{(x-\xi)^2 + (y_2-\eta)^2 + (z_2-\zeta)^2}$$

Here, $\varepsilon$ ($\xi$, $\eta$, $\zeta$) represents the function of the dielectric constant at point ($\xi$, $\eta$, $\zeta$) and corresponds to the reflectance at point ($\xi$, $\eta$, $\zeta$). Point ($\xi$, $\eta$, $\zeta$) corresponds to the reflection point. Note that $\varepsilon$ ($\xi$, $\eta$, $\zeta$) is unknown. Also, k represents the wave number. It is assumed that the time factor is proportional to exp(–i$\omega$t). The function in the integrand term of expression (2-2-5) described above corresponds to:

$\varphi$ [Math. 64]

in expression (2-2-1). That is, expression (2-2-6) below holds true.

[Math. 65]

$$\varphi = \frac{e^{ik\rho_1}}{\rho_1} \frac{e^{ik\rho_2}}{\rho_2} \varepsilon(\xi, \eta, \zeta) \qquad (2\text{-}2\text{-}6)$$

Next, a partial differential equation that has expression (2-2-6) as an asymptotical solution at high frequency is examined. Thus, calculation is performed while ignoring a high-order term with respect to 1/$\rho$ obtained as a result of differentiation. Here, an abridged notation for differentiation is defined as expression (2-2-7) below.

[Math. 66]

$$\frac{\partial}{\partial t} \to \partial_t, \frac{\partial}{\partial x} \to \partial_x, \frac{\partial}{\partial y_1} \to \partial_{y_1}, \qquad (2\text{-}2\text{-}7)$$

$$\frac{\partial}{\partial y_2} \to \partial_{y_2}, \frac{\partial}{\partial z_1} \to \partial_{z_1}, \frac{\partial}{\partial z_2} \to \partial_{z_2}$$

As a result of the calculation, the fact that $\varphi$ satisfies expression (2-2-8) below is derived.

[Math. 67]

$$\left[\frac{1}{4}\Delta_5^2 - (ik)^2 \partial_x^2 - (\partial_{y_1}^2 + \partial_{z_1}^2)(\partial_{y_2}^2 + \partial_{z_2}^2)\right]\phi = 0 \qquad (2\text{-}2\text{-}8)$$

Although expression (2-2-8) is derived assuming a steady state, it is easy to extend expression (2-2-8) to a non-steady state. Thus, variables are substituted as given by expression (2-2-9) below.

[Math. 68]

$$-ik \to \frac{1}{c}\partial_t \qquad (2\text{-}2\text{-}9)$$

Ultimately, expression (2-2-10) below is obtained.

[Math. 69]

$$\left[\frac{1}{4}\Delta_5^2 - \frac{1}{c^2}\partial_t^2 \partial_x^2 - (\partial_{y_1}^2 \partial_x^2 - (\partial_{y_1}^2 + \partial_{z_1}^2)(\partial_{y_2}^2 + \partial_{z_2}^2)\right]\phi = 0 \qquad (2\text{-}2\text{-}10)$$

Next, a solution to expression (2-2-10) is examined on the assumption that the time factor of $\varphi$ is proportional to exp(–i$\omega$t). First, expression (2-2-11) below is obtained by multiplex Fourier transform of $\varphi$ with respect to t, x, $y_1$, and $y_2$.

[Math. 70]

$$\tilde{\phi}(k_x, k_{y_1}, k_{y_2}, z_1, z_2, \omega) = \qquad (2\text{-}2\text{-}11)$$

$$\int_{-\infty}^{\infty} e^{i\omega t} dt \int_{-\infty}^{\infty} e^{ik_{y_1} y_1} dy_1 \int_{-\infty}^{\infty} e^{ik_{y_2} y_2} dy_2 \int_{-\infty}^{\infty} e^{ik_x x} \phi(x, y_1, y_2, z_1, z_2, t) dx$$

By expressing partial differentials with respect to $z_1$ and $z_2$ as $D_{z_1}$ and $D_{z_2}$, respectively, expression (2-2-12) below is obtained.

[Math. 71]

$$\{(D_{z_1}^2 + D_{z_2}^2 - k_x^2 - k_{y_1}^2 - k_{y_2}^2)^2 - 4k^2 k_x^2 - 4(D_{z_1}^2 - k_{y_1}^2)(D_{z_2}^2 - k_{y_2}^2)\} \qquad (2\text{-}2\text{-}12)$$

$$\tilde{\phi} = 0$$

Next, solving the equation given by expression (2-2-12) is examined. However, there are two variables $z_1$ and $z_2$. Thus, it is difficult to solve the equation given by expression (2-2-12) unless boundary conditions are given to a region with one-dimensional degree of freedom in ($z_1$, $z_2$) space with respect to fixed point (x, $y_1$, $y_2$) or ($k_x$, $k_{y_1}$, $k_{y_2}$).

However, boundary conditions obtained by radar measurement are merely given at one point ($f(y_1)$, $f(y_2)$) in ($z_1$, $z_2$) space.

To solve this problem, consistency between the theory used in the case where $z_1=z$ and $z_2=z$ and the theory described in this chapter is used. That is, the solution derived from the theory described in this chapter, in which $z_1$ and $z_2$ are independent, includes the solution derived in the special case where $z_1=z$ and $z_2=z$. In view of this, firstly, a solution to expression (2-2-12) is assumed as given by expression (2-2-13) below.

[Math. 72]

$$E(k_x, k_{y_1}, k_{y_2}, z_1, z_2) = \exp(is_1 z_1)\exp(is_2 z_2) \qquad (2\text{-}2\text{-}13)$$

When $z_1 = z_2 = z$, expression (2-2-14) below is obtained.

[Math. 73]

$$E(k_x, k_{y_1}, k_{y_2}, z_1, z_2) = \exp\{i(s_1 + s_2)z\} \qquad (2\text{-}2\text{-}14)$$

By substituting expression (2-2-14) in expression (2-2-12), expression (2-2-15) below is obtained.

[Math. 74]

$$(s_1^2 + s_2^2 + k_x^2 + k_{y_1}^2 + k_{y_2}^2)^2 - 4k^2 k_x^2 - 4(s_1^2 + k_{y_1}^2)(s_2^2 + k_{y_2}^2) = 0 \qquad (2\text{-}2\text{-}15)$$

Another equation is further used. Specifically, expression (2-2-16) below is obtained from expression (2-1-15) in the previous chapter in accordance with the consistency described above.

[Math. 75]

$$s_1 + s_2 = \sqrt{\left(\sqrt{k^2 - k_{y_1}^2} + \sqrt{k^2 - k_{y_2}^2}\right)^2 - k_x^2} \qquad (2\text{-}2\text{-}16)$$

From expressions (2-2-15) and (2-2-16), $s_1$ ($k_x$, $k_{y_1}$, $k_{y_2}$) and $s_2$ ($k_x$, $k_{y_1}$, $k_{y_2}$) are determined as given by expression (2-2-17) below.

[Math. 76]

$$s_1(k_x, k_{y_1}, k_{y_2}, k) = \qquad (2\text{-}2\text{-}17)$$

$$\frac{\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_2(k_x, k_{y_1}, k_{y_2}, k) = \frac{\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

Using $s_1$ ($k_x$, $k_{y_1}$, $k_{y_2}$, $k$) and $s_2$ ($k_x$, $k_{y_1}$, $k_{y_2}$, $k$) described above, a solution to the equation given by expression (2-2-10) is derived as given by expression (2-2-18) below.

[Math. 77]

$$\phi(x, y_1, y_2, z_1, z_2, k) = \qquad (2\text{-}2\text{-}18)$$

$$\frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)} a(k_x, k_{y_1}, k_{y_2}, k) \cdot$$

$$e^{is_1(k_x, k_{y_1}, k_{y_2}, k)z_1} e^{is_2(k_x, k_{y_1}, k_{y_2}, k)z_2} dk_x dk_{y_1} dk_{y_2}$$

<II-3. MS Inverse Scattering Theory Applied to Forward Scattering and One-Dimensional Array Near Plane Boundary>

Figure 8:
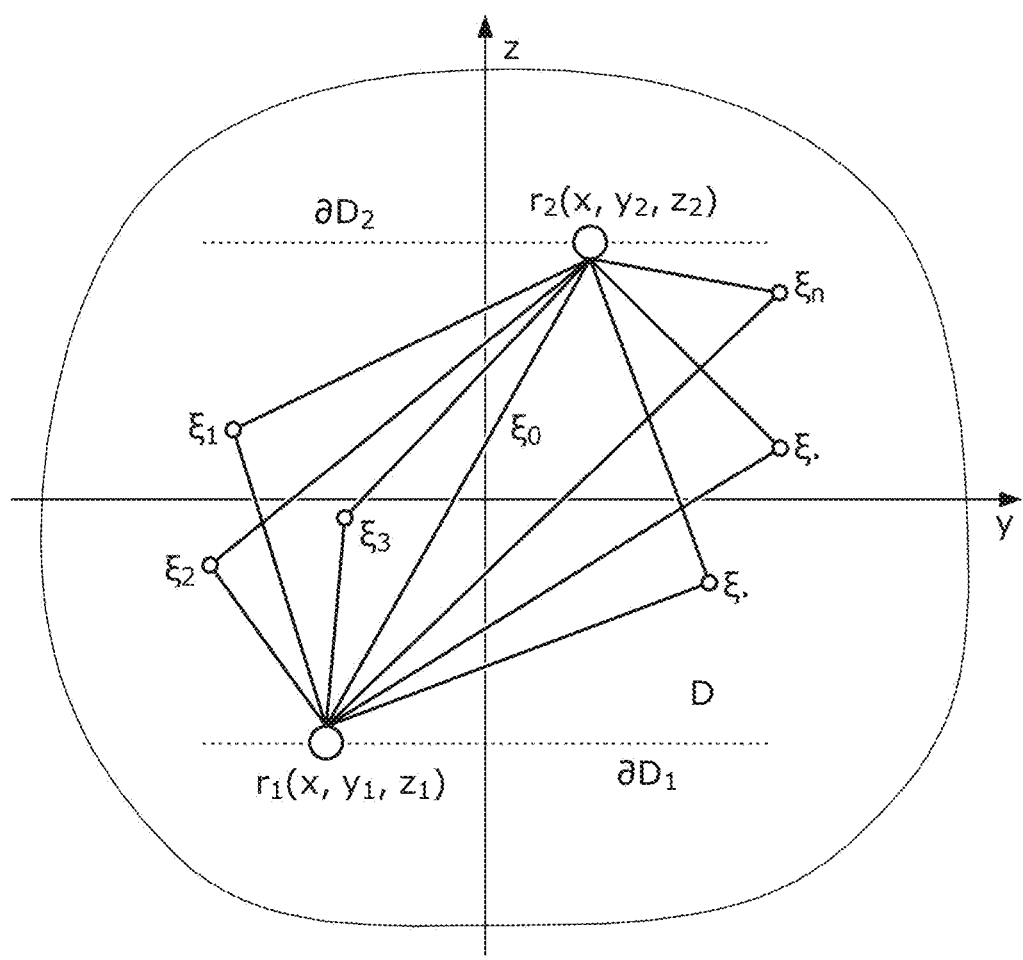
FIG. 8 is a conceptual diagram showing the relationship between a transmission point and a reception point in the case of forward scattering.

FIG. 8 is a conceptual diagram showing the relationship between a transmission point and a reception point during forward scattering. Forward scattering differs from backscattering (II-2) in that the z coordinates of all scattered points are included between the z coordinates of transmission point $r_1$ and reception point $r_2$. Scattering data is measured as a result of points $r_1$ and $r_2$ moving freely over $\partial D_1$ and $\partial D_2$, respectively, under the constraint that $r_1$ and $r_1$ be located at the same x coordinate. The scattering field function according to this system is defined by expression (2-3-1) below.

[Math. 78]

$$\phi(x, y_1, y_2, z_1, z_2, \omega) = \iint_D \frac{e^{ik\rho_1}}{\rho_1}\frac{e^{-ik\rho_2}}{\rho_2}\varepsilon(\xi, \eta, \zeta)d\xi d\eta d\zeta \qquad (2\text{-}3\text{-}1)$$

$$\rho_1 = \sqrt{(x-\xi)^2 + (y_1 - \eta)^2 + (z_1 - \zeta)^2}$$

$$\rho_2 = \sqrt{(x-\xi)^2 + (y_2 - \eta)^2 + (z_2 - \zeta)^2}$$

This expression differs from expression (2-2-5) used in the example of backscattering in that the phase factor of $\exp(-ik\rho_2)/\rho_2$ under the integral sign is negative. However, the scattering field function satisfies a partial differential equation given by expression (2-3-2) below that is the same as expression (2-2-10) used in the example of backscattering.

[Math. 79]

$$\left[\frac{1}{4}\Delta_5^2 - \frac{1}{c^2}\partial_t^2 \partial_x^2 - (\partial_{y_1}^2 + \partial_{z_1}^2)(\partial_{y_2}^2 + \partial_{z_2}^2)\right]\phi = 0 \qquad (2\text{-}3\text{-}2)$$

Next, a solution to expression (2-3-2) is examined on the assumption that the time factor of $\varphi$ is proportional to $\exp(-i\omega t)$. First, the following expression is obtained by multiplex Fourier transform of $\varphi$ with respect to t, x, $y_1$, and $y_2$.

[Math. 80]

$$\tilde{\phi}(k_x, k_{y_1}, k_{y_2}, z_1, z_2, \omega) = \qquad (2\text{-}3\text{-}3)$$

$$\int_{-\infty}^{\infty} e^{i\omega t}dt \int_{-\infty}^{\infty} e^{ik_{y_1} y_1}dy_1 \int_{-\infty}^{\infty} e^{ik_{y_2} y_2}dy_2 \int_{-\infty}^{\infty} e^{ik_x x}\phi(x, y_1, y_2, z_1, z_2, t)dx$$

By expressing partial differentials with respect to $z_1$ and $z_2$ as $D_{z1}$ and $D_{z2}$, respectively, expression (2-3-4) below is obtained.

[Math. 81]

$$\{(D_{z_1}^2 + D_{z_2}^2 - k_x^2 - k_{y_1}^2 - k_{y_2}^2)^2 - 4k^2 k_x^2 - 4(D_{z_1}^2 - k_{y_1}^2)(D_{z_2}^2 - k_{y_2}^2)\}\tilde{\phi} = 0 \quad (2\text{-}3\text{-}4)$$

Next, solving the equation given by expression (2-3-4) is examined. However, there are two variables $z_1$ and $z_2$. To solve this problem, consistency between the theory used in the case where $z_1=z$ and $z_2=z$ and the theory described in this chapter is used. That is, the solution derived from the theory described in this chapter, in which $z_1$ and $z_2$ are independent, includes the solution derived in the special case where $z_1=z$ and $z_2=z$. In view of this, firstly, a solution to expression (2-3-4) is assumed as given by expression (2-3-5) below.

[Math. 82]

$$E(k_x, k_{y_1}, k_{y_2}, z_1, z_2) = \exp(is_1 z_1)\exp(-is_2 z_2) \quad (2\text{-}3\text{-}5)$$

Expression (2-3-6) below is obtained from expression (2-3-4).

[Math. 83]

$$(s_1^2 + s_2^2 + k_x^2 + k_{y_1}^2 + k_{y_2}^2)^2 - 4k^2 k_x^2 - 4(s_1^2 + k_{y_1}^2)(s_2^2 + k_{y_2}^2) = 0 \quad (2\text{-}3\text{-}6)$$

When $z_1=z_2=z$, expression (2-3-5) is expressed as given by expression (2-3-7) below.

[Math. 84]

$$E(k_x, k_{y_1}, k_{y_2}, z_1, z_2) = \exp\{i(s_1 - s_2)z\} \quad (2\text{-}3\text{-}7)$$

Then, expression (2-3-8) below is obtained in the same manner as expression (2-2-16).

[Math. 85]

$$s_1 - s_2 = \sqrt{\left(\sqrt{k^2 - k_{y_1}^2} + \sqrt{k^2 - k_{y_2}^2}\right)^2 - k_x^2} \quad (2\text{-}3\text{-}8)$$

From expressions (2-3-6) and (2-3-8), $s_1$ $(k_x, k_{y_1}, k_{y_2})$ and $s_2$ $(k_x, k_{y_1}, k_{y_2})$ are determined as given by expression (2-3-9) below.

[Math. 86]

$$s_1(k_x, k_{y_1}, k_{y_2}, k) = \frac{\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_2(k_x, k_{y_1}, k_{y_2}, k) = \frac{\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$(2\text{-}3\text{-}9)$$

Accordingly, the scattering field function is obtained as given by expression (2-3-10) below.

[Math. 87]

$$\phi(x, y_1, y_2, z_1, z_2, k) = \frac{1}{(2\pi)^3}\int_{-\infty}^{\infty}\int_{-\infty}^{\infty}\int_{-\infty}^{\infty} e^{-j(k_x x + k_{y_1} y_1 + k_{y_2} y_2)} a(k_x, k_{y_1}, k_{y_2}, k) \cdot$$

$$e^{is_1(k_x, k_{y_1}, k_{y_2}, k)z_1} e^{-is_2(k_x, k_{y_1}, k_{y_2}, k)z_2} dk_x dk_{y_1} dk_{y_2} \quad (2\text{-}3\text{-}10)$$

Next, the z coordinate of $\partial D_1$ is defined as $z=0$, and the z coordinate of $\partial D_2$ is defined as $z=h$. When scattering data measured from the boundary surface is expressed as $\Phi$ $(x, y_1, y_2, k)$, expression (2-3-11) below holds true.

[Math. 88]

$$\Phi(x, y_1, y_2, k) = \frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)} a(k_x, k_{y_1}, k_{y_2}, k) \cdot$$

$$e^{-is_2(k_x, k_{y_1}, k_{y_2}, k)h} dk_x dk_{y_1} dk_{y_2} \quad (2\text{-}3\text{-}11)$$

Then, expression (2-3-12) below is obtained by Fourier transform of both sides of expression (2-3-11) with respect to $(x, y_1, y_2)$.

[Math. 89]

$$\iiint e^{ik'_x x + ik'_{y_1} y_1 + ik'_{y_2} y_2} \Phi(x, y_1, y_2, k) dx dy_1 dy_2 =$$

$$\iiint e^{ik'_x x + ik'_{y_1} y_1 + ik'_{y_2} y_2} \cdot \left\{\frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)}\right.$$

$$\left. a(k_x, k_{y_1}, k_{y_2}, k) e^{-is_2(k_x, k_{y_1}, k_{y_2}, k)h} dk_x dk_{y_1} dk_{y_2}\right\} \cdot dx dy_1 dy_2 =$$

$$a(k'_x, k'_{y_1}, k'_{y_2}, k) e^{-is_2(k'_x, k'_{y_1}, k'_{y_2}, k)h} \quad (2\text{-}3\text{-}12)$$

From expression (2-3-12) described above, function a is obtained as given by expression (2-3-13) below.

[Math. 90]

$$a(k_x, k_{y_1}, k_{y_2}, k) = e^{is_2(k_x, k_{y_1}, k_{y_2}, k)h}\Phi(k_x, k_{y_1}, k_{y_2}, k) \quad (2\text{-}3\text{-}13)$$

By substituting expression (2-3-13) described above in expression (2-3-10), the scattering field function is obtained as given by expression (2-3-14) below.

[Math. 91]

$$\phi(x, y_1, y_2, z_1, z_2, k) = \frac{1}{(2\pi)^3}\int_{-\infty}^{\infty}\int_{-\infty}^{\infty}\int_{-\infty}^{\infty} e^{-i(k_x x + k_{y_1} y_1 + k_{y_2} y_2)}\Phi(k_x, k_{y_1}, k_{y_2}, k) \cdot$$

$$e^{is_1(k_x, k_{y_1}, k_{y_2}, k)z_1} e^{is_2(k_x, k_{y_1}, k_{y_2}, k)(h-z_2)} dk_x dk_{y_1} dk_{y_2} \quad (2\text{-}3\text{-}14)$$

<II-4. MS Inverse Scattering Theory Applied to Two-Dimensional Array Near Plane Boundary>

First, a theory for the case of an existing two-dimensional array will be described.

Figure 9:
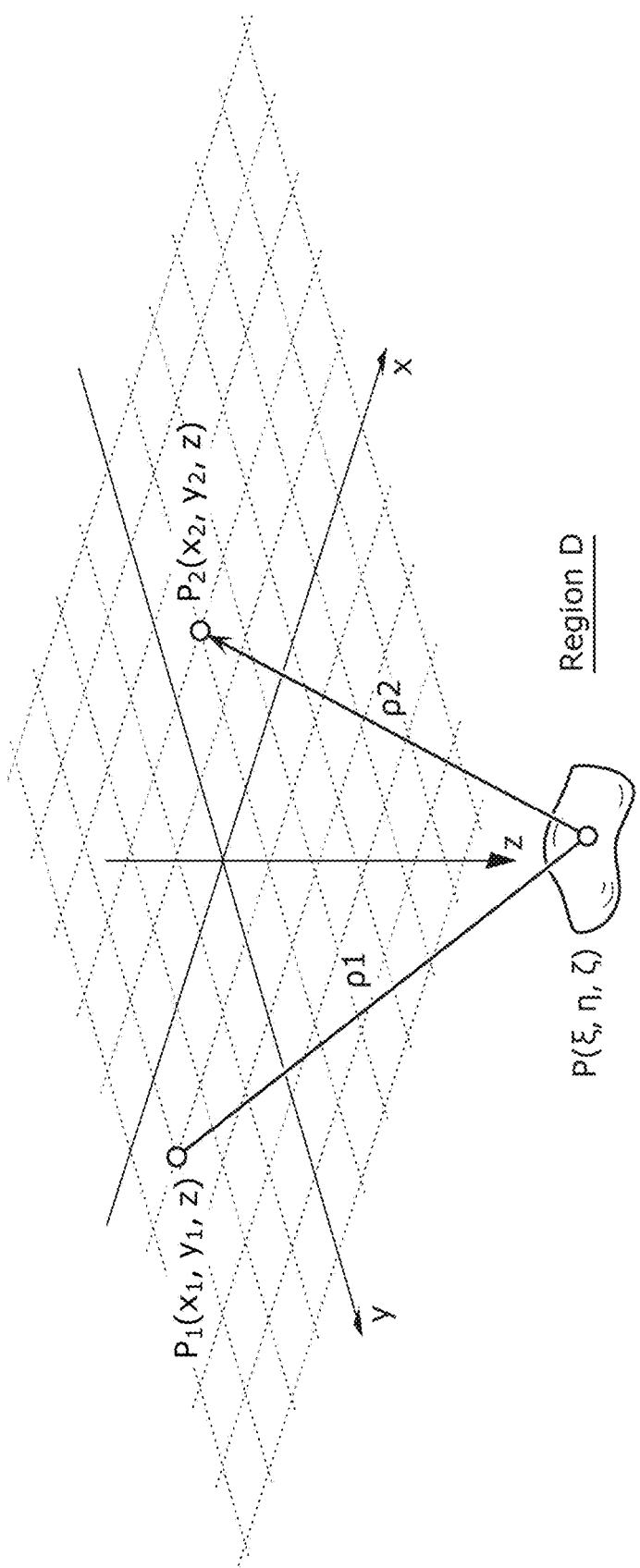
FIG. 9 is a conceptual diagram showing the relationship between a transmission point and a reception point on a plane.

FIG. 9 is a conceptual diagram showing the relationship between a transmission point and a reception point in a plane. As shown in FIG. 9, a microwave radiated from point $P_1$ is reflected at point P on a target and received at point $P_2$. Points $P_1$ and $P_2$ move to arbitrary points on a grading (two-dimensional antenna array) in a plane. Under this assumption, there are $n^4$ different microwave paths passing through point P on the target. This large number of paths considerably contributes to an improvement in the quality of an ultimate image. A method for processing such complex data to obtain an image will be described below.

For example, as shown in FIG. 9, the radio wave radiated from point $P_1$ ($x_1$, $y_1$, z) is reflected at point P ($\xi$, $\eta$, $\zeta$) and received at point $P_2$ ($x_2$, $y_2$, z). When point P is assumed to move in entire region D, a signal received at $P_2$ is expressed by the following expression.

[Math. 92]

$$\phi(x_1, y_1, x_2, y_2, z) = \iiint_D \frac{e^{ik\rho_1}}{\rho_1} \frac{e^{ik\rho_2}}{\rho_2} \varepsilon(\xi, \eta, \zeta) d\xi d\eta d\zeta \quad (2\text{-}4\text{-}1)$$

$$\rho_1 = \sqrt{(x_1 - \xi)^2 + (y_1 - \eta)^2 + (z - \zeta)^2}$$

$$\rho_2 = \sqrt{(x_2 - \xi)^2 + (y_2 + \eta)^2 + (z - \zeta)^2}$$

It is assumed here that the time factor is proportional to $\exp(-i\omega t)$. The kernel function in the integrand term of the above expression is expressed as given by expression (2-4-2) below.

[Math. 93]

$$\varphi = \frac{e^{ik\rho_1}}{\rho_1} \frac{e^{ik\rho_2}}{\rho_2} \quad (2\text{-}4\text{-}2)$$

Next, a partial differential equation that has expression (2-4-2) as an asymptotical solution at short wavelengths is examined. Thus, calculation is performed while ignoring a high-order term with respect to $1/\rho$ obtained as the result of differentiation. Here, an abridged notation for differentiation is defined by expression (2-4-3).

[Math. 94]

$$\frac{\partial}{\partial t} \to \partial_t, \frac{\partial}{\partial x_1} \to \partial_{x_1}, \frac{\partial}{\partial x_2} \to \partial_{x_2}, \quad (2\text{-}4\text{-}3)$$

$$\frac{\partial}{\partial y_1} \to \partial_{y_1}, \frac{\partial}{\partial y_2} \to \partial_{y_2}, \frac{\partial}{\partial z} \to \partial_z$$

Using expression (2-4-3), differentiation of each order of the kernel function is expressed as given by expression (2-4-4) below.

[Math. 95]

$$\partial_{x_1} \varphi = ik \frac{x_1 - \xi}{\rho_1} \varphi + o(\rho^{-3}) \quad \partial_{x_2} \varphi = ik \frac{x_2 - \xi}{\rho_2} \varphi + o(\rho^{-3}) \quad (2\text{-}4\text{-}4)$$

-continued $$\partial_{y_1} \varphi = ik \frac{y_1 - \eta}{\rho_1} \varphi + o(\rho^{-3}) \quad \partial_{y_2} \varphi = ik \frac{y_2 - \eta}{\rho_2} \varphi + o(\rho^{-3})$$

$$\partial_z \varphi = ik(z - \zeta)\left(\frac{1}{\rho_1} + \frac{1}{\rho_2}\right)\varphi + o(\rho^{-3})$$

$$\partial_{x_1} \partial_{x_1} \varphi = (ik)^2 \left(\frac{x_1 - \xi}{\rho_1}\right)^2 \varphi + o(\rho^{-3})$$

$$\partial_{y_1} \partial_{y_1} \varphi = (ik)^2 \left(\frac{y_1 - \eta}{\rho_1}\right)^2 \varphi + o(\rho^{-3})$$

$$\partial_{x_2} \partial_{x_2} \varphi = (ik)^2 \left(\frac{x_2 - \xi}{\rho_2}\right)^2 \varphi + o(\rho^{-3})$$

$$\partial_{y_2} \partial_{y_2} \varphi = (ik)^2 \left(\frac{y_2 - \eta}{\rho_2}\right)^2 \varphi + o(\rho^{-3})$$

$$\partial_z \partial_z \varphi = (ik)^2 (z - \zeta)^2 \left(\frac{1}{\rho_1} + \frac{1}{\rho_2}\right)^2 \varphi + o(\rho^{-3})$$

Hereinafter, a complicated term of o (*) is omitted. In accordance with the sum of five differential equations of the second order, expression (2-4-5) below is obtained.

[Math. 96]

$$\Delta_5 \varphi = \left(\partial_{x_1}^2 + \partial_{y_1}^2 + \partial_{x_2}^2 + \partial_{y_2}^2 + \partial_z^2\right)\varphi = (ik)^2 \left\{2 + 2\frac{(z-\zeta)^2}{\rho_1 \rho_2}\right\}\varphi \quad (2\text{-}4\text{-}5)$$

Accordingly, expression (2-4-6) below is obtained from expression (2-4-5).

[Math. 97]

$$\{\Delta_5 - 2(ik)^2\}\varphi = 2(ik)^2 \frac{(z-\zeta)^2}{\rho_1 \rho_2} \varphi \quad (2\text{-}4\text{-}6)$$

$$= 2(ik)^2 \frac{\rho_1^2 - (x_1 - \xi)^2 - (y_1 - \eta)^2}{\rho_1 \rho_2} \varphi$$

$$= 2(ik)^2 \frac{\rho_2^2 - (x_2 - \xi)^2 - (y_2 - \eta)^2}{\rho_1 \rho_2} \varphi$$

By acting the operator on the right-hand side of the above-described expression two times, expression (2-4-7) below is obtained.

[Math. 98]

$$\{\Delta_5 - 2(ik)^2\}^2 \varphi = \quad (2\text{-}4\text{-}7)$$

$$4(ik)^4 \frac{\{\rho_1^2 - (x_1 - \xi)^2 - (y_1 - \eta)^2\}\{\rho_2^2 - (x_2 - \xi)^2 - (y_2 - \eta)^2\}}{\rho_1^2 \rho_2^2} \varphi =$$

$$4(ik)^4 \{1 - (ik)^{-2}\partial_{x_1}^2 - (ik)^{-2}\partial_{y_1}^2\}\{1 - (ik)^{-2}\partial_{x_2}^2 - (ik)^{-2}\partial_{y_2}^2\}\varphi$$

Expression (2-4-7) is summarized to obtain expression (2-4-8) below.

[Math. 99]

$$\left[\frac{1}{4}\{\Delta_5 - 2(ik)^2\}^2 - \left(\partial_{x_1}^2 + \partial_{y_1}^2\right)\left(\partial_{x_2}^2 + \partial_{y_2}^2\right) + \quad (2\text{-}4\text{-}8)\right.$$

$$\left.(ik)^2\left(\partial_{x_1}^2 + \partial_{y_1}^2 + \partial_{x_2}^2 + \partial_{y_2}^2\right) - (ik)^4\right]\varphi = 0$$

Although expression (2-4-8) is derived assuming a steady state, it is easy to extend expression (2-4-8) to a non-steady state. Thus, variables are substituted as given by expression (2-4-9) below.

[Math. 100]

$$-ik \rightarrow \frac{1}{c}\partial t \qquad (2\text{-}4\text{-}9)$$

By this substitution, expression (2-4-8) is converted into expression (2-4-10) below that includes time.

[Math. 101]

$$\left\{\Delta_5^2 - \frac{4}{c^2}\partial_t^2\partial_z^2 - 4(\partial_{x_1}^2 + \partial_{y_1}^2)(\partial_{x_2}^2 + \partial_{y_2}^2)\right\}\varphi = 0 \qquad (2\text{-}4\text{-}10)$$

$$\Delta_5 = \partial_{x_1}^2 + \partial_{y_1}^2 + \partial_{x_2}^2 + \partial_{y_2}^2 + \partial_z^2$$

Expression (2-4-10) described above is a partial differential equation that has the kernel function given by expression (2-4-2) as a solution, and φ also satisfies the above-described partial differential equation by applying differentiation to the kernel of expression (2-4-2). This equation is a five-dimensional pseudo wave equation configured by six variables (t, $x_1$, $y_1$, $x_2$, $y_2$, z).

Next, this equation is solved by Fourier transform. First, φ is subjected to multiplex Fourier transform with respect to t, $x_1$, $y_1$, $x_2$, and $y_2$ as given by expression (2-4-11) below.

[Math. 102]

$$\tilde{\phi}(k_{x_1}, k_{y_1}, k_{x_2}, k_{y_2}, z, \omega) = \qquad (2\text{-}4\text{-}11)$$

$$\int_{-\infty}^{\infty} e^{i\omega t} dt \int\int\int\int_{-\infty}^{\infty} e^{i(k_{x_1} x_1 + k_{y_1} y_1)} e^{i(k_{x_2} x_2 + k_{y_2} y_2)}$$

$$\phi(x_1, y_1, x_2, y_2, z, t) dx_1 dy_1, dx_2, dy_2$$

When the differential with respect to z is expressed as $D_z$, expression (2-4-12) below is obtained from expressions (2-4-10) and (2-4-11).

[Math. 103]

$$\left\{(D_z^2 - k_{x_1}^2 - k_{y_1}^2 - k_{x_2}^2 - k_{y_2}^2)^2 + 4k^2 D_z^2 - 4(k_{x_1}^2 + k_{y_1}^2)(k_{x_2}^2 + k_{y_2}^2)\right\} \qquad (2\text{-}4\text{-}12)$$

$$\tilde{\phi} = 0$$

Here, the relationship of ω=ck is used. Four basic solutions to this equation are expressed as given by expression (2-4-13) below.

[Math. 104]

$$E_1 = e^{i\left\{\sqrt{k^2 - k_{x_1}^2 - k_{y_1}^2} + \sqrt{k^2 - k_{x_2}^2 - k_{y_2}^2}\right\}z} \qquad (2\text{-}4\text{-}13)$$

$$E_2 = e^{-i\left\{\sqrt{k^2 - k_{x_1}^2 - k_{y_1}^2} - \sqrt{k^2 - k_{x_2}^2 - k_{y_2}^2}\right\}z}$$

$$E_3 = e^{i\left\{\sqrt{k^2 - k_{x_1}^2 - k_{y_1}^2} - \sqrt{k^2 - k_{x_2}^2 - k_{y_2}^2}\right\}z}$$

$$E_4 = e^{-i\left\{\sqrt{k^2 - k_{x_1}^2 - k_{y_1}^2} - \sqrt{k^2 - k_{x_2}^2 - k_{y_2}^2}\right\}z}$$

Considering the facts that the time factor is $e^{-i\omega t}$, the phase is added using the path of radiated radio waves, and radio waves reflected off the object are bounced off toward a measurement plane, $E_1$ is the unique meaningful solution. Accordingly, expression (2-4-14) below is obtained.

[Math. 105]

$$\tilde{\phi}(k_{x_1}, k_{y_1}, k_{x_2}, k_{y_2}, z, k) = \qquad (2\text{-}4\text{-}14)$$

$$a(k_{x_1}, k_{y_1}, k_{x_2}, k_{y_2}, k) e^{i\left\{\sqrt{k^2 - k_{x_1}^2 - k_{y_1}^2} + \sqrt{k^2 - k_{x_2}^2 - k_{y_2}^2}\right\}z}$$

By substituting z=0 in expression (2-4-14), a ($k_{x_1}$, $k_{y_1}$, $k_{x_2}$, $k_{y_2}$, k) is obtained as given by expression (2-4-15) below.

[Math. 106]

$$a(k_{x_1},k_{y_1},k_{x_2},k_{y_2},k)=\tilde{\phi}(k_{x_1},k_{y_1},k_{x_2},k_{y_2},0,k) \qquad (2\text{-}4\text{-}15)$$

From the above, φ is obtained as given by expression (2-4-16) below.

[Math. 107]

$$\phi(x_1, y_1, x_2, y_2, z, k) \qquad (2\text{-}4\text{-}16)$$

$$= \frac{1}{(2\pi)^4} \int\int\int\int_{-\infty}^{\infty} e^{-i(k_{x_1} x_1 + k_{y_1} y_1)}$$

$$e^{-i(k_{x_2} x_2 + k_{y_2} y_2)} e^{i\left\{\sqrt{k^2 - k_{x_1}^2 - k_{y_1}^2} + \sqrt{k^2 - k_{x_2}^2 - k_{y_2}^2}\right\}z} \cdot$$

$$a(k_{x_1}, k_{y_1}, k_{x_2}, k_{y_2}, k) dk_{x_1} dk_{y_1} dk_{x_2} dk_{y_2}$$

Next, by applying a limit operation ($y_1 \rightarrow y$ and $y_2 \rightarrow y$) to expression (2-4-16) on condition that k and z are fixed, expression (2-4-17) below is obtained.

[Math. 108]

$$\Phi(x, y, z, k) = \phi(x, y, x, y, z, k) \qquad (2\text{-}4\text{-}17)$$

$$= \lim_{\substack{x_2 \rightarrow x_1 = x \\ y_2 \rightarrow y_1 = y}} [\phi(x_1, y_1, x_2, y_2, z, k)]$$

$$= \lim_{\substack{x_2 \rightarrow x_1 = x \\ y_2 \rightarrow y_1 = y}} \frac{1}{(2\pi)^4} \int\int\int\int_{-\infty}^{\infty} e^{-i(k_{x_1} x_1 + k_{y_1} y_1)} e^{-i(k_{x_2} x_2 + k_{y_2} y_2)}$$

-continued
$$e^{iz\left\{\sqrt{k^2-k_{x_1}^2-k_{y_1}^2}+\sqrt{k^2-k_{x_2}^2-k_{y_2}^2}\right\}}.$$
$$a(k_{x_1},k_{y_1},k_{x_2},k_{y_2},k)dk_{x_1}dk_{y_1}dk_{x_2}dk_{y_2}]$$

Next, expression (2-4-17) is integrated with respect to k to obtain expression (2-4-18) below as an imaging function.

[Math. 109]

$$\rho(x,y,z) = \int_0^\infty \Phi(x,y,z,k)dk \qquad (2-4-18)$$

$$= \int_0^\infty \phi(x,y,x,y,z,k)dk$$

$$= \lim_{\substack{x_2 \to x_1 = x \\ y_2 \to y_1 = y}} \left[ \int_0^\infty \phi(x_1,y_1,x_2,y_2,z,k)dk \right]$$

$$= \lim_{\substack{x_2 \to x_1 = x \\ y_2 \to y_1 = y}} \left[ \frac{1}{(2\pi)^4} \int_0 \int_{-\infty}^\infty \int_{-\infty}^\infty \int_{-\infty}^\infty \int_{-\infty}^\infty \right.$$

$$e^{-i(k_{x_1}x_1+k_{y_1}y_1)}e^{-i(k_{x_2}x_2+k_{y_2}y_2)}$$

$$e^{iz\left\{\sqrt{k^2-k_{x_1}^2-k_{y_1}^2}+\sqrt{k^2-k_{x_2}^2-k_{y_2}^2}\right\}}.$$

$$a(k_{x_1},k_{y_1},k_{x_2},k_{y_2},k)dk_{x_1}dk_{y_1}dk_{x_2}dk_{y_2}dk\bigg]$$

In expression (2-4-18), the integration with respect to $k_{x1}$, $k_{y1}$, $k_{x2}$, and $k_{y2}$ are in the form of Fourier transform and suitable for processing performed by a calculator. On the other hand, the term exp (iz . . . ) of the integrated is not in the form of Fourier transform. Thus, ordinary integration is done with respect to k while specifying, for example, the value of z. Alternatively, in order to reduce the calculation time, expression (2-4-18) may be modified so as to express the whole by only Fourier transform.

For example, the coefficient of iz in the term exp (iz . . . ) of expression (2-4-17) is expressed by expression (2-4-19) below using new variable u.

[Math. 110]

$$u = \sqrt{k^2-k_{x_1}^2-k_{y_1}^2} + \sqrt{k^2-k_{x_2}^2-k_{y_2}^2} \qquad (2-4-19)$$

By rationalizing the right-hand side of expression (2-4-19), expression (2-4-20) below is obtained.

[Math. 111]

$$\frac{k_{x_2}^2+k_{y_2}^2-k_{x_1}^2-k_{y_1}^2}{u} = \sqrt{k^2-k_{x_1}^2-k_{y_1}^2} - \sqrt{k^2-k_{x_2}^2-k_{y_2}^2} \qquad (2-4-20)$$

By solving each square root from the two expressions including expressions (2-4-19) and (2-4-20), expression (2-4-21) below is obtained.

[Math. 112]

$$2\sqrt{k^2-k_{x_1}^2-k_{y_1}^2} = u + \frac{k_{x_2}^2+k_{y_2}^2-k_{x_1}^2-k_{y_1}^2}{u} \qquad (2-4-21)$$

-continued
$$2\sqrt{k^2-k_{x_2}^2-k_{y_2}^2} = u - \frac{k_{x_2}^2+k_{y_2}^2-k_{x_1}^2-k_{y_1}^2}{u}$$

Accordingly, k is expressed as given by expression (2-4-22) below.

[Math. 113]

$$k = \frac{1}{2}\sqrt{u^2 + \frac{(k_{x_2}^2+k_{y_2}^2-k_{x_1}^2-k_{y_1}^2)^2}{u^2} + 2(k_{x_2}^2+k_{y_2}^2+k_{x_1}^2+k_{y_1}^2)} \qquad (2-4-22)$$

Next, expression (2-4-23) below is obtained by differentiation of both sides of expression (2-4-19) with respect to k and u.

[Math. 114]

$$du = kdk\left(\frac{1}{\sqrt{k^2-k_{x_1}^2-k_{y_1}^2}} + \frac{1}{\sqrt{k^2-k_{x_2}^2-k_{y_2}^2}}\right) \qquad (2-4-23)$$

By solving dk from expression (2-4-23), expression (2-4-24) below is obtained.

[Math. 115]

$$dk = \frac{1}{ku}\sqrt{k^2-k_{x_1}^2-k_{y_1}^2}\sqrt{k^2-k_{x_2}^2-k_{y_2}^2} \qquad (2-4-24)$$

At last in summary, expression (2-4-18) is converted as given by expression (2-4-25) below.

[Math. 116]

$$\rho(x,y,z) = \int_0^\infty \Phi(x,y,z,k)dk = \int_0^\infty \phi(x,y,x,y,z,k)dk = \qquad (2-4-25)$$

$$\lim_{\substack{x_2 \to x_1 = x \\ y_2 \to y_1 = y}} \left[\int_0^\infty \phi(x_1,y_1,x_2,y_2,z,k)dk\right] =$$

$$\lim_{\substack{x_2 \to x_1 = x \\ y_2 \to y_1 = y}} \left[\frac{1}{(2\pi)^4} \int_0 \int_{-\infty}^\infty \int_{-\infty}^\infty \int_{-\infty}^\infty \int_{-\infty}^\infty e^{-i(k_{x_1}x_1+k_{y_1}y_1)} e^{-i(k_{x_2}x_2+k_{y_2}y_2)}\right.$$

$$e^{izu} \cdot a(k_{x_1},k_{y_1},k_{x_2},k_{y_2},k)dk_{x_1}dk_{y_1}dk_{x_2}dk_{y_2}dk\bigg]$$

When this result is applied to a semi-two-dimensional array antenna array described in the overview, the dimension of the integral becomes higher by an amount corresponding to $dk_{x2}$. Accordingly, a calculation time that is nowhere near real-time calculation is required for the computational ability of an existing calculator.

<II-5. MS Inverse Scattering Theory Applied to Two-Dimensional Array Near Curved Boundary>

Figure 10:
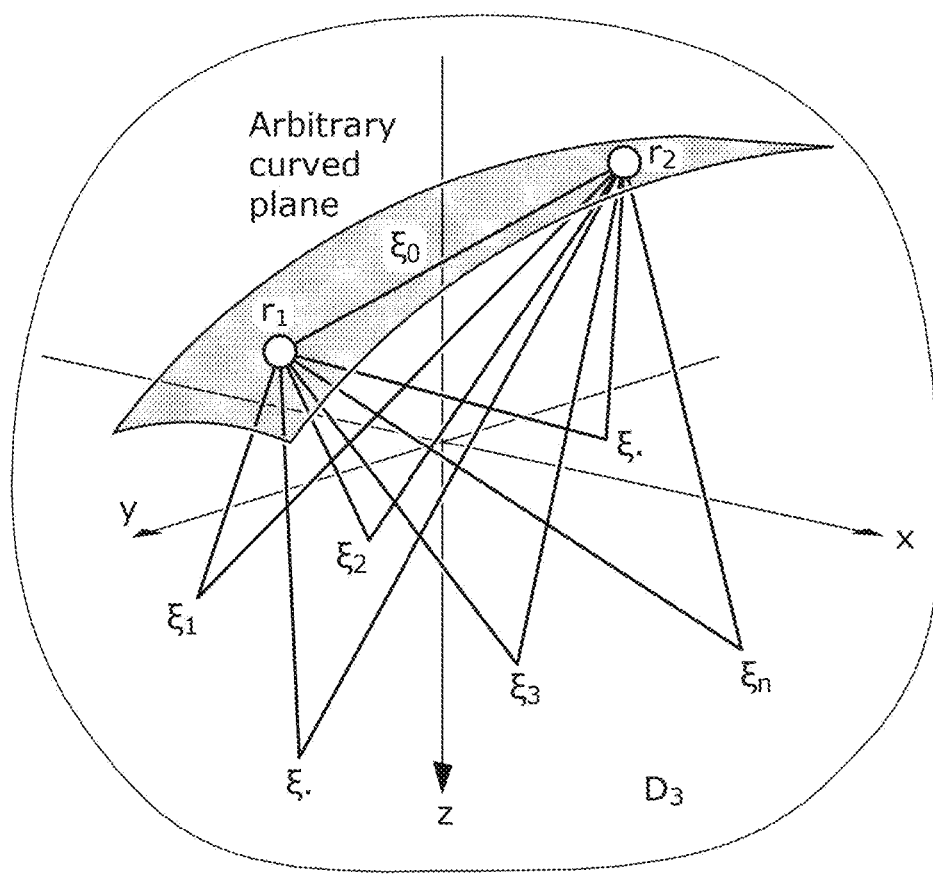
FIG. 10 is a conceptual diagram showing the relationship between a transmission point and a reception point on a curved plane.

FIG. 10 is a conceptual diagram showing the relationship between a transmission point and a reception point on a curved plane. Since boundary conditions for curved plane are used, it is assumed that the transmission point and the reception point have different z coordinates. Accordingly, the scattering field function is expressed as given by expression (2-5-1) below.

[Math. 117]

$$\varphi(x_1, y_1, x_2, y_2, z_1, z_2, \omega) = \iint_D \frac{e^{ik\rho_1}}{\rho_1} \frac{e^{ik\rho_2}}{\rho_2} \varepsilon(\xi, \eta, \zeta) d\xi d\eta d\zeta \quad (2\text{-}5\text{-}1)$$

$$\rho_1 = \sqrt{(x_1 - \xi)^2 + (y_1 - \eta)^2 + (z_1 - \zeta)^2}$$

$$\rho_2 = \sqrt{(x_2 - \xi)^2 + (y_2 - \eta)^2 + (z_2 - \zeta)^2}$$

Here, k represents the wave number. It is assumed that the time factor is proportional to exp(−iωt). Also, D represents the region and corresponds to $D_3$ in FIG. 10. The kernel function in the integrand term of the above expression is expressed as given by expression (2-5-2) below.

[Math. 118]

$$\varphi = \frac{e^{ik\rho_1}}{\rho_1} \frac{e^{ik\rho_2}}{\rho_2} \varepsilon(\xi, \eta, \varsigma) \quad (2\text{-}5\text{-}2)$$

Next, a partial differential equation that has expression (2-5-2) as a solution, excluding regions in close vicinity of the transmission point and the reception point, is examined. Thus, calculation is performed while ignoring a high-order term with respect to 1/ρ obtained as a result of differentiation. Here, an abridged notation for differentiation is defined by expression (2-5-3) below.

[Math. 119]

$$\frac{\partial}{\partial t} \to \partial_t, \frac{\partial}{\partial x_1} \to \partial_{x_1}, \frac{\partial}{\partial x_2} \to \partial_{x_2}, \frac{\partial}{\partial y_1} \to \partial_{y_1}, \quad (2\text{-}5\text{-}3)$$

$$\frac{\partial}{\partial y_2} \to \partial_{y_2}, \frac{\partial}{\partial z_1} \to \partial_{z_1}, \frac{\partial}{\partial z_2} \to \partial_{z_2}$$

In this case, the fact that the kernel function satisfies the equation given by expression (2-5-4) below is derived by similar calculation to that in the previous chapter.

[Math. 120]

$$\{\Delta_6 - 2(ik)^2\}\varphi = \{(\partial_{x_1}^2 + \partial_{x_2}^2 + \partial_{y_1}^2 + \partial_{y_2}^2 + \partial_{z_1}^2 + \partial_{z_2}^2) - 2(ik)^2\}\varphi = 0 \quad (2\text{-}5\text{-}4)$$

Assuming that the time factor is proportional to exp(−iωt), a solution to expression (2-5-4) described above is examined. First, the kernel function is subjected to multiplex Fourier transform with respect to t, $x_1$, $x_2$, $y_1$, and $y_2$ to obtain the following expression.

[Math. 121]

$$\hat{\varphi}(k_{x_1}, k_{y_1}, k_{x_2}, k_{y_2}, z_1, z_2, \omega) = \int_{-\infty}^{\infty} e^{i\omega t} dt \int_{-\infty}^{\infty} e^{ik_{y_1} y_1} dy_1 \quad (2\text{-}5\text{-}5)$$

$$\int_{-\infty}^{\infty} e^{ik_{y_2} y_2} dy_2 \int_{-\infty}^{\infty} e^{ik_{x_1} x_1} dx_1 \int_{-\infty}^{\infty} e^{ik_{x_2} x_2} \varphi(x_1, y_1, x_2, y_2, z_1, z_2, t) dx_2$$

Like expression (2-4-12) in the previous chapter, expression (2-5-6) below is obtained from expression (2-5-4).

[Math. 122]

$$\{(D_{z_1}^2 + D_{z_2}^2 - k_{x_1}^2 - k_{x_2}^2 - k_{y_1}^2 - k_{y_2}^2) + 2k^2\}\hat{\varphi} = 0 \quad (2\text{-}5\text{-}6)$$

Next, solving this equation is examined. However, there are two variables $z_1$ and $z_2$. Thus, it is difficult to solve the equation given by expression (2-5-6) unless boundary conditions are given to a region with one-dimensional degree of freedom in ($z_1$, $z_2$) space with respect to fixed point ($x_1$, $x_2$, $y_1$, $y_2$) or ($k_{x1}$, $k_{x2}$, $k_{y1}$, $k_{y2}$). However, boundary conditions obtained by radar measurement are merely given at one point {f($x_1$, $y_1$), f($x_2$, $y_2$)} in ($z_1$, $z_2$) space.

To solve this problem, consistency between the theory used in the case where $z_1$=z and $z_2$=z and the theory described in this chapter is used. That is, the solution derived from the theory described in this chapter, in which $z_1$ and $z_2$ are independent, includes the solution derived in the special case where $z_1$=z and $z_2$=z. In view of this, firstly, a solution to expression (2-5-6) is assumed as given by expression (2-5-7) below.

[Math. 123]

$$E(k_{x_1}, k_{x_2}, k_{y_1}, k_{y_2}, z_1, z_2) = \exp(is_1 z_1)\exp(is_2 z_2) \quad (2\text{-}5\text{-}7)$$

In accordance with expressions (2-5-6) and (2-5-7) and the consistency described above, expressions (2-5-8) and (2-5-9) below are obtained.

[Math. 124]

$$s_1^2 + s_2^2 + k_{x_1}^2 + k_{x_2}^2 + k_{y_1}^2 + k_{y_2}^2 - 2k^2 - = 0 \quad (2\text{-}5\text{-}8)$$

[Math. 125]

$$s_1 + s_2 = \sqrt{k^2 - k_{x_1}^2 - k_{y_1}^2} + \sqrt{k^2 - k_{x_2}^2 - k_{y_2}^2} \quad (2\text{-}5\text{-}9)$$

From these equations, $s_1$ and $s_2$ are obtained as given by expression (2-5-10) below.

[Math. 126]

$$s_1 = \sqrt{k^2 - k_{x_1}^2 - k_{y_1}^2} \quad (2\text{-}5\text{-}10)$$
$$s_2 = \sqrt{k^2 - k_{x_2}^2 - k_{y_2}^2}$$

Using $s_1$ ($k_x$, $k_{y1}$, $k_{y2}$) and $s_2$ ($k_x$, $k_{y1}$, $k_{y2}$) described above, a solution to the equation is expressed as given by expression (2-5-11) below.

[Math. 127]

$$\varphi(x_1, y_1, x_2, y_2, z_1, z_2, k) = \frac{1}{(2\pi)^4} \quad (2\text{-}5\text{-}11)$$

$$\int_{-\infty}^{\infty}\int_{-\infty}^{\infty}\int_{-\infty}^{\infty}\int_{-\infty}^{\infty} e^{-i(k_{x_1}x_1+k_{y_1}y_1+k_{x_2}x_2+k_{y_2}y_2)} a(k_{x_1}, k_{y_1}, k_{x_2}, k_{y_2}) \cdot$$

$$e^{is_1(k_{x_1},k_{y_1},k_{x_2},k_{y_2})z_1} e^{is_2(k_{x_1},k_{y_1},k_{x_2},k_{y_2})z_2} dk_{x_1} dk_{y_1} dk_{x_2} dk_{y_2}$$

Moreover, an equation on curved plane S may be assumed as given by, for example, expression (2-5-12) below.

[Math. 128]

$$z = f(x, y) \quad (2\text{-}5\text{-}12)$$

Boundary conditions given on curved plane S are expressed as given by expression (2-5-13) below.

[Math. 129]

$$\varphi(x_1, y_1, x_2, y_2, f(x_1, y_1), f(x_2, y_2), k) = \frac{1}{(2\pi)^4} \quad (2\text{-}5\text{-}13)$$

$$\int_{-\infty}^{\infty}\int_{-\infty}^{\infty}\int_{-\infty}^{\infty}\int_{-\infty}^{\infty} e^{-i(k_{x_1}x_1+k_{y_1}y_1+k_{x_2}x_2+k_{y_2}y_2)} a(k_{x_1}, k_{y_1}, k_{x_2}, k_{y_2}) \cdot$$

$$e^{i\{s_1(k_{x_1},k_{y_1},k_{x_2},k_{y_2})f(x_1,y_1)+s_2(k_{x_1},k_{y_1},k_{x_2},k_{y_2})f(x_2,y_2)\}}$$

$$dk_{x_1} dk_{y_1} dk_{x_2} dk_{y_2}$$

The equation given by expression (2-5-13) is used to determine a $(k_{x_1}, k_{x_2}, k_{y_1}, k_{y_2})$. Hereinafter, an abridged notation as given by expression (2-5-14) below is used.

[Math. 130]

$$a(k) = a(k_{x_1}, k_{x_2}, k_{y_1}, k_{x_2}) \quad (2\text{-}5\text{-}14)$$
$$s_1(k) = s_1(k_{x_1}, k_{x_2}, k_{y_1}, k_{y_2})$$
$$s_2(k) = s_2(k_{x_1}, k_{x_2}, k_{y_1}, k_{y_2})$$

Using the abridged notation given by expression (2-5-14), an integral equation with respect to a (k), as given by expression (2-5-15) below, is derived.

[Math. 131]

$$\varphi(x_1, x_2, y_1, y_2, f(x_1, y_1), f(x_2, y_2), k) = \quad (2\text{-}5\text{-}15)$$

$$\frac{1}{(2\pi)^4}\int_{-\infty}^{\infty}\int_{-\infty}^{\infty}\int_{-\infty}^{\infty}\int_{-\infty}^{\infty} e^{-i(k_{x_1}x_1+k_{x_2}x_2+k_{y_1}y_1+k_{y_2}y_2)}$$

$$a(k)e^{i(s_1(k)f(x_1,y_1)+s_2(k)f(x_2,y_2))} dk$$

Once a (k) is obtained from expression (2-5-15) described above, the scattering field function can be expressed as given by expression (2-5-16) below.

[Math. 132]
$$\varphi(x_1, y_1, x_2, y_2, z_1, z_2, k) = \quad (2\text{-}5\text{-}16)$$

$$\frac{1}{(2\pi)^4}\int_{-\infty}^{\infty}\int_{-\infty}^{\infty}\int_{-\infty}^{\infty}\int_{-\infty}^{\infty} e^{-i(k_{x_1}x_1+k_{y_1}y_1+k_{x_2}x_2+k_{y_2}y_2)} a(k)e^{is_1(k)z_1} e^{is_2(k)z_2} dk$$

By applying $z_1 = z_2 = z$ to expression (2-5-16) described above and performing Fourier transform with respect to k, the imaging function is obtained as given by expression (2-5-17) below.

[Math. 133]

$$\rho(r) = \lim_{t \to 0} \left[ \frac{1}{2\pi} \int_{-\infty}^{\infty} \varphi(x, y, x, y, z, z, k) e^{-ickt} dk \right] \quad (2\text{-}5\text{-}17)$$

Through the above-described process, ultimate imaging function $\rho(r)$ is obtained.

<III. S-Array Scattering Field Theory>
<III-1. S-Array Scattering Field Theory Applied to Plane Boundary and Semi-Two-Dimensional Array>

Here, the configuration shown in FIG. 3 is used. Also, expression (2-4-10) relating to a two-dimensional array is used as the starting point for examination. Expression (3-1-1) below is the same as expression (2-4-10).

[Math. 134]

$$\left\{ \Delta_5^2 - \frac{4}{c^2} \partial_t^2 \partial_z^2 - 4(\partial_{x_1}^2 + \partial_{y_1}^2)(\partial_{x_2}^2 + \partial_{y_2}^2) \right\} \varphi = 0 \quad (3\text{-}1\text{-}1)$$

$$\Delta_5 = \partial_{x_1}^2 + \partial_{y_1}^2 + \partial_{x_2}^2 + \partial_{y_2}^2 + \partial_z^2$$

Also, Fourier transform of $$\varphi \quad \text{[Math. 135]}$$

with respect to t, $x_1$, $y_1$, and $y_2$ is expressed as given by expression (3-1-2) below.

[Math. 136]

$$\tilde{\varphi}(k_{x_1}, k_{y_1}, x_2, k_{y_2}, z, k) = \quad (3\text{-}1\text{-}2)$$

$$\int_{-\infty}^{\infty} e^{ickt} dt \int_{-\infty}^{\infty} \int_{-\infty}^{\infty} \int_{-\infty}^{\infty} e^{i(k_{x_1} x_1 + k_{y_1} y_1 + k_{y_2} y_2)} \varphi(x_1, y_1, x_2, y_2, z, t) dx_1 dy_1 dy_2$$

In the following description, variable $x_2$ may be expressed as u. Expression (3-1-3) below is obtained by Fourier transform of both sides of expression (3-1-1) with respect to t, $x_1$, $y_1$, and $y_2$.

[Math. 137]

$$\left\{ (\partial_u^2 + \partial_z^2 - k_{x_1}^2 - k_{y_1}^2 - k_{y_2}^2)^2 + 4k^2 \partial_z^2 + 4(k_{x_1}^2 + k_{y_1}^2)(\partial_u^2 - k_{y_2}^2) \right\} \tilde{\varphi} = 0 \quad (3\text{-}1\text{-}3)$$

A solution to expression (3-1-3) described above, which is the two-dimensional partial differential equation with respect to u and z, is assumed as given by expression (3-1-4) below.

[Math. 138]

$$\varphi \propto e^{s_3 u} e^{s_4 z} \quad (3\text{-}1\text{-}4)$$

Here, $s_3$ and $s_4$ are functions with respect to $k_{x1}$, $k_{y1}$, $k_{y2}$, and k as given by expression (3-1-5) below. In other words, $s_3$ and $s_4$ are constants defined by $k_{x1}$, $k_{y1}$, $k_{y2}$, and k.

[Math. 139]

$$s_3 = s_3(k_{x_1}, k_{y_1}, k_{y_2}, k)$$

$$s_4 = s_4(k_{x_1}, k_{y_1}, k_{y_2}, k) \quad (3\text{-}1\text{-}5)$$

By substituting expression (3-1-4) in expression (3-1-3), expression (3-1-6) below is obtained.

[Math. 140]
$$\left(s_3^2 + s_4^2 - k_{x_1}^2 - k_{y_1}^2 - k_{y_2}^2\right)^2 + 4k^2 s_4^2 + 4\left(k_{x_1}^2 + k_{y_1}^2\right)\left(s_3^2 - s_{y_2}^2\right) = 0 \quad (3\text{-}1\text{-}6)$$

However, $s_3$ and $s_4$ cannot be determined from only this algebraic equation. Next, expression (3-1-4) is changed into expression (3-1-7) below.

[Math. 141]
$$\tilde{\varphi}(k_{x_1}, k_{y_1}, u, k_{y_2}, z, k) = h(k_{x_1}, k_{y_1}, k_{y_2}, k) e^{s_3 u} e^{s_4 z} \quad (3\text{-}1\text{-}7)$$

By inverse Fourier transform of expression (3-1-7) with respect to $k_{x_1}$, $k_{y_1}$, and $k_{y_2}$ and application of the result to $u \to x_2$, expression (3-1-8) below is obtained.

[Math. 142]
$$\varphi(x_1, y_1, x_2, y_2, z, k) = \quad (3\text{-}1\text{-}8)$$
$$\frac{1}{(2\pi)^3} \int_{-\infty}^{\infty} \int_{-\infty}^{\infty} \int_{-\infty}^{\infty} e^{-i(k_{x_1} x_1 + k_{y_1} y_1 + k_{y_2} y_2)} b(k_{x_1}, k_{y_1}, k_{y_2}, k) e^{s_3 x_2} e^{s_4 z} dk_{x_1} dk_{y_1} dk_{y_2}$$

By applying $x_2 = x_1 = x$ to expression (3-1-8), expression (3-1-9) below is obtained.

[Math. 143]
$$\varphi(x, y_1, x, y_2, z, k) = \quad (3\text{-}1\text{-}9)$$
$$\frac{1}{(2\pi)^3} \int_{-\infty}^{\infty} \int_{-\infty}^{\infty} \int_{-\infty}^{\infty} e^{-i(k_{x_1} x + k_{y_1} y_1 + k_{y_2} y_2)} b(k_{x_1}, k_{y_1}, k_{y_2}, k) e^{s_3 x} e^{s_4 z} dk_{x_1} dk_{y_1} dk_{y_2} =$$
$$\frac{1}{(2\pi)^3} \int_{-\infty}^{\infty} \int_{-\infty}^{\infty} \int_{-\infty}^{\infty} e^{-i((k_{x_1} + s_3)x + k_{y_1} y_1 + k_{y_2} y_2)} b(k_{x_1}, k_{y_1}, k_{y_2}, k) e^{s_4 z} dk_{x_1} dk_{y_1} dk_{y_2} =$$
$$\frac{1}{(2\pi)^3} \int_{-\infty}^{\infty} \int_{-\infty}^{\infty} \int_{-\infty}^{\infty} e^{-i(k_x x + k_{y_1} y_1 + k_{y_2} y_2)} b(k_{x_1}, k_{y_1}, k_{y_2}, k) e^{s_4 z} \left(\frac{dk_{x_1}}{dk_x}\right) dk_x dk_{y_1} dk_{y_2}$$

Here, $k_x$ is expressed as given by expression (3-1-10) below.

[Math. 144]
$$k_x = k_{x_1} + i s_3 \quad (3\text{-}1\text{-}10)$$

Expression (3-1-9) described above is supposed to agree with expression (2-1-17) because it agrees with the solution to the scattering field equation for the one-dimensional array. Expression (3-1-11) below is the same as expression (2-1-17).

[Math. 145]
$$\varphi(x, y_1, y_2, z, k) = \qquad (3\text{-}1\text{-}11)$$

$$\frac{1}{(2\pi)^3} \int_{-\infty}^{\infty}\int_{-\infty}^{\infty}\int_{-\infty}^{\infty} e^{-i(k_x x + k_{y_1} y_1 + k_{y_2} y_2)} a(k_x, k_{y_1}, k_{y_2}, k) \cdot$$

$$e^{i\left\{\sqrt{\left(\sqrt{k^2-k_{y_1}^2}+\sqrt{k^2-k_{y_2}^2}\right)^2 - k_x^2}\right\} z} dk_x dk_{y_1} dk_{y_2}$$

By comparing expressions (3-1-9) and (3-1-11), expression (3-1-12) below is obtained.

[Math. 146]
$$b(k_{x_1}, k_{y_1}, k_{y_2}, k)\left(\frac{dk_{x_1}}{d(k_{x_1}+is_3)}\right) = a(k_{x_1}+is_3, k_{y_1}, k_{y_2}, k) \qquad (3\text{-}1\text{-}12)$$

$$s_4 = i\sqrt{\left(\sqrt{k^2-k_{y_1}^2}+\sqrt{k^2-k_{y_2}^2}\right)^2 - (k_{x_1}+is_3)^2}$$

The second equation given by expression (3-1-12) is raised to second power to obtain expression (3-1-13) below.

[Math. 147]
$$s_4^2 + s_3^2 = 2ik_{x_1}s_3 + k_{x_1}^2 - \left(\sqrt{k^2-k_{y_1}^2}+\sqrt{k^2-k_{y_2}^2}\right)^2 \qquad (3\text{-}1\text{-}13)$$

By substituting expression (3-1-13) in expression (3-1-6), expression (3-1-14) below is obtained.

[Math. 148]
$$\left\{2ik_{x_1}s_3 - k_{y_1}^2 - k_{y_2}^2 - \left(\sqrt{k^2-k_{y_1}^2}+\sqrt{k^2-k_{y_2}^2}\right)^2\right\}^2 + \qquad (3\text{-}1\text{-}14)$$

$$4k^2\left\{-\left(\sqrt{k^2-k_{y_1}^2}+\sqrt{k^2-k_{y_2}^2}\right)^2 + (k_{x_1}+is_3)^2\right\} +$$

$$4(k_{x_1}^2 + k_{y_1}^2)(s_3^2 - k_{y_2}^2) = 0$$

Expression (3-1-14) is summarized to obtain expression (3-1-15) below.

[Math. 149]
$$(k^2 - k_{y_1}^2)s_3^2 + 2\left(ik_{x_1}\sqrt{k^2-k_{y_1}^2}\sqrt{k^2-k_{y_2}^2}\right)s_3 - k_{x_1}^2(k^2 - k_{y_2}^2) = 0 \qquad (3\text{-}1\text{-}15)$$

Since the solution to this equation is a multiple root, the solution expressed as given by expression (3-1-16) is uniquely obtained.

[Math. 150]
$$s_3 = \frac{-ik_{x_1}\sqrt{k^2-k_{y_2}^2}}{\sqrt{k^2-k_{y_1}^2}} \qquad (3\text{-}1\text{-}16)$$

In accordance with expressions (3-1-12) and (3-1-16) obtained through the above-described above, $s_3$ and $s_4$ are obtained analytically. Then, the scattering field function is obtained from expression (3-1-8) as expressed by expression (3-1-17) below.

[Math. 151]
$$\varphi(x_1, y_1, x_2, y_2, z, k) \qquad (3\text{-}1\text{-}17)$$

$$= \frac{1}{(2\pi)^3}$$

$$\int_{-\infty}^{\infty}\int_{-\infty}^{\infty}\int_{-\infty}^{\infty} e^{-i(k_{x_1} x_1 + k_{y_1} y_1 + k_{y_2} y_2)} b(k_{x_1}, k_{y_1}, k_{y_2}, k) e^{s_3 x_2} e^{s_4 z} dk_{x_1} dk_{y_1} dk_{y_2}$$

$$= \frac{1}{(2\pi)^3} \int_{-\infty}^{\infty}\int_{-\infty}^{\infty}\int_{-\infty}^{\infty} e^{-i(k_{x_1} x_1 + k_{y_1} y_1 + k_{y_2} y_2)}$$

$$a(k_{x_1}+is_3, k_{y_1}, k_{y_2}, k) \cdot \left(\frac{dk_{x_1}+is_3}{dk_{x_1}}\right) e^{s_3 x_2} e^{s_4 z} dk_{x_1} dk_{y_1} dk_{y_2}$$

$$s_3 = \frac{-ik_{x_1}\sqrt{k^2-k_{y_2}^2}}{\sqrt{k^2-k_{y_1}^2}}$$

$$s_4 = i\sqrt{\left(\sqrt{k^2-k_{y_1}^2}+\sqrt{k^2-k_{y_2}^2}\right) - (k_{x_1}+is_3)^2}$$

Next, connecting measurement data $\Phi$ ($x_1$, $y_1$, and $y_2$, k) with a ($k_{x_1}$, $k_{y_1}$, $k_{y_2}$, k) is examined. By defining $k_x = k_{x_1} + is_3$ and substituting z=0 and $x_2 = x_1 + d$ in expression (3-1-17), an equation as given by expression (3-1-18) holds true. Here, $\Phi$ ($x_1$, $y_1$, and $y_2$, k) represents measurement data on transmission point ($x_1$, $y_1$, 0), reception point ($x_1+d$, $y_2$, 0), and wave number k.

[Math. 152]
$$\Phi(x_1, y_1, y_2, k) \qquad (3\text{-}1\text{-}18)$$

$$= \frac{1}{(2\pi)^3} \int_{-\infty}^{\infty}\int_{-\infty}^{\infty}\int_{-\infty}^{\infty} e^{-i(k_{x_1} x_1 + k_{y_1} y_1 + k_{y_2} y_2)}$$

$$a(k_{x_1}+is_3, k_{y_1}, k_{y_2}, k) \cdot \left(\frac{dk_{x_1}+is_3}{dk_{x_1}}\right) e^{s_3(x_1+d)} dk_{x_1} dk_{y_1} dk_{y_2}$$

$$= \frac{1}{(2\pi)^3} \int_{-\infty}^{\infty}\int_{-\infty}^{\infty}\int_{-\infty}^{\infty} e^{-i\{(k_{x_1}+is_3)x_1 + k_{y_1} y_1 + k_{y_2} y_2\}}$$

$$a(k_{x_1}+is_3, k_{y_1}, k_{y_2}, k) \cdot \left(\frac{dk_{x_1}+is_3}{dk_{x_1}}\right) e^{s_3 d} dk_{x_1} dk_{y_1} dk_{y_2}$$

$$= \frac{1}{(2\pi)^3} \int_{-\infty}^{\infty}\int_{-\infty}^{\infty}\int_{-\infty}^{\infty} e^{-i(k_{x_1} x_1 + k_{y_1} y_1 + k_{y_2} y_2)} a(k_x, k_{y_1}, k_{y_2}, k) e^{s_3 d} dk_{x_1} dk_{y_1} dk_{y_2}$$

Hereinafter, $k_x$ and $s_3$ defined by expression (3-1-19) below are used.

[Math. 153]
$$k_x = k_{x_1} + is_3 \qquad (3\text{-}1\text{-}19)$$

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

Expression (3-1-20) below is obtained by Fourier transform of both sides of expression (3-1-18) with respect to $x_1$, $y_1$, and $y_2$.

[Math. 154]

$$\Phi(k'_x, k'_{y_1}, k'_{y_2}, k) \quad (3\text{-}1\text{-}20)$$

$$= \int_{-\infty}^{\infty}\int_{-\infty}^{\infty}\int_{-\infty}^{\infty} e^{i(k'_x x_1 + k'_{y_1} y_1 + k'_{y_2} y_2)} \Phi(x_1, y_1, y_2, k) dx_1 dy_1 dy_2$$

$$= \frac{1}{(2\pi)^3} \int_{-\infty}^{\infty}\int_{-\infty}^{\infty}\int_{-\infty}^{\infty} e^{i(k'_x x_1 + k'_{y_1} y_1 + k'_{y_2} y_2)} \cdot e^{-i(k_{x_1} x_1 + k_{y_1} y_1 + k_{y_2} y_2)}$$

$$a(k_x, k_{y_1}, k_{y_2}, k) e^{s_3 d} dk_x dk_{y_1} dk_{y_2} dx_1 dy_1 dy_2$$

$$= \int_{-\infty}^{\infty}\int_{-\infty}^{\infty}\int_{-\infty}^{\infty} \delta(k'_x - k_x)\delta(k'_{y_1} - k_{y_1})\delta(k'_{y_2} - k_{y_2}) a(k_x, k_{y_1}, k_{y_2}, k)$$

$$e^{s_3 d} dk_x dk_{y_1} dk_{y_2}$$

$$= a(k'_x, k'_{y_1}, k'_{y_2}, k) e^{s_3 d}$$

Function a ($k_x$, $k_{y1}$, $k_{y2}$, $k$) is obtained from expression (3-1-20) as given by expression (3-1-21).

[Math. 155]

$$a(k_x, k_{y_1}, k_{y_2}, k) = e^{-s_3 d}\Phi(k_x, k_{y_1}, k_{y_2}, k) \quad (3\text{-}1\text{-}21)$$

$$= e^{\frac{i k_x d \sqrt{k^2 - k_{y_2}^2}}{\sqrt{k^2 - k_{y_1}^2} + \sqrt{k^2 - k_{y_2}^2}}} \Phi(k_x, k_{y_1}, k_{y_2}, k)$$

Therefore, expression (3-1-17) that represents the scattering field function is obtained in a complete form as given by expression (3-1-22) below.

[Math. 156]

$$\varphi(x_1, y_1, x_2, y_2, z, k) \quad (3\text{-}1\text{-}22)$$

$$= \frac{1}{(2\pi)^3} \int_{-\infty}^{\infty}\int_{-\infty}^{\infty}\int_{-\infty}^{\infty} e^{-i(k_{x_1} x_1 + k_{y_1} y_1 + k_{y_2} y_2)}$$

$$a(k_{x_1} + is_3, k_{y_1}, k_{y_2}, k) \cdot \left(\frac{dk_{x_1} + is_3}{dk_{x_1}}\right) e^{s_3 x_2} e^{s_4 z} dk_{x_1} dk_{y_1} dk_{y_2}$$

$$= \frac{1}{(2\pi)^3} \int_{-\infty}^{\infty}\int_{-\infty}^{\infty}\int_{-\infty}^{\infty} e^{-i(k_{x_1} x_1 + k_{y_1} y_1 + k_{y_2} y_2)} e^{s_3 x_2} e^{s_4 z}$$

$$e^{\frac{id(k_{x_1}+is_3)\sqrt{k^2-k_{y_2}^2}}{\sqrt{k^2-k_{y_1}^2}+\sqrt{k^2-k_{y_2}^2}}} \cdot \Phi(k_x, k_{y_1}, k_{y_2}, k)\left(\frac{dk_{x_1}+is_3}{dk_{x_1}}\right) dk_{x_1} dk_{y_1} dk_{y_2}$$

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

$$s_4 = ik_z = i\sqrt{\left(\sqrt{k^2-k_{y_1}^2}+\sqrt{k^2-k_{y_2}^2}\right) - (k_{x_1}+is_3)^2}$$

Then, the imaging function is obtained as given by expression (3-1-23) below.

[Math. 157]

$$\rho(x, y, z) \quad (3\text{-}1\text{-}23)$$

$$= \int_0^{\infty} \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_0^{\infty}\int_{-\infty}^{\infty}\int_{-\infty}^{\infty}\int_{-\infty}^{\infty} e^{-i(k_x x + k_{y_1} y + k_{y_2} y)}$$

$$e^{s_4 z} e^{\frac{idk_x\sqrt{k^2-k_{y_2}^2}}{\sqrt{k^2-k_{y_1}^2}+\sqrt{k^2-k_{y_2}^2}}} \cdot \Phi(k_x, k_{y_1}, k_{y_2}, k) dk_x dk_{y_1} dk_{y_2}$$

$$= \frac{1}{(2\pi)^3} \int_0^{\infty}\int_{-\infty}^{\infty}\int_{-\infty}^{\infty}\int_{-\infty}^{\infty} e^{-i(k_x x + k_{y_1} y + k_{y_2} y)}$$

$$e^{ik_z z} e^{\frac{idk_x\sqrt{k^2-k_{y_2}^2}}{\sqrt{k^2-k_{y_1}^2}+\sqrt{k^2-k_{y_2}^2}}} \cdot \Phi(k_x, k_{y_1}, k_{y_2}, k) dk_x dk_{y_1} dk_{y_2}$$

$$k_z = \sqrt{\left(\sqrt{k^2-k_{y_1}^2}+\sqrt{k^2-k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\sqrt{k^2-k_{y_1}^2}\sqrt{k^2-k_{y_2}^2}}{k(k_x^2+k_z^2)}$$

The semi-two-dimensional array is capable of acquiring information on substances included between the x coordinates of the transmission position and the reception position. In particular, even if an obstacle with a high dielectric constant is present in front, it is possible to transmit radio waves and receive waves by circling around the obstacle in the x direction. Thus, it is possible to acquire information that is difficult to acquire in the case of a one-dimensional array in the y direction. Accordingly, reconstitution of a more appropriate image becomes possible.

Moreover, as compared with the one-dimensional array, the semi-two-dimensional array is capable of including a larger number of transmitting elements and a larger number of receiving elements. Accordingly, it is possible to more efficiently acquire information.

<III-2. S-Array Scattering Field Theory Applied to Plane Boundary and Two-Dimensional Array>

Figure 11:
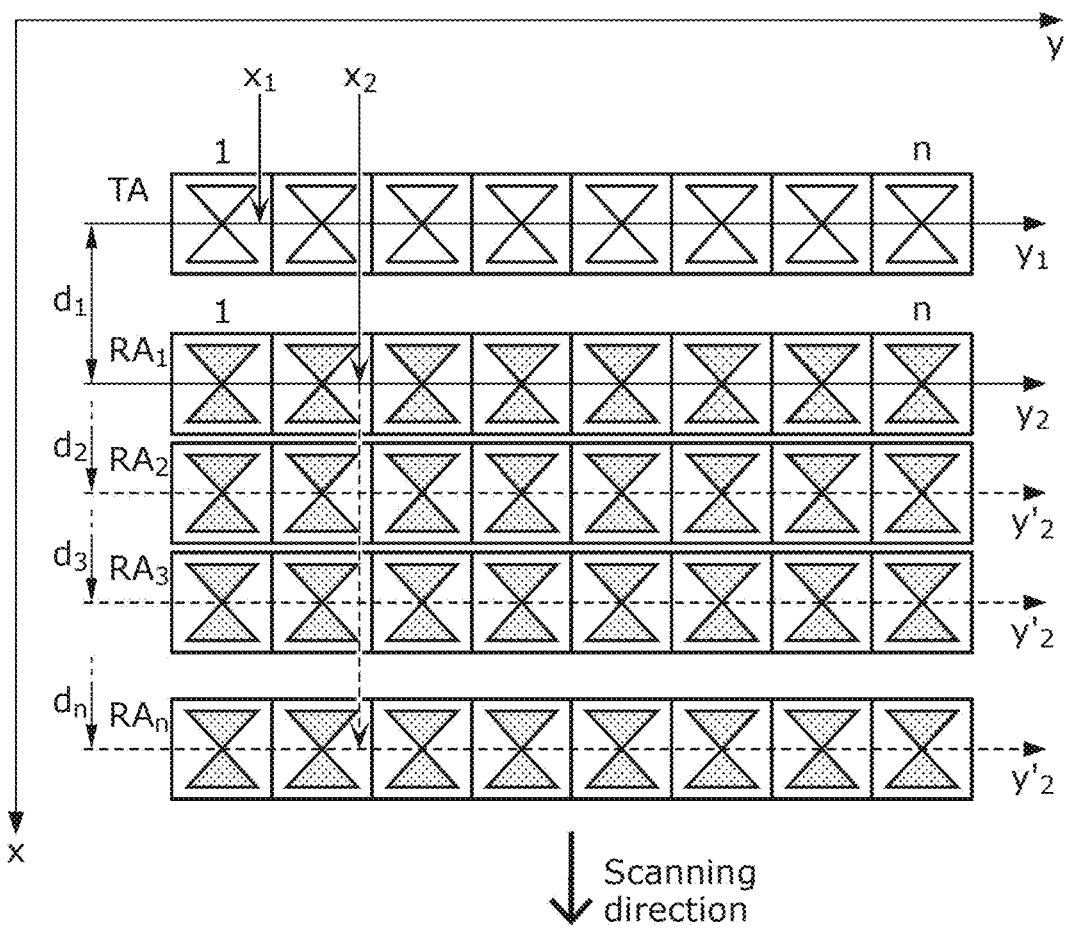
FIG. 11 is a diagram showing a multi-row linear array antenna.

FIG. 11 is a diagram showing a multi-row linear array antenna. The multi-row linear array antenna shown in FIG. 11 includes single-row transmitting array antenna TA and n-row receiving array antennas $RA_1$, $RA_2$, $RA_3$, . . . and $RA_n$. The direction of polarization of each antenna element may be in the x direction or in the y direction. TA and RA may change their places. The MS inverse scattering applied to the semi-two-dimensional array in chapter III-1 is applied to the above-described array.

Although there are a plurality of receiving array antennas $RA_1$, $RA_2$, $RA_3$, . . . , and $RA_n$, a plurality of combinations (TA, $RA_1$), (TA, $RA_2$), (TA, $RA_3$), . . . , and (TA, $RA_n$) are measured independently of one another. The scattering field function is obtained by linear addition of these data items. Accordingly, the imaging function is also obtained by the linear addition. When $d_j$ represents the distance between the transmitting element array TA and the j-th receiving element array $RA_j$, and $\Phi_j$ ($x_1$, $y_1$, and $y_2$, k) represents each measurement data, expression (3-2-1) below is obtained from expression (3-1-23).

[Math. 158]

$$\rho(x, y, z) \quad (3\text{-}2\text{-}1)$$

$$= \int_0^\infty \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_{-\infty}^\infty \int_{-\infty}^\infty \int_{-\infty}^\infty \int_0^\infty e^{-i(k_x x + k_{y_1} y + k_{y_2} y)}$$

$$e^{s_4 z} \cdot \sum_{j=1,n} \left\{ \exp\left( \frac{id_j k_x \sqrt{k^2 - k_{y_2}^2}}{\sqrt{k^2 - k_{y_1}^2} + \sqrt{k^2 - k_{y_2}^2}} \right) \Phi_j(k_x, k_{y_1}, k_{y_2}, k) \right\} dk_x dk_{y_1} dk_{y_2} dk$$

$$= \frac{1}{(2\pi)^3}$$

$$\int_{-\infty}^\infty \int_{-\infty}^\infty \int_{-\infty}^\infty \int_0^\infty e^{-i(k_x x + k_{y_1} y + k_{y_2} y)} e^{ik_z z} \cdot \sum_{j=1,n} \left\{ \exp\left( \frac{id_j k_x \sqrt{k^2 - k_{y_2}^2}}{\sqrt{k^2 - k_{y_1}^2} + \sqrt{k^2 - k_{y_2}^2}} \right) \right.$$

$$\left. \Phi_j(k_x, k_{y_1}, k_{y_2}, k) \right\} \left( \frac{dk}{dk_z} \right) dk_x dk_{y_1} dk_{y_2} dk_z$$

$$k_z = \sqrt{\left( \sqrt{k^2 - k_{y_1}^2} + \sqrt{k^2 - k_{y_2}^2} \right)^2 - k_x^2}$$

$$k = \frac{1}{2} \sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \sqrt{k^2 - k_{y_1}^2} \sqrt{k^2 - k_{y_1}^2}}{k(k_x^2 + k_z^2)}$$

Next, a difference is described between the case of using an existing two-dimensional array and the case of using an S-Array two-dimensional array that applies the semi-two-dimensional array according to the present disclosure.

The S-Array two-dimensional array has the constraint that TA and RA each be a one-dimensional array. There is a possibility that a scanning probe using this array can acquire a high-quality image and can shorten the scanning time while maintaining the image quality. Alternatively, scanning may be omitted.

In the case of using an existing two-dimensional array, on the other hand, no constraints are imposed on the arrangement of transmitting elements and receiving elements. However, for example, in the case of an n-by-n array, there are $n^4$ different orders of combinations for transmission and reception, and the dimension becomes higher. Thus, when n is any practical value (e.g., 100), the scale of the system increases and enormous amounts of measurement time and calculation time become necessary. Accordingly, the existing two-dimensional array is not practical for medical diagnosis and infrastructural diagnosis.

Figure 12:
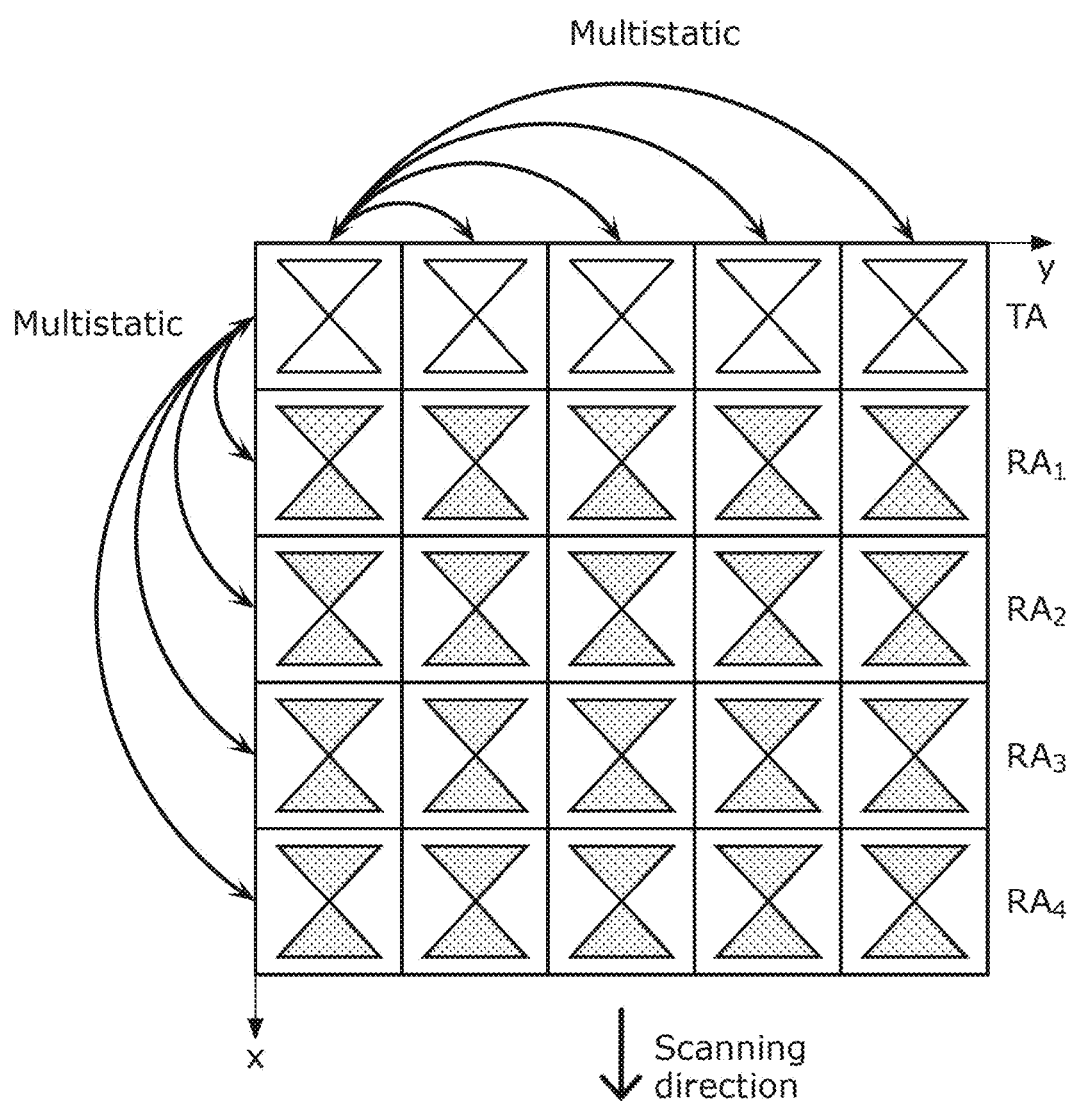
FIG. 12 is a conceptual diagram showing combinations of transmission positions and reception positions of a multistatic array antenna.

FIG. 12 is a conceptual diagram showing combinations of transmission positions and reception positions in a multistatic array antenna. FIG. 12 shows an S-Array two-dimensional array as a multistatic array antenna. The S-Array two-dimensional array is capable of acquiring measurement data at a plurality of reception positions in both of the x and y directions, even if scanning is not performed. That is, the S-Array two-dimensional array has multistatic characteristics in both of the x and y directions. Accordingly, it is possible to acquire enough information and to omit or reduce scanning.

As described above, transmission and reception may change their places. In this case, a plurality of transmitting array antennas transmit radio waves in sequence. More specifically, a plurality of transmitting elements transmit radio waves in sequence. Even if the transmitting position and the reception position change their places, it is assumed that the amount of received scattering is the same. Accordingly, even if transmission and reception change their places, substantially the same result is obtained. In the case of using a plurality of transmitting array antennas, linear addition may be performed as in the case of using a plurality of receiving array antennas.

As another alternative, a plurality of transmitting array antennas and a plurality of receiving array antennas may be used. Then, the transmitting array antennas and the receiving array antennas may be arranged alternately.

Moreover, scanning may be performed depending on the S-Array two-dimensional array. In this case, a wider range of information can be obtained.

As described above, the imaging function can be derived from merging of a plurality of scattering field functions that correspond respectively to a plurality of combinations of transmitting array antennas and receiving array antennas. For example, the imaging function may be derived by merging a plurality of scattering field functions into a single scattering field function and performing a limit operation on the scattering field function. Each of the scattering field functions may be a scattering field function expressed as given by expression (3-1-23). The merging may be linear addition.

<III-3. S-Array Scattering Field Theory Applied to Curved Boundary>

The following description is given of the S-Array scattering field theory applied to the case where the boundary of a region, i.e., a boundary surface for measuring scattering data, is a curved plane whose curvature is not so large.

Figure 13:
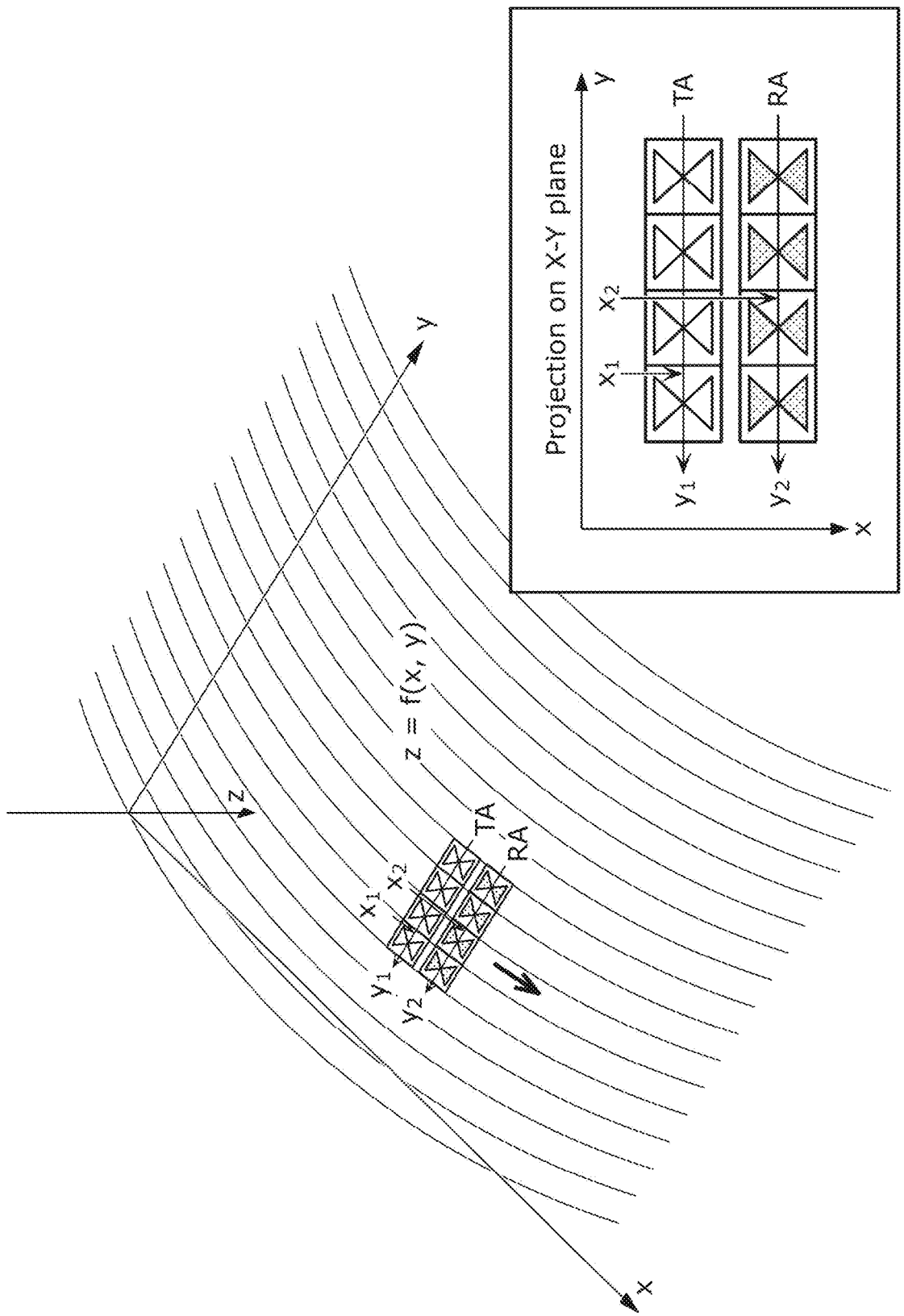
FIG. 13 is a diagram showing a semi-two-dimensional array antenna on a curved plane.

FIG. 13 is a diagram showing a semi-two-dimensional array antenna on a curved plane. FIG. 13 shows the semi-two-dimensional array antenna projected on plane x-y where z=0. When the curved plane has a large curvature, it is not permitted to ignore the inclination of the array antenna and to ignore a change in distance between antenna elements in the x-y plane depending on the place. However, when the curvature of the curved plane is not so large, the distance between elements in the x-y plane may be regarded approximately constant.

Here, an inverse scattering theory applied to the semi-two-dimensional array is constructed based on the theory described in II-5. The scattering field function is a function as given by expression (3-3-1) below.

[Math. 159]

$$\varphi(x_1, y_1, x_2, y_2, z_1, z_2, k) = \iint_D \frac{e^{ik\rho_1}}{\rho_1} \frac{e^{ik\rho_2}}{\rho_2} \varepsilon(\xi, \eta, \zeta) d\xi d\eta d\zeta \quad (3\text{-}3\text{-}1)$$

$$\rho_1 = \sqrt{(x_1 - \xi)^2 + (y_1 - \eta)^2 + (z_1 - \zeta)^2}$$

$$\rho_2 = \sqrt{(x_2 - \xi)^2 + (y_2 - \eta)^2 + (z_2 - \zeta)^2}$$

An equation satisfied by the scattering field function given by expression (3-3-1) is expression (2-5-4) and expressed as given by expression (3-3-2) below.

[Math. 160]

$$\{\Delta_6 - 2(ik)^2\}\varphi(x_1, y_1, x_2, y_2, z_1, z_2, k) = \qquad (3\text{-}3\text{-}2)$$
$$\{(\partial_{x_1^2} + \partial_{x_2^2} + \partial_{y_1^2} + \partial_{y_2^2} + \partial_{z_1^2} + \partial_{z_2^2}) - 2(ik)^2\} \cdot$$
$$\varphi(x_1, y_1, x_2, y_2, z_1, z_2, k) = 0$$

Here, Fourier transform is used as given by expression (3-3-3) below.

[Math. 161]

$$\varphi(k_{x_1}, k_{y_1}, x_2, k_{y_2}, z_1, z_2, k) \qquad (3\text{-}3\text{-}3)$$
$$= \int_{-\infty}^{\infty}\int_{-\infty}^{\infty}\int_{-\infty}^{\infty} e^{i(k_{x_1}x_1 + k_{y_1}y_1 + k_{y_2}y_2)}\varphi(x_1, y_1, x_2, y_2, z_1, z_2, k)dx_1 dy_1 dy_2$$

From expressions (3-3-2) and (3-3-3), expression (3-3-4) below is obtained.

[Math. 162]

$$\{(\partial_{x_2^2} + \partial_{z_1^2} + \partial_{z_2^2} + 2k^2 - k_{x_1}^2 - k_{y_1}^2 - k_{y_2}^2\} \qquad (3\text{-}3\text{-}4)$$
$$\varphi(k_{x_1}, k_{y_1}, x_2, k_{y_2}, z_1, z_2, k) = 0$$

As a solution to the equation given by expression (3-3-4), expression (3-3-5) below is assumed.

[Math. 163]

$$\varphi(k_{x_1}, k_{y_1}, x_2, k_{y_2}, z_1, z_2, k) = b(k_{x_1}, k_{y_1}, k_{y_2}, k)e^{s_3 x_2}e^{s_4 z_1}e^{s_5 z_2} \qquad (3\text{-}3\text{-}5)$$
$$s_3 = s_3(k_{x_1}, k_{y_1}, k_{y_2}, k)$$
$$s_4 = s_4(k_{x_1}, k_{y_1}, k_{y_2}, k)$$
$$s_5 = s_5(k_{x_1}, k_{y_1}, k_{y_2}, k)$$

By substituting expression (3-3-5) in expression (3-3-4), expression (3-3-6) below is obtained.

[Math. 164]

$$s_3^2 + s_4^2 + s_5^2 + 2k^2 - k_{x_1}^2 - k_{y_1}^2 - k_{y_2}^2 = 0 \qquad (3\text{-}3\text{-}6)$$

Next, $\varphi$ [Math. 165]

is expressed as given by expression (3-3-7) below.

[Math. 166]

$$\varphi(x_1, y_1, x_2, y_2, z_1, z_2, k) \qquad (3\text{-}3\text{-}7)$$
$$\frac{1}{(2\pi)^3}\int_{-\infty}^{\infty}\int_{-\infty}^{\infty}\int_{-\infty}^{\infty}\int_0^{\infty} e^{-i(k_{x_1}x_1 + k_{y_1}y_1 + k_{y_2}y_2)}$$
$$b(k_{x_1}, k_{y_1}, k_{y_2}, k)e^{s_3 x_2}e^{s_4 z_1}e^{s_5 z_2}dk_{x_1}dk_{y_1}dk_{y_2}$$

In the case of $x_2 \to x_1$, expression (3-3-7) agrees with expression (2-2-18). In the case of $x_2 \to x_1$, expression (3-3-7) is expressed as given by expression (3-3-8) below.

[Math. 167]

$$(3\text{-}3\text{-}8)$$
$$\varphi(x_1, y_1, x_1, y_2, z_1, z_2, k) =$$
$$\frac{1}{(2\pi)^3}\int_{-\infty}^{\infty}\int_{-\infty}^{\infty}\int_{-\infty}^{\infty} e^{-i((k_{x_1}+is_3)x_1 + k_{y_1}y_1 + k_{y_2}y_2)}b(k_{x_1}, k_{y_1}, k_{y_2}, k)e^{s_4 z_1}e^{s_5 z_2}dk_{x_1}dk_{y_1}dk_{y_2}$$

Moreover, the same expression as expression (2-2-18) is expressed as given by expression (3-3-9) below.

[Math. 168]

$$\phi(x, y_1, y_2, z_1, z_2, k) = \qquad (3\text{-}3\text{-}9)$$

$$\frac{1}{(2\pi)^3} \int_{-\infty}^{\infty}\int_{-\infty}^{\infty}\int_{-\infty}^{\infty} e^{-i(k_x x + k_{y_1} y_1 + k_{y_2} y_2)} a(k_x, k_{y_1}, k_{y_2}, k) \cdot$$

$$e^{is_1(k_x, k_{y_1}, k_{y_2}, k) z_1} e^{is_2(k_x, k_{y_1}, k_{y_2}, k) z_2} dk_x dk_{y_1} dk_{y_2}$$

$$s_1(k_x, k_{y_1}, k_{y_2}, k) = \frac{\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_2(k_x, k_{y_1}, k_{y_2}, k) = \frac{\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

Since expression (3-3-8) agrees with expression (3-3-9), expression (3-3-10) below is obtained.

[Math. 169]

$$k_x = k_{x_1} + is_3(k_{x_1}, k_{y_1}, k_{y_2}, k) \qquad (3\text{-}3\text{-}10)$$

$$b(k_{x_1}, k_{y_1}, k_{y_2}, k)\left(\frac{dk_{x_1}}{dk_x}\right) = a(k_x, k_{y_1}, k_{y_2}, k)$$

$$s_4(k_{x_1}, k_{y_1}, k_{y_2}, k) = is_1(k_x, k_{y_1}, k_{y_2}, k)$$

$$s_5(k_{x_1}, k_{y_1}, k_{y_2}, k) = is_2(k_x, k_{y_1}, k_{y_2}, k)$$

Next, from expressions (3-3-6), (3-3-9), and (3-3-10), an algebraic equation with respect to $s_3$ is obtained as given by expression (3-3-11) below.

[Math. 170]

$$s_3^2 - \left\{\frac{\sqrt{k^2 - k_{y_1}^2}\sqrt{\left(\sqrt{k^2 - k_{y_1}^2} + \sqrt{k^2 - k_{y_2}^2}\right)^2 - (k_{x_1} + is_3)^2}}{\sqrt{k^2 - k_{y_1}^2} + \sqrt{k^2 - k_{y_2}^2}}\right\}^2 - \qquad (3\text{-}3\text{-}11)$$

$$\left\{\frac{\sqrt{k^2 - k_{y_2}^2}\sqrt{\left(\sqrt{k^2 - k_{y_1}^2} + \sqrt{k^2 - k_{y_2}^2}\right)^2 - (k_{x_1} + is_3)^2}}{\sqrt{k^2 - k_{y_1}^2} + \sqrt{k^2 - k_{y_2}^2}}\right\}^2 +$$

$$2k^2 - k_{x_1}^2 - k_{y_1}^2 - k_{y_2}^2 = 0$$

By expanding and simplifying the square term in Expression (3-3-11), expression (3-3-12) below is obtained.

[Math. 171]

$$s_3^2 + \frac{(2k^2 - k_{y_1}^2 - k_{y_2}^2)(k_{x_1} + is_3)^2}{\left(\sqrt{k^2 - k_{y_1}^2} + \sqrt{k^2 - k_{y_2}^2}\right)^2} - k_{x_1}^2 = 0 \qquad (3\text{-}3\text{-}12)$$

Moreover, expression (3-3-12) is summarized to obtain expression (3-3-13) below.

[Math. 172]

$$\left(s_3\sqrt{k^2-k_{y1}^2}+ik_{x1}\sqrt{k^2-k_{y2}^2}\right)\left(s_3\sqrt{k^2-k_{y2}^2}+ik_{x1}\sqrt{k^2-k_{y1}^2}\right)=0 \quad (3\text{-}3\text{-}13)$$

There are two solutions to expression (3-3-13). However, a solution to expression (3-3-13) is supposed to agree with the solution in the case of the plane boundary described in chapter III-1. Thus, expression (3-3-14) below is supposed to be selected as the solution in accordance with expression (3-1-16).

[Math. 173]

$$s_3 = \frac{-ik_{x1}\sqrt{k^2-k_{y2}^2}}{\sqrt{k^2-k_{y1}^2}} \quad (3\text{-}3\text{-}14)$$

In summary, the scattering field function is obtained as given by expression (3-3-15) below.

[Math. 174]

$$\varphi(x_1, y_1, x_2, y_2, z_1, z_2, k) =$$

$$\frac{1}{(2\pi)^3}\int_{-\infty}^{\infty}\int_{-\infty}^{\infty}\int_{-\infty}^{\infty} e^{-i(k_{x1}x_1+k_{y3}y_1+k_{y2}y_2)}b(k_{x1}, k_{y1}, k_{y2}, k)e^{s_3 x_2}e^{s_4 z_1}e^{s_5 z_2}dk_{x1}dk_{y1}dk_{y2} =$$

$$\frac{1}{(2\pi)^3}\int_{-\infty}^{\infty}\int_{-\infty}^{\infty}\int_{-\infty}^{\infty} e^{-i(k_{x1}x_1+k_{y1}y_1+k_{y2}y_2)}a(k_{x1}+is_3, k_{y1}, k_{y2}, k) \cdot$$

$$e^{s_3 x_2}e^{s_4 z_1}e^{s_5 z_2}\frac{d(k_{x1}+is_3)}{dk_{x1}}dk_{x1}dk_{y1}dk_{y2}$$

$$s_3 = \frac{-ik_{x1}\sqrt{k^2-k_{y2}^2}}{\sqrt{k^2-k_{y1}^2}}$$

$$s_4 = \frac{i\sqrt{k^2-k_{y1}^2}\sqrt{\left(\sqrt{k^2-k_{y1}^2}+\sqrt{k^2-k_{y2}^2}\right)^2-(k_{x1}+is_3)^2}}{\sqrt{k^2-k_{y1}^2}+\sqrt{k^2-k_{y2}^2}}$$

$$s_5 = \frac{i\sqrt{k^2-k_{y2}^2}\sqrt{\left(\sqrt{k^2-k_{y1}^2}+\sqrt{k^2-k_{y2}^2}\right)^2-(k_{x1}+is_3)^2}}{\sqrt{k^2-k_{y1}^2}+\sqrt{k^2-k_{y2}^2}}$$

$$(3\text{-}3\text{-}15)$$

Moreover, by converting the variable $k_{x1}$ to $k_x$ in expression (3-3-15), expression (3-3-16) below is obtained.

[Math. 175]

$$s_3 = \frac{-ik_x\sqrt{k^2-k_{y2}^2}}{\sqrt{k^2-k_{y1}^2}+\sqrt{k^2-k_{y2}^2}} \quad (3\text{-}3\text{-}16)$$

$$s_4 = \frac{i\sqrt{k^2-k_{y1}^2}\sqrt{\left(\sqrt{k^2-k_{y1}^2}+\sqrt{k^2-k_{y2}^2}\right)^2-k_x^2}}{\sqrt{k^2-k_{y1}^2}+\sqrt{k^2-k_{y2}^2}}$$

-continued $$s_5 = \frac{i\sqrt{k^2-k_{y2}^2}\sqrt{\left(\sqrt{k^2-k_{y1}^2}+\sqrt{k^2-k_{y2}^2}\right)^2-k_x^2}}{\sqrt{k^2-k_{y1}^2}+\sqrt{k^2-k_{y2}^2}}$$

Next, connecting measurement data $\Phi(x_1, y_1, \text{and } y_2, k)$ with $b(k_{x1}, k_{y1}, k_{y2}, k)$ is examined. The function obtained by Fourier transform of data $\Phi(x_1, y_I, x_I+d, y_J, t)$ measured at points $P_I$ and $P_J$ on the curved plane is expressed as given by expression (3-3-17) below.

[Math. 176]

$$\Phi(x_I, y_I, y_J, k) = \int_{-\infty}^{\infty} e^{-ickt}\varphi(x_I, y_I, x_I+d, y_J, t)dt \quad (3\text{-}3\text{-}17)$$

The shape of the boundary curved plane, serving as a measurement plane, is expressed as given by expression (3-3-18) below.

[Math. 177]

$$z=f(x,y) \quad (3\text{-}3\text{-}18)$$

Here, (x, y) represents the coordinates on the plane where z=0. The z coordinates at points $P_1$ and $P_J$ are expressed as given by expression (3-3-19) below.

[Math. 178]

$$z_I = f(x_I, y_I) \quad (3\text{-}3\text{-}19)$$

$$z_J = f(x_J, y_J)$$

By substituting $x_2=x_1+d$ in expression (3-3-15), an equation as given by expression (3-3-20) holds true.

[Math. 179]

$$\varphi(x_1, y_1, x_1+d, y_2, z_1, z_2, k) = \qquad (3\text{-}3\text{-}20)$$

$$\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} a(k_{x_1}+is_3, k_{y_1}, k_{y_2}, k) \cdot$$

$$e^{s_3(x_1+d)} e^{s_4 z_1} e^{s_5 z_2} \frac{d(k_{x_1}+is_3)}{dk_{x_1}} dk_{x_1} dk_{y_1} dk_{y_2}$$

Expression (3-3-20) described above is expressed given by as expression (3-3-21) below using data $\Phi$ obtained by measurement conducted on the boundary.

[Math. 180]

$$\Phi(x_I, y_I, y_J, z_I, z_J, k)\delta(x_1 - x_I)\delta(y_1 - y_I)\delta(y_2 - y_J) = \qquad (3\text{-}3\text{-}21)$$

$$\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} a_{I,J}(k_{x_1}+is_3, k_{y_1}, k_{y_2}, k) \cdot$$

$$e^{s_3(x_1+d)} e^{s_4 z_I} e^{s_5 z_J} \frac{d(k_{x_1}+is_3)}{dk_{x_1}} dk_{x_1} dk_{y_1} dk_{y_2}$$

Here, $\Phi(x_I, y_I, y_J, z_I, z_J, k)$ represents the measurement data on transmission point $(x_I, y_I, z_I)$, reception point $(x_I+d, y_J, z_J)$, and wave number k. Expression (3-3-22) below is obtained by Fourier transform of both sides of expression (3-3-21).

[Math. 181]

$$\int\int\int e^{i(k_{x_1}'x_1+k_{y_1}'y_1+k_{y_2}'y_2)}\Phi(x_I, y_I, y_J, z_I, z_J, k) \cdot \delta(x_1 - x_I) \qquad (3\text{-}3\text{-}22)$$

$$\delta(y_1 - y_I)\delta(y_2 - y_J) dx_1 dy_1 dy_2 =$$

$$\frac{1}{(2\pi)^3} \int\int\int e^{i(k_{x_1}'x_1+k_{y_1}'y_1+k_{y_2}'y_2)}$$

$$\int_{-\infty}^{\infty}\int_{-\infty}^{\infty}\int_{-\infty}^{\infty} e^{-i(k_{x_1}x_1+k_{y_1}y_1+k_{y_2}y_2)} a_{I,J}(k_{x_1}+is_3, k_{y_1}, k_{y_2}, k) \cdot$$

$$e^{s_3(x_1+d)} e^{s_4 z_I} e^{s_5 z_J} \frac{d(k_{x_1}+is_3)}{dk_{x_1}} dk_{x_1} dk_{y_1} dk_{y_2} dx_1 dy_1 dy_2$$

Then, expression (3-3-23) below is obtained as a result of integration of expression (3-3-22) with respect to $x_1$, $y_1$, and $y_2$.

[Math. 182]

$$\Phi(x_I, y_I, y_J, z_I, z_J, k) e^{i(k_{x_1}'x_I+k_{y_1}'y_I+k_{y_2}'y_J)} = \qquad (3\text{-}3\text{-}23)$$

$$\int_{-\infty}^{\infty}\int_{-\infty}^{\infty}\int_{-\infty}^{\infty} \delta(k_{x_1}+is_3 - k_{x_1}')\delta(k_{y_1} - k_{y_1}')$$

$$\delta(k_{y_2} - k_{y_2}') \cdot a_{I,J}(k_{x_1}+is_3, k_{y_1}, k_{y_2}, k) e^{s_3 d} e^{s_4 z_I} e^{s_5 z_J}$$

$$\frac{d(k_{x_1}+is_3)}{dk_{x_1}} dk_{x_1} dk_{y_1} dk_{y_2} = a_{I,J}(k_{x_1}', k_{y_1}', k_{y_2}', k) e^{s_3' d} e^{s_4' z_I} e^{s_5' z_J}$$

$$s_3' = \frac{-ik_{x_1}'\sqrt{k^2 - k_{y_2}'^2}}{\sqrt{k^2 - k_{y_1}'^2} + \sqrt{k^2 - k_{y_2}'^2}}$$

The result of expression (3-3-23) is summarized to obtain expression (3-3-24) below.

[Math. 183]

$$a_{i,j}(k_x, k_{y_1}, k_{y_2}, k) = \qquad (3\text{-}3\text{-}24)$$

$$\Phi(x_I, y_I, y_J, z_I, z_J, k) e^{i(k_x x_I+k_{y_1} y_I+k_{y_2} y_J)} e^{-s_3 d} e^{-s_4 z_I} e^{-s_5 z_J}$$

$$s_3 = \frac{-ik_x\sqrt{k^2 - k_{y_2}^2}}{\sqrt{k^2 - k_{y_1}^2} + \sqrt{k^2 - k_{y_2}^2}}$$

From the sum of all sets of I and J with respect to expression (3-3-24), expression (3-3-25) below is obtained.

[Math. 184]

$$a(k_x, k_{y_1}, k_{y_2}, k) = \sum_{I,J} a_{I,J}(k_x, k_{y_1}, k_{y_2}, k) \qquad (3\text{-}3\text{-}25)$$

$$= \sum_{I,J} \Phi(x_I, y_I, y_J, z_I, z_J, k)$$

$$e^{i(k_x x_I+k_{y_1} y_I+k_{y_2} y_J)} e^{-s_3 d} e^{-s_4 z_I} e^{-s_5 z_J}$$

From expressions (3-3-15) and (3-3-25), the scattering field function is obtained as given by expression (3-3-26) below.

[Math. 185]

$$\varphi(x_1, y_1, x_2, y_2, z_1, z_2, k) = \qquad (3\text{-}3\text{-}26)$$

$$\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} \sum_{I,J} \{\Phi(x_I, y_I, y_J, z_I, z_J, k) \cdot$$

$$e^{i(k_x x_I+k_{y_1} y_I+k_{y_2} y_J)} e^{-s_3 d} e^{-s_4 z_I} e^{-s_5 z_J}\}$$

$$e^{s_3 x_2} e^{s_4 z_1} e^{s_5 z_2} \frac{d(k_x+is_3)}{dk_{x_1}} dk_{x_1} dk_{y_1} dk_{y_2}$$

$$s_3 = \frac{-ik_x\sqrt{k^2 - k_{y_2}^2}}{\sqrt{k^2 - k_{y_1}^2} + \sqrt{k^2 - k_{y_2}^2}}$$

The imaging function is obtained by applying $x_2=x_1=x$, $y_1=y_2=y$, and $z_1=z_2=z$ to expression (3-3-26) and integrating the expression with respect to k. Next, improving the equation of the imaging function is examined so that the result can be obtained from Fourier transform that enables high-speed computation. Basic variables are $k_x$, $k_{y_1}$, $k_{y_2}$, and $k_z$, and the other variables are positively expressed using the basic variables. The imaging function is obtained through the following procedure.

First, expression (3-3-27) below is obtained by applying $x_2=x_1=x$, $y_1=y_2=y$, and $z_1=z_2=z$ to expression (3-3-26).

[Math. 186]

$$\varphi(x, y, x, y, z, z, k) = \qquad (3\text{-}3\text{-}27)$$

$$\frac{1}{(2\pi)^3} \int_{-\infty}^{\infty}\int_{-\infty}^{\infty}\int_{-\infty}^{\infty} e^{-i(k_x x+k_{y_1} y_1+k_{y_2} y_2)} e^{-s_3 d} e^{s_4 z} e^{s_5 z} \sum_{I,J} \{\Phi(x_I, y_I, y_J, z_I, z_J, k) \cdot$$

-continued
$$e^{i(k_x x_I + k_{y_1} y_I + k_{y_2} y_J)} e^{-s_4 z_I} e^{-s_5 z_J} \} dk_x dk_{y_1} dk_{y_2}$$

$$s_3 = \frac{-ik_x \sqrt{k^2 - k_{y_2}^2}}{\sqrt{k^2 - k_{y_1}^2} + \sqrt{k^2 - k_{y_2}^2}}$$

Imaging function ρ is obtained by integration with respect to k as given by expression (3-3-28) below.

[Math. 187]

$$\rho(x, y, z) = \int_0^\infty \varphi(x, y, x, y, z, z, k) dk \quad (3\text{-}3\text{-}28)$$

$$= \frac{1}{(2\pi)^3} \int_0^\infty dk \int_{-\infty}^\infty \int_{-\infty}^\infty \int_{-\infty}^\infty e^{-i(k_x x + k_{y_1} y_1 + k_{y_2} y_2)}$$

$$e^{-s_3 d} e^{ik_z z} \sum_{I,J} \{\Phi(x_I, y_I, y_J, z_I, z_J, k) \cdot$$

$$e^{i(k_x x_I + k_{y_1} y_I + k_{y_2} y_J)} e^{-s_4 z_I} e^{-s_5 z_J} \} dk_x dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y_1 + k_{y_2} y_2)}$$

$$e^{-s_3 d} e^{ik_z z} \sum_{I,J} \{\Phi(x_I, y_I, y_J, z_I, z_J, k) \cdot$$

$$e^{i(k_x x_I + k_{y_1} y_I + k_{y_2} y_J)} e^{-s_4 z_I} e^{-s_5 z_J}\}$$

$$\left(\frac{dk}{dk_z}\right) dk_x dk_{y_1} dk_{y_2} dk_z$$

$$s_3 = \frac{-ik_x \sqrt{k^2 - k_{y_2}^2}}{\sqrt{k^2 - k_{y_1}^2} + \sqrt{k^2 - k_{y_2}^2}}$$

This computation uses expression (3-3-29) below.

[Math. 188]

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}} \quad (3\text{-}3\text{-}29)$$

$$\frac{dk}{dk_z} = \frac{k_z\left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$s_3 = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

Although the semi-two-dimensional array is used in the above description, a two-dimensional array as shown in FIG. 11 may be used instead. In this case, the imaging function may be derived by merging of a plurality of scattering field functions that correspond respectively to a plurality of combinations of transmitting array antennas and receiving array antennas. For example, the imaging function may be derived by merging a plurality of scattering field functions into a single scattering field function and performing a limit operation on the scattering field function. Each of the scattering field functions may be the scattering field function expressed by expression (3-3-26), and the merging may be linear addition.

Although a cylindrical surface is shown as the curved boundary of the region in FIG. 13, the curved boundary of the region does not necessarily have to be a cylindrical surface. The above-described process may be applied to not only a tangential plane to a cylindrical surface but also a tangential plane to any other curved boundary.

<IV. Frequency Dependence of Dielectric Constant>
<IV-1. Basic Theory>

In the case of using the reconstitutive equations obtained in chapter III, consideration may be given to the presence or absence of dispersion of the dielectric constant. In the case where there is no dispersion of the dielectric constant, frequency f and wave number k have a simple relationship as given by expression (4-1-1) below. Here, Er represents the relative dielectric constant, and $c_0$ represents the velocity of electromagnetic waves in vacuum.

[Math. 189]

$$f = \frac{c_0 k}{2\pi\sqrt{\varepsilon_r}} \quad (4\text{-}1\text{-}1)$$

When there is no dispersion of the dielectric constant, the change of variables from f to k is easy. However, consideration is supposed to be given to a change in dielectric constant depending on the frequency in applications to, for example, a living body. Hereinafter, consideration is given to frequency dependence of the dielectric constant.

The dielectric constant in a region at frequencies of 14 GHz to 20 GHz is approximately 60% of the dielectric constant in a region at frequencies of 1 GHz to 5 GHz. An expression for the frequency dependence of Debye's dielectric constant is given by expressions (4-1-2) and (4-1-3) below.

[Math. 190]

$$\varepsilon(\omega) = \varepsilon_\infty + \frac{\varepsilon_s - \varepsilon_\infty}{1 + i\omega\tau} \quad (4\text{-}1\text{-}2)$$

$$\varepsilon(0) = \varepsilon_s$$

$$\varepsilon(\infty) = \varepsilon_\infty$$

[Math. 191]

$$\varepsilon(\omega) = \varepsilon_\infty + \frac{(\varepsilon_s - \varepsilon_\infty)}{1 + \omega^2 \tau^2} - i\frac{\omega\tau(\varepsilon_s - \varepsilon_\infty)}{1 + \omega^2 \tau^2} \quad (4\text{-}1\text{-}3)$$

$$\varepsilon_r(\omega) = \varepsilon_\infty + \frac{(\varepsilon_s - \varepsilon_\infty)}{1 + \omega^2 \tau^2} = a + \frac{b}{1 + \alpha\omega^2}$$

Here, ω represents the angular frequency, ε (w) represents the complex permittivity at ω, i represents the imaginary unit, T represents the relaxation time, $\varepsilon_r(\omega)$ represents the real part of the complex permittivity at ω, and a, b, and α represent constants. Specifically, a, b, and α are parameters indicating the correspondence between a change in frequency and a change in the dielectric constant in accordance with Debye's relaxation.

The relationship of the velocity of radio waves, the frequency, and the wave number is expressed as given by expressions (4-1-4) and (4-1-5) below.

[Math. 192]

$$c(\omega) = \frac{c_0}{\sqrt{\varepsilon_r(\omega)}} \quad (4\text{-}1\text{-}4)$$

$$\omega = c(\omega)k$$

[Math. 193]

$$\omega = \frac{c_0 k}{\sqrt{a + \frac{b}{1 + \alpha\omega^2}}} \quad (4\text{-}1\text{-}5)$$

Here, c(ω) represents the velocity of propagation at ω, and ω and f have a relationship of ω=2πf. Expression (4-1-6) below is obtained from expression (4-1-5).

[Math. 194]

$$\omega = \sqrt{\frac{-(a + b - c_0^2 \alpha k^2) + \sqrt{(a + b - c_0^2 \alpha k^2)^2 + 4a\alpha c_0^2 k^2}}{2a\alpha}} \quad (4\text{-}1\text{-}6)$$

Moreover, expression (4-1-7) below is also obtained from expression (4-1-6).

[Math. 195]

$$\frac{d\omega}{dk} = \frac{c_0^2 k + \alpha c_0^2 \omega^2 k}{(a+b)\omega + 2a\alpha\omega^2 - \alpha c_0^2 \omega k^2} \quad (4\text{-}1\text{-}7)$$

<IV-2. S-Array Scattering Field Theory for Plane Boundary and Dispersive Medium>

Here, an imaging function for measuring data with an S-Array near a plane boundary and generating video inside a dielectric dispersive medium is examined. Since the time factor is $e^{-i\omega t}$, integration in expression (3-2-1) is performed with respect to frequency ω, instead of k, when consideration is given to the presence of frequency dependence of the dielectric constant. Accordingly, the imaging function is obtained as given by expressions (4-2-1) and (4-2-2).

[Math. 196]

$$\rho(x, y, z) = \int_0^\infty \lim_{\substack{x_2 \to x_1 = x \\ y_2 \to y_1 = y}} \varphi(x_1, y_1, x_2, y_2, z, k) d\omega \quad (4\text{-}2\text{-}1)$$

$$= \frac{1}{(2\pi)^3} \int_0^\infty d\omega \int_{-\infty}^\infty \int_{-\infty}^\infty \int_{-\infty}^\infty e^{-i(k_x x + k_{y_1} y + k_{y_2} y)}$$

$$e^{s_4 z} e^{\frac{i d k_x \sqrt{k^2 - k_{y_2}^2}}{\sqrt{k^2 - k_{y_1}^2} + \sqrt{k^2 - k_{y_2}^2}}}$$

-continued $$\Phi(k_x, k_{y_1}, k_{y_2}, k) dk_x dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)}$$

$$e^{i k_z z} e^{\frac{i d k_x \sqrt{k^2 - k_{y_2}^2}}{\sqrt{k^2 - k_{y_1}^2} + \sqrt{k^2 - k_{y_2}^2}}}$$

$$\Phi(k_x, k_{y_1}, k_{y_2}, k) \left(\frac{d\omega}{dk}\right)\left(\frac{dk}{dk_z}\right) dk_x dk_{y_1} dk_{y_2} dk_z$$

[Math. 197]

$$k_z = \sqrt{\left(\sqrt{k^2 - k_{y_1}^2} + \sqrt{k^2 - k_{y_2}^2}\right)^2 - k_x^2} \quad (4\text{-}2\text{-}2)$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \sqrt{k^2 - k_{y_1}^2} \sqrt{k^2 - k_{y_2}^2}}{k(k_x^2 + k_z^2)}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

<IV-3. S-Array Scattering Field Theory Applied to Curved boundary and Dispersive Medium>

Here, an imaging function for measuring data with an S-Array near a curved boundary and generating video inside a dielectric dispersive medium is examined. Since the time factor is $e^{-i\omega t}$, integration in expression (3-3-28) is performed with respect to frequency ω, instead of k, when consideration is given to the presence of frequency dependence of the dielectric constant. Accordingly, the imaging function is obtained as given by expressions (4-3-1) and (4-3-2).

[Math. 198]

$$\rho(x, y, z) = \int_0^\infty \varphi(x, y, x, y, z, z, k) d\omega \quad (4\text{-}3\text{-}1)$$

$$= \frac{1}{(2\pi)^3} \int_0^\infty d\omega \int_{-\infty}^\infty \int_{-\infty}^\infty \int_{-\infty}^\infty e^{-i(k_x x + k_{y_1} y_1 + k_{y_2} y_2)}$$

$$e^{-s_3 d} e^{i k_z z} \sum_{I,J} \{\Phi(x_I, y_I, y_J, z_I, z_J, k) \cdot$$

$$e^{i(k_x x_I + k_{y_1} y_I + k_{y_2} y_J)} e^{-s_4 z_I} e^{-s_5 z_J}\} dk_x dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y_1 + k_{y_2} y_2)}$$

$$e^{-s_3 d} e^{i k_z z} \sum_{I,J} \{\Phi(x_I, y_I, y_J, z_I, z_J, k) \cdot$$

$$e^{i(k_x x_I + k_{y_1} y_J + k_{y_2} y_J)} e^{-s_4 z_I} e^{-s_5 z_J}\}$$

$$\left(\frac{d\omega}{dk}\right)\left(\frac{dk}{dk_z}\right) dk_x dk_{y_1} dk_{y_2} dk_z$$

[Math. 199]

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}} \quad (4\text{-}3\text{-}2)$$

-continued $$\frac{dk}{dk_z} = \frac{k_z\left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

$$s_3 = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

<V. Configuration and Operations of Imaging Device>

Based on the contents described above, the configuration and operations of an imaging device for imaging the structure of a scatterer included in an object that is present in region by using waves will be described hereinafter.

The waves as used herein may, for example, be radio waves or may be other waves such as microwaves, millimeter waves, or terahertz waves. The waves may also be light or sound. The object that is present in the region may be a living body, a manufactured material, or a natural material. In particular, the imaging device may be used for mammography, and the object may be a breast.

The scatterer included in the object that is present in the region corresponds to a portion that has a physical characteristic different from physical characteristics of surrounding media. Specifically, the physical characteristic is a physical characteristic that corresponds to the reflectance of the waves. In the case where radio waves are used as the waves, the physical characteristic may be the dielectric constant. Then, the scatterer included in the object may, for example, be a reinforcing steel contained in reinforcing steel concrete or a tumor included in a breast. The region to be measured may be equivalent to the region of the object.

Figure 14:
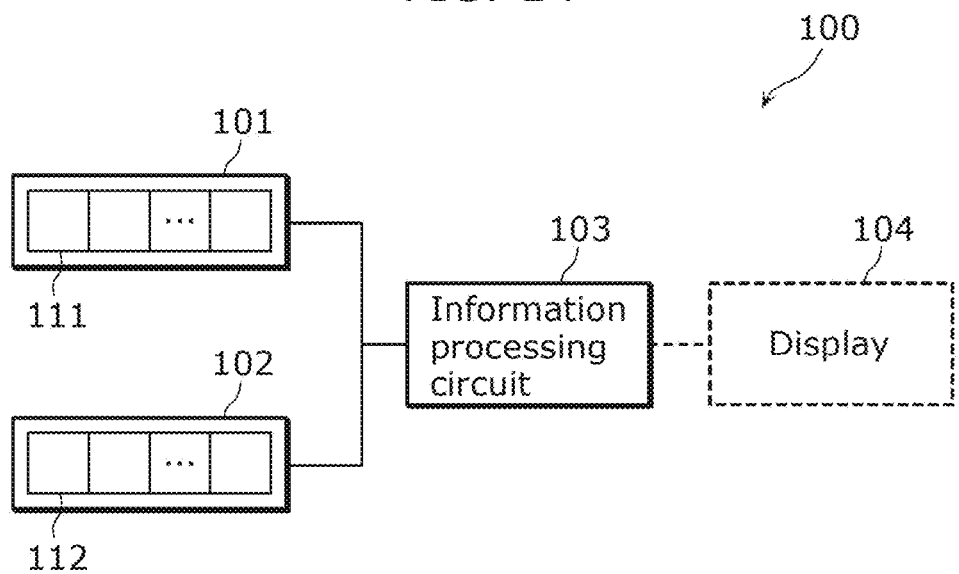
FIG. 14 is a block diagram showing a basic configuration of an imaging device according to the embodiment.

FIG. 14 is a basic schematic diagram of the imaging device according to the present embodiment. Imaging device 100 shown in FIG. 14 includes transmitter row 101, receiver row 102, and information processing circuit 103. Imaging device 100 may further include display 104.

Transmitter row 101 is a circuit that transmits waves. Specifically, transmitter row 101 includes a plurality of transmitters 111 aligned in a straight line. Each transmitter 111 transmits a wave. Imaging device 100 may include a plurality of transmitter rows 101 arranged in parallel with one another.

Receiver row 102 is a circuit that receives waves. Specifically, receiver row 102 includes a plurality of receivers 112 aligned in a different straight line that is parallel to the straight line along which transmitters 111 are aligned. Each receiver 112 receives a wave. Receiver row 102 is arranged at an interval from transmitter row 101. That is, receiver row 102 is spaced from transmitter row 101. Imaging device 100 may include a plurality of receiver rows 102 arranged in parallel with one another.

Information processing circuit 103 is a circuit that performs information processing. Specifically, information processing circuit 103 images the structure of a scatterer included in an object that is present in a region in accordance with measurement data obtained by transmitter row 101 and receiver row 102. For example, information processing circuit 103 may perform computational processing indicated by the theory described above when imaging the structure of a scatterer in accordance with the measurement data.

Information processing circuit 103 may also be a computer or a processor of a computer. Information processing circuit 103 may perform information processing by reading out a program from memory and executing the program. Alternatively, information processing circuit 103 may be a dedicated circuit that images the structure of a scatterer in accordance with measurement data.

In order to image the structure of a scatterer, information processing circuit 103 may generate an image that indicates the structure of the scatterer.

Then, information processing circuit 103 may image the structure of the scatterer by outputting the image indicating the structure of the scatterer on display 104 or the like. Alternatively, information processing circuit 103 may image the structure of the scatterer by outputting the image indicating the structure of the scatterer to a printer (not shown). As another alternative, information processing circuit 103 may image the structure of the scatterer by transmitting the image as electronic data to a different device (not shown) via wired or wireless communication.

Display 104 is a display device such as a liquid crystal display. Note that display 104 is merely an arbitrary constituent element and is not an essential constituent element. Display 104 may be an external device that is not included in the configuration of imaging device 100.

Figure 15:
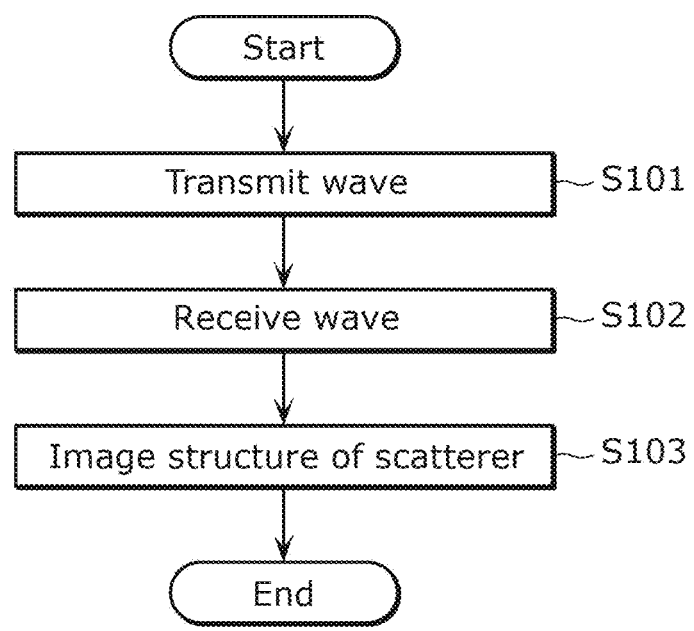
FIG. 15 is a flowchart showing basic operations of the imaging device according to the embodiment.

FIG. 15 is a flowchart showing basic operations of imaging device 100 shown in FIG. 14. Specifically, the operations shown in FIG. 15 are performed by the constituent elements of imaging device 100 shown in FIG. 14 such as transmitter row 101, receiver row 102, and information processing circuit 103.

First, transmitters 111 of transmitter row 101 transmit waves to a region to be measured (S101). For example, transmitters 111 transmit waves in sequence. Receivers 112 of receiver row 102 receive waves from the region (S102). For example, receivers 112 receive waves in parallel. The received waves can also be expressed as scattered waves. Then, information processing circuit 103 images the structure of a scatterer included in an object that is present in the region, by using measurement data obtained by transmitter rows 101 and receiver rows 102 (S103).

When imaging the structure of the scatterer, information processing circuit 103 first derives an imaging function that corresponds to a scattering field function relating to scattering of the waves in accordance with measurement data and a distance. The measurement data as used herein refers to measurement data obtained by all or some combinations of transmitters 111 and receivers 112. The distance as used herein refers to the distance between the straight line along which transmitters 111 are aligned and the straight line along which receivers 112 are aligned. Then, information processing circuit 103 uses the imaging function to image the structure of the scatterer included in the object that is present in the region.

In this way, imaging device 100 is capable of acquiring enough information as the measurement data in accordance with a variety of combinations of transmitters 111 of transmitter row 101 and receivers 112 of receiver row 102. Since there is an interval between transmitter row 101 and receiver row 102, imaging device 100 is capable of appropriately transmitting waves to the region and appropriately receiving waves from the region.

By using the imaging function derived in accordance with the measurement data on waves and the distance between transmitter row 101 and receiver row 102, imaging device 100 is capable of appropriately imaging the structure of the scatterer.

Moreover, since transmitters 111 and receivers 112 are constrained to being arranged on the two straight lines, imaging device 100 is capable of simplifying computational processing as compared with the case where transmitters 111 and receivers 112 are arranged arbitrarily. Accordingly, imaging device 100 is capable of avoiding complication of computational processing. That is, imaging device 100 is capable of imaging the structure of the scatterer included in the object that is present in the region by using waves, and is capable of improving the spatial resolution for imaging the structure of the scatterer while avoiding complication of computational processing.

For example, information processing circuit 103 may derive the scattering field function in accordance with the measurement data and the distance. Then, information processing circuit 103 may derive the imaging function in accordance with the scattering field function.

Here, the scattering field function is a function expressed as follows.

[Math. 200]

$$\varphi(x_1, y_1, x_2, y_2, z) = \iiint_D \frac{e^{ik\rho_1}}{\rho_1} \frac{e^{ik\rho_2}}{\rho_2} \varepsilon(\xi, \eta, \zeta) d\xi d\eta d\zeta$$

where $\rho_1$ and $\rho_2$ are defined by:

[Math. 201]

$$\rho_1 = \sqrt{(x_1 - \xi)^2 + (y_1 - \eta)^2 + (z - \zeta)^2}$$
$$\rho_2 = \sqrt{(x_2 - \xi)^2 + (y_2 - \eta)^2 + (z - \zeta)^2}$$

Here, $(x_1, y_1, z)$ represents the transmission position of the wave, $(x_2, y_2, z)$ represents the reception position of the wave, k represents the wave number of the wave, and D represents the region. Also, $(\xi, \eta, \zeta)$ corresponds to the reflecting position of the wave, and $\varepsilon$ corresponds to the unknown reflectance at the reflecting position.

This allows imaging device 100 to derive the scattering field function that is defined on the precondition that the transmission position and the reception position have the same z coordinate and to derive the imaging function in accordance with the derived scattering field function. Accordingly, imaging device 100 is capable of appropriately deriving the scattering field function and the imaging function in accordance with the measurement data obtained along the plane boundary of the region by using transmitters 111 of transmitter row 101 and receivers 112 of receiver row 102.

For example, information processing circuit 103 may derive the scattering field function by solving the equation satisfied by the scattering field function.

Here, the equation satisfied by the scattering field function is expressed by.

[Math. 202]

$$\left\{ \Delta_5^2 - \frac{4}{c^2} \partial_t^2 \partial_z^2 - 4\left((\partial_{x1}^2 + \partial_{y1}^2)(\partial_{x2}^2 + \partial_{y2}^2)\right) \right\} \varphi = 0$$

where $\Delta_5$ is defined by:

[Math. 203]

$$\Delta_5 = \partial_{x1}^2 + \partial_{y1}^2 + \partial_{x2}^2 + \partial_{y2}^2 + \partial_z^2$$

Also, c represents the velocity of propagation of the wave, and t represents the duration of time from transmission of the wave to reception of the wave.

This allows imaging device 100 to analytically derive the solution to the equation satisfied by the scattering field function, as the scattering field function. Accordingly, imaging device 100 is capable of efficiently deriving the appropriate scattering field function.

For example, the imaging function may be expressed by:

[Math. 204]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

where (x, y, z) represents the position to be imaged.

This allows imaging device 100 to derive the imaging function in accordance with a limit operation performed on the scattering field function. Accordingly, imaging device 100 is capable of imaging the condition of scattering in the region and appropriately imaging the structure of the scatterer included in the object that is present in the region.

For example, information processing circuit 103 may derive the following as the scattering field function.

[Math. 205]

$$\varphi(x_1, y_1, x_2, y_2, z, k) = \frac{1}{(2\pi)^3} \int_{-\infty}^\infty \int_{-\infty}^\infty \int_{-\infty}^\infty$$

$$e^{-i(k_{x_1} x_1 + k_{y_1} y_1 + k_{y_2} y_2)} e^{s_3 x_2} e^{s_4 z} e^{\frac{id(k_{x_1} + is_3)\sqrt{k^2 - k_{y_2}^2}}{\sqrt{k^2 - k_{y_1}^2} + \sqrt{k^2 - k_{y_2}^2}}}$$

$$\Phi(k_x, k_{y_1}, k_{y_2}, k) \left( \frac{d(k_{x_1} + is_3)}{dk_{x_1}} \right) dk_{x_1} dk_{y_1} dk_{y_2}$$

Here, $k_x$, $s_3$ and $s_4$ are defined by:

[Math. 206]

$$k_x = k_{x_1} + is_3$$

$$s_3 = \frac{-ik_{x_1}\sqrt{k^2 - k_{y2}^2}}{\sqrt{k^2 - k_{y1}^2}} = \frac{-ik_x\sqrt{k^2 - k_{y2}^2}}{\sqrt{k^2 - k_{y1}^2} + \sqrt{k^2 - k_{y2}^2}}$$

$$s_4 = i\sqrt{\left(\sqrt{k^2 - k_{y1}^2} + \sqrt{k^2 - k_{y2}^2}\right)^2 - \left(k_{x_1} + is_3\right)^2}$$

Also, $k_{x1}$, $k_{y1}$, and $k_{y2}$ represent the wave numbers of the scattering field function with respect to $x_1$, $y_1$, and $y_2$, and d represents the distance.

Moreover, $$\tilde{\Phi} > (k_x, k_{y_1}, k_{y_2}, k) \quad \text{[Math. 207]}$$

represents the measurement data that has undergone Fourier transform with respect to $x_1$, $y_1$, and $y_2$.

This allows imaging device 100 to appropriately reflect the measurement data on waves and the distance between transmitter row 101 and receiver row 102, on the scattering field function. Accordingly, imaging device 100 is capable of deriving the scattering field function that appropriately represents the condition of scattering.

For example, information processing circuit 103 may derive the following as the imaging function.

[Math. 208]

$$\rho(x, y, z)$$

$$= \int_0^\infty \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)} e^{s_4 z} e^{\frac{idk_x\sqrt{k^2 - k_{y2}^2}}{\sqrt{k^2 - k_{y1}^2} + \sqrt{k^2 - k_{y2}^2}}}$$

$$\Phi(k_x, k_{y_1}, k_{y_2}, k) dk_x dk_{y_1} dk_{y_2} dk$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)} e^{ik_z z} e^{\frac{idk_x\sqrt{k^2 - k_{y2}^2}}{\sqrt{k^2 - k_{y1}^2} + \sqrt{k^2 - k_{y2}^2}}}$$

$$\Phi(k_x, k_{y_1}, k_{y_2}, k)\left(\frac{dk}{dk_z}\right) dk_x dk_{y_1} dk_{y_2} dk_z$$

Here, $k_x$, $k_z$, $k$, $dk/dk_z$, and $s_4$ are defined by:

[Math. 209]

$$k_x = k_{x_1} + is_3$$

$$k_z = \sqrt{\left(\sqrt{k^2 - k_{y1}^2} + \sqrt{k^2 - k_{y2}^2}\right)^2 - k_x^2}$$

$$k = \frac{1}{2}\sqrt{k_x^2 + k_z^2 + 2(k_{y1}^2 + k_{y2}^2) + \frac{(k_{y1}^2 - k_{y2}^2)^2}{k_x^2 + k_z^2}}$$

$$\frac{dk}{dk_z} = \frac{k_z\sqrt{k^2 - k_{y1}^2}\sqrt{k^2 - k_{y2}^2}}{k(k_x^2 + k_z^2)}$$

$$s_4 = ik_z = i\sqrt{\left(\sqrt{k^2 - k_{y1}^2} + \sqrt{k^2 - k_{y2}^2}\right)^2 - (k_{x_2} + is_3)^2}$$

Moreover, $s_3$ is defined by:

[Math. 210]

$$s_3 = \frac{-ik_{x_1}\sqrt{k^2 - k_{y2}^2}}{\sqrt{k^2 - k_{y1}^2}} = \frac{-ik_x\sqrt{k^2 - k_{y2}^2}}{\sqrt{k^2 - k_{y1}^2} + \sqrt{k^2 - k_{y2}^2}}$$

Furthermore, (x, y, z) represents the position to be imaged, $k_{x1}$, $k_{y1}$, and $k_{y2}$ represent the wave numbers of the scattering field function with respect to $x_1$, $y_1$, and $y_2$, and d represents the distance.

Moreover, $$\Phi(k_x, k_{y_1}, k_{y_2}, k) \quad \text{[Math. 211]}$$

represents the measurement data obtained by Fourier transform with respect to $x_1$, $y_1$, and $y_2$.

This allows imaging device 100 to appropriately reflect the measurement data on waves and the distance between transmitter row 101 and receiver row 102, on the imaging function. Accordingly, imaging device 100 is capable of deriving the imaging function that appropriately represents the condition of scattering.

For example, imaging device 100 may include a plurality of transmitter rows 101 as transmitter rows 101, a plurality of receiver rows 102 as receiver rows 102, or both of a plurality of transmitter rows 101 and a plurality of receiver rows 102 as transmitter rows 101 and receiver rows 102.

This allows imaging device 100 to acquire enough information as the measurement data in accordance with a plurality of combinations of transmitter row(s) 101 and receiver row(s) 102. This also allows imaging device 100 to construct a multistatic relation of two directions that are respectively parallel and orthogonal to transmitter row(s) 101 and receiver row(s) 102. Accordingly, imaging device 100 is capable of appropriately imaging the structure of the scatterer included in the object that is present in the region.

For example, information processing circuit 103 may derive the following as the imaging function for one transmitter row 101 and n receiver rows 102 included in imaging device 100.

[Math. 212]

$$\rho(x, y, z) = \int_0^\infty \lim_{\substack{x_2 \to x_1 = x \\ y_2 \to y_1 = y}} \varphi(x_1, y_1, x_2, y_2, z, k) dk =$$

$$\frac{1}{(2\pi)^3}\int_{-\infty}^\infty \int_{-\infty}^\infty \int_{-\infty}^\infty \int_0^\infty e^{-i(k_x x + k_{y_1} y + k_{y_2} y)} e^{s_4 z} \cdot$$

$$\sum_{j=1,n}\left\{\exp\left(\frac{id_j k_x\sqrt{k^2 - k_{y2}^2}}{\sqrt{k^2 - k_{y1}^2} + \sqrt{k^2 - k_{y2}^2}}\right)\Phi_j(k_x, k_{y_1}, k_{y_2}, k)\right\}dk_x dk_{y_1} dk_{y_2} dk =$$

$$\frac{1}{(2\pi)^3}\int_{-\infty}^\infty \int_{-\infty}^\infty \int_{-\infty}^\infty \int_0^\infty e^{-i(k_x x + k_{y_1} y + k_{y_2} y)} e^{ik_z z} \cdot \sum_{j=1,n}\left\{\exp\left(\frac{id_j k_x\sqrt{k^2 - k_{y2}^2}}{\sqrt{k^2 - k_{y1}^2} + \sqrt{k^2 - k_{y2}^2}}\right)\right.$$

$$\left.\Phi_j(k_x, k_{y_1}, k_{y_2}, k)\right\}\left(\frac{dk}{dk_z}\right)dk_x dk_{y_1} dk_{y_2} dk_z$$

Also, $k_x$, $k_z$, $k$, $dk/dk_z$, and $s_4$ are defined by:

[Math. 213]

$$k_x = k_{x_1} + is_3$$

$$k_z = \sqrt{\left(\sqrt{k^2 - k_{y1}^2} + \sqrt{k^2 - k_{y2}^2}\right)^2 - k_x^2}$$

$$k = \frac{1}{2}\sqrt{k_x^2 + k_z^2 + 2(k_{y1}^2 + k_{y2}^2) + \frac{(k_{y1}^2 - k_{y2}^2)^2}{k_x^2 + k_z^2}}$$

$$\frac{dk}{dk_z} = \frac{k_z\sqrt{k^2 - k_{y1}^2}\sqrt{k^2 - k_{y2}^2}}{k(k_x^2 + k_z^2)}$$

$$s_4 = ik_z = i\sqrt{\left(\sqrt{k^2 - k_{y1}^2} + \sqrt{k^2 - k_{y2}^2}\right)^2 - (k_{x_1} + is_3)^2}$$

Also, $s_3$ is defined by:

[Math. 214]

$$s_3 = \frac{-ik_{x_1}\sqrt{k^2 - k_{y2}^2}}{\sqrt{k^2 - k_{y1}^2}} = \frac{-ik_x\sqrt{k^2 - k_{y2}^2}}{\sqrt{k^2 - k_{y1}^2} + \sqrt{k^2 - k_{y2}^2}}$$

Moreover, (x, y, z) represents the position to be imaged, $k_{x1}$, $k_{y1}$, and $k_{y2}$ represent the wave numbers of the scattering field function with respect to $x_1$, $y_1$, and $y_2$, and d; represents the distance.

Also, $$\Phi_j(k_x, k_{y_1}, k_{y_2}, k)$$ [Math. 215]

represents the measurement data that has undergone Fourier transform with respect to $x_1$, $y_1$, and $y_2$.

This allows imaging device 100 to appropriately reflect the measurement data on waves and the distance between transmitter row 101 and receiver row 102 on the imaging function. Specifically, imaging device 100 is capable of deriving the imaging function that appropriately represents the condition of scattering, by performing linear addition that corresponds to the distance between transmitter row 101 and receiver row 102 in accordance with the measurement data obtained in accordance with a plurality of combinations of transmitter row 101 and receiver row 102.

For example, in the case where the dielectric constant that corresponds to the reflectance in the region has frequency dependence, information processing circuit 103 may derive the following as the imaging function.

[Math. 216]

$$\rho(x, y, z) = \int_0^\infty \lim_{\substack{x_2 \to x_1 = x \\ y_2 \to y_1 = y}} \varphi(x_1, y_1, x_2, y_2, z, k) d\omega =$$

$$\frac{1}{(2\pi)^3}\int_0^\infty d\omega \int_{-\infty}^\infty \int_{-\infty}^\infty \int_{-\infty}^\infty e^{-i(k_x x + k_{y_1} y + k_{y_2} y)} e^{s_4 z} e^{\frac{idk_x\sqrt{k^2-k_{y2}^2}}{\sqrt{k^2-k_{y1}^2}+\sqrt{k^2-k_{y2}^2}}}$$

$$\Phi(k_x, k_{y_1}, k_{y_2}, k) dk_x dk_{y_1} dk_{y_2} = \frac{1}{(2\pi)^3}\int_0^\infty \int_{-\infty}^\infty \int_{-\infty}^\infty \int_{-\infty}^\infty e^{-i(k_x x + k_{y_1} y + k_{y_2} y)} e^{ik_z z}$$

-continued $$e^{\frac{idk_x\sqrt{k^2-k_{y2}^2}}{\sqrt{k^2-k_{y1}^2}+\sqrt{k^2-k_{y2}^2}}} \cdot \Phi(k_x, k_{y_1}, k_{y_2}, k)\left(\frac{d\omega}{dk}\right)\left(\frac{dk}{dk_z}\right) dk_x dk_{y_1} dk_{y_2} dk_z$$

Also, $k_x$, $k_z$, $k$, $dk/dk_z$, $d\omega/dk$, and $s_4$ are defined by:

[Math. 217]

$$k_x = k_{x_1} + is_3$$

$$k_z = \sqrt{\left(\sqrt{k^2 - k_{y1}^2} + \sqrt{k^2 - k_{y2}^2}\right)^2 - k_x^2}$$

$$k = \frac{1}{2}\sqrt{k_x^2 + k_z^2 + 2(k_{y1}^2 + k_{y2}^2) + \frac{(k_{y1}^2 - k_{y2}^2)^2}{k_x^2 + k_z^2}}$$

$$\frac{dk}{dk_z} = \frac{k_z\sqrt{k^2 - k_{y1}^2}\sqrt{k^2 - k_{y2}^2}}{k(k_x^2 + k_z^2)}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

$$s_4 = ik_z = i\sqrt{\left(\sqrt{k^2 - k_{y1}^2} + \sqrt{k^2 - k_{y2}^2}\right)^2 - (k_{x_1} + is_3)^2}$$

Also, $s_3$ is defined by:

[Math. 218]

$$s_3 = \frac{-ik_{x_1}\sqrt{k^2 - k_{y2}^2}}{\sqrt{k^2 - k_{y1}^2}} = \frac{-ik_x\sqrt{k^2 - k_{y2}^2}}{\sqrt{k^2 - k_{y1}^2} + \sqrt{k^2 - k_{y2}^2}}$$

Moreover, (x, y, z) represents the position to be imaged, $k_{x1}$, $k_{y1}$, and $k_{y2}$ represent the wave numbers of the scattering field function with respect to $x_1$, $y_1$, and $y_2$, d represents the distance, W represents the angular frequency of the wave, $c_0$ represents the velocity of propagation of the wave in vacuum, and a, b, and a represent parameters relating to Debye's relaxation.

Also, $$\Phi(k_x, k_{y_1}, k_{y_2}, k)$$ [Math. 219]

represents the measurement data that has undergone Fourier transform with respect to $x_1$, $y_1$, and $y_2$.

This allows imaging device 100 to derive the imaging function that reflects the parameters relating to Debye's relaxation. Accordingly, imaging device 100 is capable of avoiding accuracy degradation that may occur depending on the frequency of the wave.

For example, information processing circuit 103 may derive the scattering field function in accordance with the measurement data and the distance. Then, information processing circuit 103 may derive the imaging function in accordance with the scattering field function.

Here, the scattering field function is a function expressed by:

[Math. 220]

$$\varphi(x_1, y_1, x_2, y_2, z_1, z_2, k) = \iint_D \frac{e^{ik\rho_1}}{\rho_1} \frac{e^{ik\rho_2}}{\rho_2} \varepsilon(\xi, \eta, \zeta) d\xi d\eta d\zeta$$

Also, $\rho_1$ and $\rho_2$ are defined by:

[Math. 221]

$$\rho_1 = \sqrt{(x_1 - \xi)^2 + (y_1 - \eta)^2 + (z_1 - \zeta)^2}$$
$$\rho_2 = \sqrt{(x_2 - \xi)^2 + (y_2 - \eta)^2 + (z_2 - \zeta)^2}$$

Moreover, $(x_1, y_1, z_1)$ represents the transmission position of the wave, $(x_2, y_2, z_2)$ represents the reception position of the wave, k represents the wave number of the wave, and D represents the region. Furthermore, $(\xi, \eta, \zeta)$ corresponds to the reflecting position of the wave, and E corresponds to the unknown reflectance at the reflecting position.

This allows imaging device 100 to derive the scattering field function defined on the precondition that the transmission position and the reception position have different z coordinates, and to derive the imaging function in accordance with the derived scattering field function. Accordingly, imaging device 100 is capable of appropriately deriving the scattering field function and the imaging function in accordance with the measurement data obtained along the tangential plane in the region having a curved boundary by using transmitters 111 of transmitter row 101 and receivers 112 of receiver row 102.

For example, information processing circuit 103 may derive the scattering field function by solving the equation satisfied by the scattering field function.

Here, the equation satisfied by the scattering field function is expressed by:

[Math. 222]

$$\{\Delta_6 - 2(ik)^2\}\varphi(x_1, y_1, x_2, y_2, z_1, z_2, k) = 0$$

Also, $\Delta_6$ is defined by:

[Math. 223]

$$\Delta_6 = \partial_{x_1}^2 + \partial_{x_2}^2 + \partial_{y_1}^2 + \partial_{y_2}^2 + \partial_{z_1}^2 + \partial_{z_2}^2$$

This allows imaging device 100 to analytically derive the solution to the equation satisfied by the scattering field function, as the scattering field function. Accordingly, imaging device 100 is capable of efficiently deriving the appropriate scattering field function.

For example, the imaging function may be expressed by:

[Math. 224]

$$p(x, y, z) = \int_0^\infty \varphi(x, y, x, y, z, z, k) dk$$

where (x, y, z) represents the position to be imaged.

This allows imaging device 100 to derive the imaging function by using the scattering field function that has received input of the position to be imaged. Accordingly, imaging device 100 is capable of imaging the condition of scattering in the region and appropriately imaging the structure of the scatterer included in the object that is present in the region.

For example, information processing circuit 103 may derive the following as the scattering field function.

[Math. 225]

$$\varphi(x_1, y_1, x_2, y_2, z_1, z_2, k) = \frac{1}{(2\pi)^3} \int_{-\infty}^{\infty} \int_{-\infty}^{\infty} \int_{-\infty}^{\infty} e^{-i(k_{x_1} x_1 + k_{y_1} y_1 + k_{y_2} y_2)}$$

$$\sum_{I,J} \left\{ \Phi(x_I, y_I, y_J, z_I, z_J, k) \cdot e^{i(k_x x_I + k_{y_1} y_I + k_{y_2} y_J)} \right.$$

$$\left. e^{-s_3 d} e^{-s_4 z_I} e^{-s_5 z_J} \right\} e^{s_3 x_2} e^{s_4 z_1} e^{s_5 z_2} \frac{d(k_x + is_3)}{dk_{x_1}} dk_{x_1} dk_{y_1} dk_{y_2}$$

Here, $k_x$, $s_3$, $s_4$, and $s_5$ are defined by:

[Math. 226]

$$k_x = k_{x_1} + is_3$$

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

$$s_4 = \frac{i\sqrt{k^2 - k_{y_1}^2}\sqrt{\left(\sqrt{k^2 - k_{y_1}^2} + \sqrt{k^2 - k_{y_2}^2}\right) - k_x^2}}{\sqrt{k^2 - k_{y_1}^2} + \sqrt{k^2 - k_{y_2}^2}}$$

$$s_5 = \frac{i\sqrt{k^2 - k_{y_2}^2}\sqrt{\left(\sqrt{k^2 - k_{y_1}^2} + \sqrt{k^2 - k_{y_2}^2}\right) - k_x^2}}{\sqrt{k^2 - k_{y_1}^2} + \sqrt{k^2 - k_{y_2}^2}}$$

Also, $k_{x_1}$, $k_{y_1}$, and $k_{y_2}$ represent the wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

This allows imaging device 100 to appropriately reflect the measurement data on the waves and the distance between transmitter row 101 and receiver row 102 on the scattering field function. Accordingly, imaging device 100 is capable of deriving the scattering field function that appropriately represents the condition of scattering.

For example, information processing circuit 103 may derive the following as the imaging function.

[Math. 227]

$$\rho(x, y, z) = \int_0^\infty \varphi(x, y, x, y, z, z, k)dk$$

$$= \frac{1}{(2\pi)^3} \int_0^\infty dk \int_{-\infty}^\infty \int_{-\infty}^\infty \int_{-\infty}^\infty e^{-i(k_x x + k_{y_1} y_1 + k_{y_2} y_2)} e^{-s_3 d} e^{ik_z z}$$

$$\sum_{I,J} \left\{ \Phi(x_I, y_I, y_J, z_I, z_J, k) \cdot e^{i(k_x x_J + k_{y_1} y_J + k_{y_2} y_J)} e^{-s_4 z_I} e^{-s_5 z_J} \right\} dx_x dk_{y_1} dk_{y_2}$$

$$= \frac{1}{(2\pi)^3} \int_0^\infty \int_{-\infty}^\infty \int_{-\infty}^\infty \int_{-\infty}^\infty \int_{-\infty}^\infty e^{-i(k_x x + k_{y_1} y_1 + k_{y_2} y_2)} e^{-s_3 d} e^{ik_z z}$$

$$\sum_{I,J} \left\{ \Phi(x_I, y_I, y_J, z_I, z_J, k) \cdot e^{i(k_x x_J + k_{y_1} y_J + k_{y_2} y_J)} e^{-s_4 z_I} e^{-s_5 z_J} \right\} \left( \frac{dk}{dk_z} \right) dk_x dk_{y_1} dk_{y_2} dk_s$$

Here, $k_x$, $k_z$, $k$, $dk/dk_z$, $s_3$, $s_4$, and $s_5$ are defined by:

[Math. 228]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \left\{ 1 - \frac{(k_{y_1}^2 - k_{y_2}^2)^2}{(k_x^2 + k_z^2)^2} \right\}}{2\sqrt{k_x^2 + k_s^2 + 2(k_{y_1}^2 + k_{y_2}^2) + \frac{(k_{y_1}^2 - k_{y_2}^2)^2}{k_x^2 + k_z^2}}}$$

$$s_3 = \frac{-ik_{x_1}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

Also, (x, y, z) represents the position to be imaged, $k_{x1}$, $k_{y1}$, and $k_{y2}$ represent the wave numbers of the scattering field function with respect to $x_1$, $y_1$, and $y_2$, d represents the distance, and $\Phi$ ($x_I$, $y_I$, $y_J$, $z_I$, $z_J$, k) represents the measurement data when the transmission position is located at ($x_I$, $y_I$, $z_I$) and the reception position is located at ($x_I$+d, $y_J$, $z_J$).

This allows imaging device 100 to appropriately reflect the measurement data on the waves and the distance between transmitter row 101 and receiver row 102 on the imaging function. Accordingly, imaging device 100 is capable of deriving the imaging function that appropriately represents the condition of scattering.

For example, information processing circuit 103 may derive the imaging function by merging of a plurality of scattering field functions that correspond respectively to a plurality of combinations of transmitter row(s) 101 and receiver row(s) 102.

Each of the scattering field functions is expressed by:

[Math. 229]

$$\varphi(x_1, y_1, x_2, y_2, z_1, z_2, k) = \frac{1}{(2\pi)^3} \int_{-\infty}^\infty \int_{-\infty}^\infty \int_{-\infty}^\infty e^{-i(k_{x_1} x_1 + k_{y_1} y_1 + k_{y_2} y_2)}$$

$$\sum_{I,J} \left\{ \Phi(x_I, y_I, y_J, z_I, z_J, k) \cdot e^{i(k_x x_I + k_{y_1} y_I + k_{y_2} y_J)} \right.$$

$$\left. e^{-s_3 d} e^{-s_4 z_I} e^{-s_5 z_J} \right\} e^{s_3 x_2} e^{s_4 z_1} e^{s_5 z_2} \frac{d(k_x + is_3)}{dk_{x_1}} dk_{x_1} dk_{y_1} dk_{y_2}$$

Also, $k_x$, $s_3$, $s_4$, and $s_5$ are defined by:

[Math. 230]

$$k_x = k_{x_1} + is_3$$

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

$$s_4 = \frac{i\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_5 = \frac{i\sqrt{k^2 - k_{y_2}^2}\sqrt{\left(\sqrt{k^2 - k_{y_1}^2} + \sqrt{k^2 - k_{y_1}^2}\right)^2 - k_x^2}}{\sqrt{k^2 - k_{y_1}^2} + \sqrt{k^2 - k_{y_2}^2}}$$

Moreover, $k_{x1}$, $k_{y1}$, and $k_{y2}$ represent the wave numbers of the scattering field function with respect to $x_1$, $y_1$, and $y_2$, d represents the distance, and $\Phi(x_I, y_I, y_J, z_I, z_J, k)$ represents the measurement data when the transmission position is located at ($x_I$, $y_I$, $z_I$) and the reception position is located at ($x_I$+d, $y_J$, $z_J$).

This allows imaging device 100 to derive the imaging function that appropriately represents the condition of scattering by merging of the scattering field functions that reflect the measurement data on the waves and the distance between transmitter row(s) 101 and receiver row(s) 102.

For example, when the dielectric constant that corresponds to the reflectance in the region has frequency dependence, information processing circuit 103 may derive the following as the imaging function.

[Math. 231]

$$\rho(x, y, z) = \int_0^\infty \varphi(x, y, x, y, z, z, k) d\omega$$

$$= \frac{1}{(2\pi)^3} \int_0^\infty d\omega \int_{-\infty}^\infty \int_{-\infty}^\infty \int_{-\infty}^\infty e^{-i(k_1 x + k_{y_1} y_1 + k_{y_2} y_2)} e^{-s_3 d} e^{ik_z z}$$

$$\sum_{I,J} \left\{ \Phi(x_I, y_I, y_J, z_I, z_J, k) \cdot e^{i(k_x x_J + k_{y_1} y_J + k_{y_2} y_J)} e^{-s_4 z_I} e^{-s_5 z_J} \right\} dx_x dk_{y_1} dk_{y_2}$$

$$= \frac{1}{(2\pi)^3} \int_0^\infty \int_{-\infty}^\infty \int_{-\infty}^\infty \int_{-\infty}^\infty \int_{-\infty}^\infty e^{-i(k_1 x + k_{y_1} y_1 + k_{y_2} y_2)} e^{-s_3 d} e^{ik_z z}$$

$$\sum_{I,J} \left\{ \Phi(x_I, y_I, y_J, z_I, z_J, k) \cdot e^{i(k_x x_J + k_{y_1} y_J + k_{y_2} y_J)} \right\}$$

$$e^{-s_4 z_I} e^{-s_5 z_J} \left\} \left( \frac{d\omega}{dk} \right) \left( \frac{dk}{dk_z} \right) dk_x dk_{y_1} dk_{y_2} dk_z$$

Here, k, $k_z$, k, $dk/dk_z$, $d\omega/dk$, $s_3$, $s_4$, and $s_5$ are defined by:

[Math. 232]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$\frac{d\omega}{dk} = \frac{c_0^2 k + \alpha c_0^2 \omega^2 k}{(a + b)\omega + 2a\alpha\omega^2 - \alpha c_0^2 \omega k^2}$$

$$s_3 = \frac{-ik_{x_2}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

Also, (x, y, z) represents the position to be imaged, $k_{x_1}$, $k_{y_1}$, and $k_{y_2}$ represent the wave numbers of the scattering field function with respect to $x_1$, $y_1$, and $y_2$, d represents the distance, ω represents the angular frequency of the wave, $c_0$ represents the velocity of propagation of the wave in vacuum, and a, b, and α represent parameters relating to Debye's relaxation.

Also, $$\check{\Phi} > (k_x, k_{y_1}, k_{y_2}, k)$$

[Math. 233]

represents the measurement data that has undergone Fourier transform with respect to $x_1$, $y_1$, and $y_2$.

This allows imaging device 100 to derive the imaging function that reflects the parameters relating to Debye's relaxation. Accordingly, imaging device 100 is capable of avoiding accuracy degradation that may occur depending on the frequency of the wave.

For example, the scattering field function may be defined as a function for inputting the transmission position of the wave and the reception position of the wave and outputting a value that indicates the wave at the reception position. The imaging function may be defined based on the transmission position and the value output from the scattering field function as a result of inputting the position to be imaged as the reception position to the scattering field function.

Then, information processing circuit 103 may derive the scattering field function by using the measurement data as boundary conditions and derive the imaging function by using the scattering field function. Here, the scattering field function and the imaging function may reflect the distance between the straight line along which transmitters 111 are aligned and the straight line along which receivers 112 are aligned.

For example, other constituent elements, expressions, variables, and so on described in the present embodiment are applicable as appropriate to transmitter row 101, receiver row 102, information processing circuit 103, the scattering field function, the imaging function, and so on described above as to the basic configuration and the basic operations.

The scattering field function, the imaging function, and so on given in the present embodiment may be modified and applied as appropriate. For example, it is possible to use a mathematical expression that represents substantially the same content as that given by the mathematical expression described above, or to use any other mathematical expression derived based on the theory described above.

Figure 16:
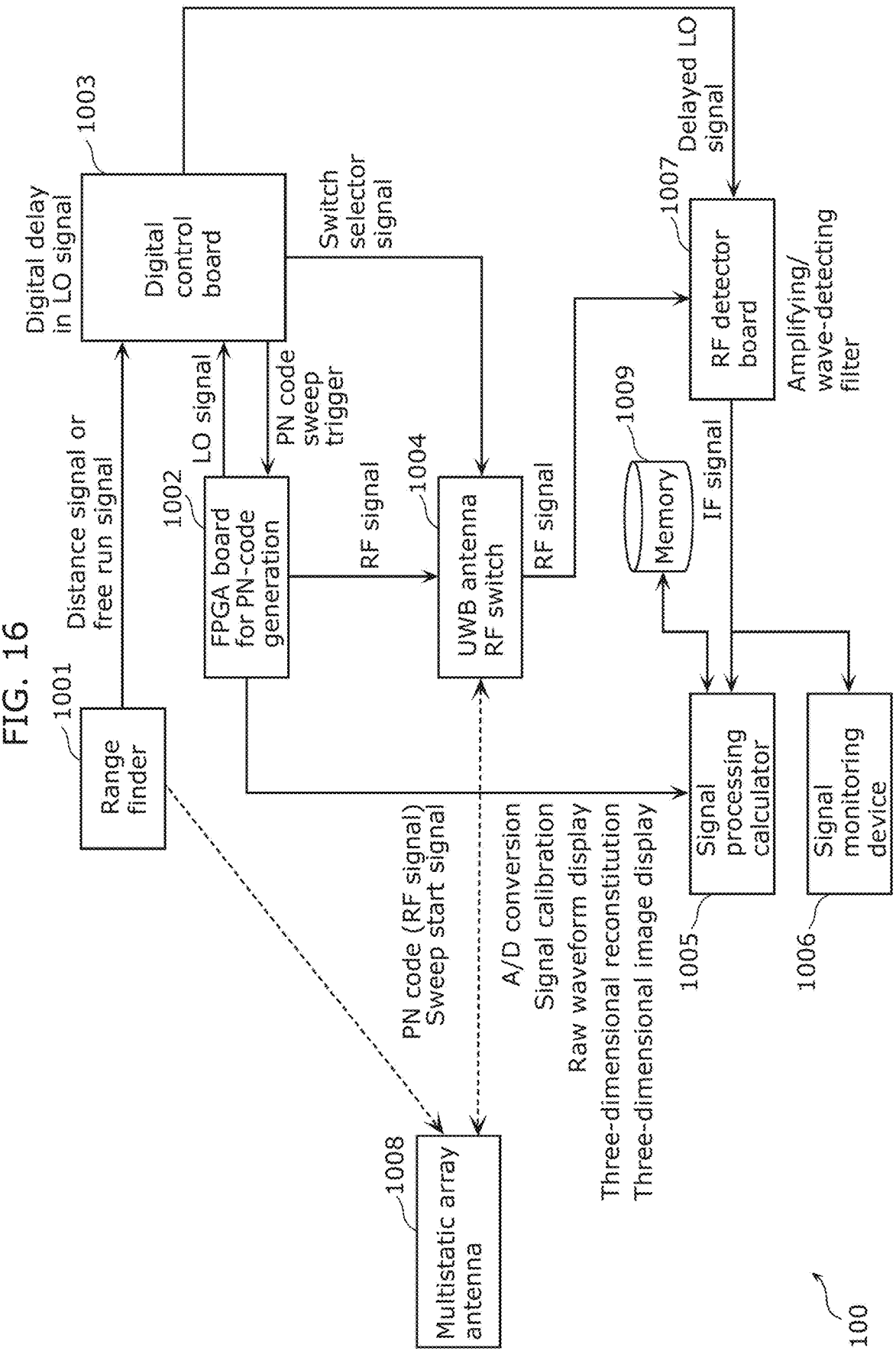
FIG. 16 is a block diagram showing a specific configuration of the imaging device according to the embodiment.

FIG. 16 is a block diagram showing a specific configuration of imaging device 100 shown in FIG. 14.

Transmitter row 101 and receiver row 102 of imaging device 100 shown in FIG. 14 may be included in multistatic array antenna 1008. Information processing circuit 103 of imaging device 100 shown in FIG. 14 may correspond to one or more of a plurality of constituent elements shown in FIG. 16. Specifically, for example, information processing circuit 103 may correspond to signal processing calculator 1005. Moreover, display 104 shown in FIG. 14 may correspond to signal monitoring device 1006.

Microwave signals used in imaging device 100 are pseudo-random time-series signals (pseudo-noise (PN) codes) that have frequency components from DC to 20 GHz. These signals are output from FPGA board 1002 for generation of PN codes. More specifically, these signals come in two types. One type of signals (local oscillator (LO) signals) are transmitted via a delay circuit (digital control board 1003) to an RF detector circuit (RF wave detector board 1007).

The other type of signals (radio frequency (RF) signals) are transmitted and radiated to a microwave UWB antenna for transmission in multistatic array antenna 1008. Scattered microwave signals are received by an UWB antenna for reception in multistatic array antenna 1008 and transmitted to the RF detector circuit (RF wave detector board 1007). Here, the transmit/receive signals pass through an antenna-element selection switch (UWB antenna RF switch 1004).

Delayed signals (LO signals) are delayed by the amount of time corresponding to $\frac{1}{2}n$ times the duration of time over which the values of the PN codes change, where n is an integer greater than 2. Detected signals are A/D converted and stored as intermediate frequency (IF) signals by signal processing calculator 1005. Moreover, information indicating the detected signals may be displayed on signal monitoring device 1006.

Timing of these series of operations is controlled by a microprocessor in digital control board 1003 so as to synchronize with signals received from range finder 1001 (distance signals or free run signals). For example, the microprocessor in digital control board 1003 may transmit, for example, a switch selector signal and a PN-code sweep trigger.

Moreover, signal processing calculator 1005 do a three-dimensional reconstitution by using the signals that are A/D converted and stored, so as to display a three-dimensional image. Signal processing calculator 1005 may also do signal calibration. Signal processing calculator 1005 may also display raw waveforms. Moreover, for example, signal processing calculator 1005 may store three-dimensional images or other data in memory 1009.

The configuration shown in FIG. 16 is merely an example, and the configuration of imaging device 100 is not limited to the one shown in FIG. 16. Part of the configuration shown in FIG. 16 may be omitted, or may be modified.

(Supplemental Remarks)

While some aspects of the imaging device have been described thus far with reference to the embodiment, the modes of the imaging device are not limited to this embodiment. Any modification conceivable by those skilled in the art may be made to the embodiment, and a plurality of constituent elements according to the embodiment may be combined arbitrarily. For example, processing that is executed by a specific constituent element according to the embodiment may be executed by a different constituent element, instead of the specific constituent element. Moreover, a sequence of a plurality of processes may be changed, or a plurality of processes may be executed in parallel.

The imaging method including steps executed by each constituent element of the imaging device may be executed by any arbitrary device or system. For example, part or all of the imaging method may be executed by a computer that includes, for example, a processor, memory, and an input/output circuit. At this time, a program for causing the computer to execute the imaging method may be executed by the computer to execute the imaging method.

The above-described program may be recorded on a non-transitory computer-readable recording medium.

Each constituent element of the imaging device may be configured by dedicated hardware or by general-purpose hardware that executes the above-described program or the like, or may be configured by a combination of them. The general-purpose hardware may be configured by, for example, memory that records the program and a general-purpose processor that reads out and execute the program from the memory. The memory as used herein may, for example, be semiconductor memory or a hard disk, and the general-purpose processor may, for example, be a CPU.

The dedicated hardware may be configured by, for example, memory and a dedicated processor. For example, the dedicated processor may execute the imaging method described above with reference to the memory for recording measurement data.

Each constituent element of the imaging device may be an electric circuit. These electric circuits may be configured as a single electric circuit as a whole, or each may be a different electric circuit. These electric circuits may correspond to dedicated hardware or general-purpose hardware that executes the above-described program or the like.

INDUSTRIAL APPLICABILITY

One aspect of the present disclosure is useful in the imaging device for imaging the structure of a scatterer included in an object that is present in a region by using waves, and is applicable to, for example, geophysical exploration or medical diagnosis.

REFERENCE SIGNS LIST 100 imaging device
101 transmitter row
102 receiver row
103 information processing circuit
104 display
111 transmitter
112 receiver
1001 range finder
1002 FPGA board for generation of PN codes
1003 digital control board
1004 UWB antenna RF switch
1005 signal processing calculator
1006 signal monitoring device
1007 RF wave detector board
1008 multistatic array antenna
1009 memory

The invention claimed is:

1. An imaging device comprising:
a transmitter row including a plurality of transmitters that are aligned in a straight line and that transmit a wave to a region to be measured;
a receiver row including a plurality of receivers and provided at an interval from the transmitter row, the plurality of receivers being aligned in a different straight line parallel to the straight line along which the plurality of transmitters are aligned, and receiving the wave from the region; and
an information processing circuit that derives an imaging function in accordance with measurement data and a distance and uses the imaging function to image a structure of a scatterer included in an object that is present in the region, the imaging function corresponding to a scattering field function relating to scattering of the wave, the measurement data being obtained by all or some combinations of the plurality of transmitters and the plurality of receivers, the distance being a distance between the straight line along which the plurality of transmitters are aligned and the different straight line along which the plurality of receivers are aligned.

2. The imaging device according to claim 1,
wherein the information processing circuit derives the scattering field function in accordance with the measurement data and the distance and derives the imaging function in accordance with the scattering field function, and the scattering field function is a function expressed by:

[Math. 1]

$$\varphi(x_1, y_1, x_2, y_2, z) = \iiint_D \frac{e^{ik\rho_1}}{\rho_1} \frac{e^{ik\rho_2}}{\rho_2} \varepsilon(\xi, \eta, \zeta) d\xi d\eta d\zeta$$

where $\rho_1$ and $\rho_2$ are defined by:

[Math. 2]

$$\rho_1 = \sqrt{(x_1-\xi)^2 + (y_1-\eta)^2 + (z-\zeta)^2}$$
$$\rho_2 = \sqrt{(x_2-\xi)^2 + (y_2-\eta)^2 + (z-\zeta)^2}$$

where $(x_1, y_1, z)$ represents a transmission position of the wave, $(x_2, y_2, z)$ represents a reception position of the wave, k represents a wave number of the wave, D represents the region, $(\xi, \eta, \zeta)$ corresponds to a reflecting position of the wave, and F corresponds to unknown reflectance at the reflecting position.

3. The imaging device according to claim 2,
wherein the information processing circuit derives the scattering field function by solving an equation satisfied by the scattering field function, and
the equation is expressed by:

[Math. 3]

$$\left\{\Delta_5^2 - \frac{4}{c^2}\partial_t^2 \partial_z^2 - 4(\partial_{x_1}^2 + \partial_{y_1}^2)(\partial_{x_2}^2 + \partial_{y_2}^2)\right\}\varphi = 0$$

where $\Delta_5$ is defined by:

$$\Delta_5 = \partial_{x_1}^2 + \partial_{y_1}^2 + \partial_{x_2}^2 + \partial_{y_2}^2 + \partial_z^2 \quad \text{[Math. 4]}$$

where c represents a velocity of propagation of the wave, and t represents a duration of time from transmission of the wave to reception of the wave.

4. The imaging device according to claim 2,
wherein the imaging function is expressed by:

[Math. 5]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

where (x, y, z) represents a position to be imaged.

5. The imaging device according to claim 2,
wherein the information processing circuit derives, as the scattering field function:

[Math. 6]

$$\varphi(x_1, y_1, x_2, y_2, z, k) =$$

$$\frac{1}{(2\pi)^3} \int_{-\infty}^{\infty}\int_{-\infty}^{\infty}\int_{-\infty}^{\infty} e^{-i(k_{x_1}x_1 + k_{y_1}y_1 + k_{y_2}y_2)} e^{s_3 x_2} e^{s_4 z} e^{\frac{id(k_{x_1}+is_3)\sqrt{k^2-k_{y_2}^2}}{\sqrt{k^2-k_{y_1}^2}+\sqrt{k^2-k_{y_2}^2}}}$$

$$\Phi(k_x, k_{y_1}, k_{y_2}, k)\left(\frac{d(k_{x_1}+is_3)}{dk_{x_1}}\right) dk_{x_1} dk_{y_1} dk_{y_2}$$

where $k_x$, $s_3$, and $s_4$ are defined by:

[Math. 7]

$$k_x = k_{x_1} + is_3$$

$$s_3 = \frac{-ik_{x_1}\sqrt{k^2-k_{y_2}^2}}{\sqrt{k^2-k_{y_1}^2}} = \frac{-ik_x\sqrt{k^2-k_{y_2}^2}}{\sqrt{k^2-k_{y_1}^2}+\sqrt{k^2-k_{y_2}^2}}$$

$$s_4 = i\sqrt{\left(\sqrt{k^2-k_{y_1}^2}+\sqrt{k^2-k_{y_2}^2}\right)^2 - (k_{x_1}+is_3)^2}$$

where $k_{x1}$, $k_{y1}$, and $k_{y2}$ represent wave numbers of the scattering field function with respect to $x_1$, $y_1$, and $y_2$, and d represents the distance, and $$\Phi(k_x, k_{y_1}, k_{y_2}, k) \quad \text{[Math. 8]}$$

represents the measurement data that has undergone Fourier transform with respect to $x_1$, $y_1$, and $y_2$.

6. The imaging device according to claim 2,
wherein the information processing circuit derives, as the imaging function:

[Math. 9]

$$\rho(x, y, z) = \int_0^\infty \lim_{\substack{x_2 \to x_1 = x \\ y_2 \to y_1 = y}} \varphi(x_1, y_1, x_2, y_2, z, k) dk$$

$$= \frac{1}{(2\pi)^3} \int_0^\infty \int_{-\infty}^{\infty}\int_{-\infty}^{\infty}\int_{-\infty}^{\infty} e^{-i(k_x x + k_{y_1} y + k_{y_2} y)} e^{s_4 z} e^{\frac{idk_x\sqrt{k^2-k_{y_2}^2}}{\sqrt{k^2-k_{y_1}^2}+\sqrt{k^2-k_{y_2}^2}}}$$

$$\Phi(k_x, k_{y_1}, k_{y_2}, k) dk_x dk_{y_1} dk_{y_2} dk$$

$$= \frac{1}{(2\pi)^3} \int_0^\infty \int_{-\infty}^{\infty}\int_{-\infty}^{\infty}\int_{-\infty}^{\infty} e^{-i(k_x x + k_{y_1} y + k_{y_2} y)} e^{ik_z z} e^{\frac{idk_x\sqrt{k^2-k_{y_2}^2}}{\sqrt{k^2-k_{y_1}^2}+\sqrt{k^2-k_{y_2}^2}}}$$

$$\Phi(k_x, k_{y_1}, k_{y_2}, k)\left(\frac{dk}{dk_z}\right) dk_x dk_{y_1} dk_{y_2} dk_z$$

where $k_x$, $k_z$, k, $dk/dk_z$, and $s_4$ are defined by:

[Math. 10]

$$k_x = k_{x_1} + is_3$$

$$k_z = \sqrt{\left(\sqrt{k^2-k_{y_1}^2}+\sqrt{k^2-k_{y_2}^2}\right)^2 - k_x^2}$$

-continued $$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\sqrt{k^2 - k_{y_1}^2}\sqrt{k^2 - k_{y_2}^2}}{k(k_x^2 + k_z^2)}$$

$$s_4 = ik_z = i\sqrt{\left(\sqrt{k^2 - k_{y_1}^2} + \sqrt{k^2 - k_{y_2}^2}\right)^2 - (k_{x_1} + is_3)^2}$$

where $s_3$ is defined by:

[Math. 11]

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

where (x, y, z) represents a position to be imaged, $k_{x_1}$, $k_{y_1}$ and $k_{y_2}$ represent wave numbers of the scattering field function with respect to $x_1$, $y_1$, and $y_2$, d represents the distance, and $$\tilde{\Phi}(k_x, k_{y_1}, k_{y_2}, k) \quad \text{[Math. 12]}$$

represents the measurement data that has undergone Fourier transform with respect to $x_1$, $y_1$, and $y_2$.

7. The imaging device according to claim 1, comprising:
a plurality of transmitter rows as the transmitter row;
a plurality of receiver rows as the receiver row; or
a plurality of transmitter rows and a plurality of receiver rows as the transmitter row and the receiver row.

8. The imaging device according to claim 2, comprising:
a plurality of transmitter rows as the transmitter row;
a plurality of receiver rows as the receiver row; or
a plurality of transmitter rows and a plurality of receiver rows as the transmitter row and the receiver row.

9. The imaging device according to claim 8,
wherein the information processing circuit derives, as the scattering field function:

[Math. 13]

$$\varphi(x_1, y_1, x_2, y_2, z, k) =$$
$$\frac{1}{(2\pi)^3}\int_{-\infty}^{\infty}\int_{-\infty}^{\infty}\int_{-\infty}^{\infty}e^{-i(k_{x_1}x_1 + k_{y_1}y_1 + k_{y_2}y_2)}e^{s_3 x_2}e^{s_4 z}e^{\frac{id(k_{x_1}+is_3)\sqrt{k^2-k_{y_2}^2}}{\sqrt{k^2-k_{y_1}^2}+\sqrt{k^2-k_{y_2}^2}}}$$

$$\Phi(k_x, k_{y_1}, k_{y_2}, k)\left(\frac{d(k_{x_1}+is_3)}{dk_{x_1}}\right)dk_{x_1}dk_{y_1}dk_{y_2}$$

where $k_x$, $s_3$, and $s_4$ are defined by:

[Math. 14]

$$k_x = k_{x_1} + is_3$$

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

$$s_4 = i\sqrt{\left(\sqrt{k^2 - k_{y_1}^2} + \sqrt{k^2 - k_{y_2}^2}\right)^2 - (k_{x_1} + is_3)^2}$$

where $k_{x_1}$, $k_{y_1}$, and $k_{y_2}$ represent wave numbers of the scattering field function with respect to $x_1$, $y_1$, and $y_2$, d represents the distance, and $$\tilde{\Phi}(k_x, k_{y_1}, k_{y_2}, k) \quad \text{[Math. 15]}$$

represents the measurement data that has undergone Fourier transform with respect to $x_1$, $y_1$, and $y_2$.

10. The imaging device according to claim 8,
wherein, for one transmitter row and n receiver rows that are included as the transmitter row and the receiver row in the imaging device, the information processing circuit derives, as the imaging function:

[Math. 16]

$$\rho(x, y, z) = \int_0^\infty \lim_{\substack{x_2 \to x_1 = x \\ y_2 \to y_1 = y}} \varphi(x_1, y_1, x_2, y_2, z, k)dk$$

$$= \frac{1}{(2\pi)^3}\int_{-\infty}^{\infty}\int_{-\infty}^{\infty}\int_{-\infty}^{\infty}\int_0^\infty e^{-i(k_x x + k_{y_1} y + k_{y_2} y)}e^{s_4 z} \cdot$$

$$\sum_{j=1,n}\left\{\exp\left(\frac{id_j k_x\sqrt{k^2 - k_{y_2}^2}}{\sqrt{k^2 - k_{y_1}^2} + \sqrt{k^2 - k_{y_2}^2}}\right)\right.$$

$$\left.\Phi_j(k_x, k_{y_1}, k_{y_2}, k)\right\}dk_x dk_{y_1} dk_{y_2} dk$$

$$= \frac{1}{(2\pi)^4}\int_{-\infty}^{\infty}\int_{-\infty}^{\infty}\int_{-\infty}^{\infty}\int_0^\infty e^{-i(k_x x + k_{y_1} y + k_{y_2} y)}e^{ik_z z} \cdot$$

$$\sum_{j=1,n}\left\{\exp\left(\frac{id_j k_x\sqrt{k^2 - k_{y_2}^2}}{\sqrt{k^2 - k_{y_1}^2} + \sqrt{k^2 - k_{y_2}^2}}\right)\right.$$

$$\left.\Phi_j(k_x, k_{y_1}, k_{y_2}, k)\right\}\left(\frac{dk}{dk_z}\right)dk_x dk_{y_1} dk_{y_2} dk_z$$

where $k_x$, $k_z$, $k$, $dk/dk_z$, and $s_4$ are defined by:

[Math. 17]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\sqrt{k^2 - k_{y_1}^2}\sqrt{k^2 - k_{y_2}^2}}{k(k_x^2 + k_z^2)}$$

$$s_4 = ik_z = i\sqrt{\left(\sqrt{k^2 - k_{y_1}^2} + \sqrt{k^2 - k_{y_2}^2}\right)^2 - (k_{x_1} + is_3)^2}$$

where $s_3$ is defined by:

[Math. 18]

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

where (x, y, z) represents a position to be imaged, $k_{x1}$, $k_{y1}$, and $k_{y2}$ represent wave numbers of the scattering field function with respect to $x_1$, $y_1$, and $y_2$, $d_j$ represents the distance, and $$\Phi_j(k_x, k_{y_1}, k_{y_2}, k) \qquad [\text{Math. 19}]$$

represents the measurement data that has undergone Fourier transform with respect to $x_1$, $y_1$, and $y_2$.

11. The imaging device according to claim 2,
wherein, when a dielectric constant that corresponds to the reflectance in the region has frequency dependence, the information processing circuit derives, as the imaging function:

[Math. 20]

$$\rho(x, y, z) = \int_0^\infty \lim_{\substack{x_2 \to x_1 = x \\ y_2 \to y_1 = y}} \varphi(x_1, y_1, x_2, y_2, z, k)d\omega$$

$$= \frac{1}{(2\pi)^3} \int_0^\infty d\omega \int_{-\infty}^\infty \int_{-\infty}^\infty \int_{-\infty}^\infty e^{-i(k_x x + k_{y_1} y + k_{y_2} y)}$$

$$e^{s_4 z} e^{\frac{idk_x \sqrt{k^2 - k_{y_2}^2}}{\sqrt{k^2 - k_{y_1}^2} + \sqrt{k^2 - k_{y_2}^2}}}$$

$$\Phi(k_x, k_{y_1}, k_{y_2}, k) dk_x dk_{y_1} dk_{y_2}$$

$$= \frac{1}{(2\pi)^3} \int_0^\infty \int_{-\infty}^\infty \int_{-\infty}^\infty \int_{-\infty}^\infty e^{-i(k_x x + k_{y_1} y + k_{y_2} y)}$$

$$e^{ik_z z} e^{\frac{idk_x \sqrt{k^2 - k_{y_2}^2}}{\sqrt{k^2 - k_{y_1}^2} + \sqrt{k^2 - k_{y_2}^2}}}$$

$$\Phi(k_x, k_{y_1}, k_{y_2}, k)\left(\frac{d\omega}{dk}\right)\left(\frac{dk}{dk_z}\right)dk_x dk_{y_1} dk_{y_2} dk_z$$

where $k_x$, $k_z$, $k$, $dk/dk_z$, $d\omega/dk$, and $s_4$ are defined by:

[Math. 21]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z \sqrt{k^2 - k_{y_1}^2} \sqrt{k^2 - k_{y_2}^2}}{k(k_x^2 + k_z^2)}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

$$s_4 = ik_z = i\sqrt{\left(\sqrt{k^2 - k_{y_1}^2} + \sqrt{k^2 - k_{y_2}^2}\right)^2 - (k_{x_1} + is_3)^2}$$

where $s_3$ is defined by:

[Math. 22]

$$s_3 = \frac{-ik_{x_1}\sqrt{k^2 - k_{y_2}^2}}{\sqrt{k^2 - k_{y_1}^2}} = \frac{-ik_x \sqrt{k^2 - k_{y_2}^2}}{\sqrt{k^2 - k_{y_1}^2} + \sqrt{k^2 - k_{y_2}^2}}$$

where (x, y, z) represents a position to be imaged, $k_{x1}$, $k_{y1}$, and $k_{y2}$ represent wave numbers of the scattering field function with respect to $x_1$, $y_1$, and $y_2$, d represents the distance, ω represents are angular frequency of the wave, $c_0$ represents a velocity of propagation of the wave in vacuum, a, b, and α represent parameters relating to Debye's relaxation, and $$\tilde{\Phi}(k_x, k_{y_1}, k_{y_2}, k) \qquad [\text{Math. 23}]$$

represents the measurement data that has undergone Fourier transform with respect to $x_1$, $y_1$, and $y_2$.

12. The imaging device according to claim 1,
wherein the information processing circuit derives the scattering field function in accordance with the measurement data and the distance and derives the imaging function in accordance with the scattering field function, and
the scattering field function is a function expressed by:

[Math. 24]

$$\varphi(x_1, y_1, x_2, y_2, z_1, z_2, k) = \int\int_D \frac{e^{ik\rho_1}}{\rho_1} \frac{e^{ik\rho_2}}{\rho_2} \varepsilon(\xi, \eta, \zeta) d\xi d\eta d\zeta$$

where $\rho_1$ and $\rho_2$ are defined by:

[Math. 25]

$$\rho_1 = \sqrt{(x_1 - \xi)^2 + (y_1 - \eta)^2 + (z_1 - \zeta)^2}$$

$$\rho_2 = \sqrt{(x_2 - \xi)^2 + (y_2 - \eta)^2 + (z_2 - \zeta)^2}$$

where $(x_1, y_1, z_1)$ represents a transmission position of the wave, $(x_2, y_2, z_2)$ represents a reception position of the wave, k represents a wave number of the wave, D represents the region, $(\xi, \eta, \zeta)$ corresponds to a reflecting position of the wave, and ε corresponds to unknown reflectance at the reflecting position.

13. The imaging device according to claim 12,
wherein the information processing circuit derives the scattering field function by solving an equation satisfied by the scattering field function, and
the equation is expressed by:

[Math. 26]

$$\{\Delta_6 - 2(ik)^2\}\varphi(x_1, y_1, x_2, y_2, z_1, z_2, k) = 0$$

where $\Delta_6$ is defined by:

[Math. 27]

$$\Delta_6 = \partial_{x_1}^2 + \partial_{x_2}^2 + \partial_{y_1}^2 + \partial_{y_2}^2 + \partial_{z_1}^2 + \partial_{z_2}^2.$$

14. The imaging device according to claim 12, wherein the imaging function is expressed by:

[Math. 28]

$$\rho(x, y, z) = \int_0^\infty \varphi(x, y, x, y, z, z, k)dk$$

where (x, y, z) represents a position to be imaged.

15. The imaging device according to claim 12, wherein the information processing circuit derives, as the scattering field function:

[Math. 29]

$$\varphi(x_1, y_1, x_2, y_2, z_1, z_2, k) =$$

$$\frac{1}{(2\pi)^3} \int_{-\infty}^{\infty}\int_{-\infty}^{\infty}\int_{-\infty}^{\infty} e^{-i(k_{x_1}x_1 + k_{y_1}y_1 + k_{y_2}y_2)} \sum_{I,J}\{\Phi(x_I, y_I, y_J, z_I, z_J, k) \cdot$$

$$e^{i(k_x x_I + k_{y_1} y_I + k_{y_2} y_J)} e^{-s_3 d} e^{-s_4 z_I} e^{-s_5 z_J}\}$$

$$e^{s_3 x_2} e^{s_4 z_1} e^{s_5 z_2} \frac{d(k_x + is_3)}{dk_{x_1}} dk_{x_1} dk_{y_1} dk_{y_2}$$

where $k_x$, $s_3$, $s_4$, and $s_5$ are defined by:

[Math. 30]

$$k_x = k_{x_1} + is_3$$

$$s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$$

$$s_4 = \frac{i\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

$$s_5 = \frac{i\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$$

where $k_{x1}$, $k_{y1}$, and $k_{y2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

16. The imaging device according to claim 12, wherein the information processing circuit derives, as the imaging function:

[Math. 31]

$$\rho(x, y, z) = \int_0^\infty \varphi(x, y, x, y, z, z, k)dk$$

$$= \frac{1}{(2\pi)^3}\int_0^\infty dk \int_{-\infty}^{\infty}\int_{-\infty}^{\infty}\int_{-\infty}^{\infty}$$

$$e^{-i(k_x x + k_{y_1} y_1 + k_{y_2} y_2)} e^{-s_3 d} e^{ik_z z}$$

$$\sum_{I,J}\{\Phi(x_I, y_I, y_J, z_I, z_J, k) \cdot$$

$$e^{i(k_x x_I + k_{y_1} y_I + k_{y_2} y_J)} e^{-s_4 z_I} e^{-s_5 z_J}\} dk_x dk_{y_1} dk_{y_2}$$

$$= \frac{1}{(2\pi)^3}\int_0^\infty\int_{-\infty}^{\infty}\int_{-\infty}^{\infty}\int_{-\infty}^{\infty}$$

$$e^{-i(k_x x + k_{y_1} y_1 + k_{y_2} y_2)} e^{-s_3 d} e^{ik_z z}$$

$$\sum_{I,J}\{\Phi(x_I, y_I, y_J, z_I, z_J, k) \cdot$$

$$e^{i(k_x x_I + k_{y_1} y_I + k_{y_2} y_J)} e^{-s_4 z_I} e^{-s_5 z_J}\}$$

$$\left(\frac{dk}{dk_z}\right) dk_x dk_{y_1} dk_{y_2} dk_z$$

where $k_x$, $k_z$, $k$, $dk/dk_z$, $s_3$, $s_4$, and $s_5$ are defined by:

[Math. 32]

$$k_x = k_{x_1} + is_3$$

$$k_z = \sqrt{\left(\sqrt{k^2 - k_{y_1}^2} + \sqrt{k^2 - k_{y_2}^2}\right)^2 - k_x^2}$$

$$k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$$

$$\frac{dk}{dk_z} = \frac{k_z\left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$s_3 = \frac{-ik_{x_1}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

where (x, y, z) represents a position to be imaged, $k_{x1}$, $k_{y1}$, and $k_{y2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

17. The imaging device according to claim 12, comprising:
 a plurality of transmitter rows as the transmitter row;
 a plurality of receiver rows as the receiver row; or
 a plurality of transmitter rows and a plurality of receiver rows as the transmitter row and the receiver row.

18. The imaging device according to claim 17, wherein the information processing circuit derives, as the scattering field function:

[Math. 33]

$\varphi(x_1, y_1, x_2, y_2, z_1, z_2, k) =$ $\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} \sum_{I,J} \{\Phi(x_I, y_I, y_J, z_I, z_J, k) \cdot$ $e^{i(k_x x_I + k_{y_1} y_I + k_{y_2} y_J)} e^{-s_3 d} e^{-s_4 z_I} e^{-s_5 z_J}\}$ $e^{s_3 x_2} e^{s_4 z_1} e^{s_5 z_2} \frac{d(k_x + is_3)}{dk_{x_1}} dk_{x_1} dk_{y_1} dk_{y_2}$ where $k_x$, $s_3$, $s_4$, and $s_5$ are defined by:

[Math. 34]

$k_x = k_{x_1} + is_3$ $s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$ $s_4 = \frac{i\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$ $s_5 = \frac{i\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$ where $k_{x_1}$, $k_{y_1}$, and $k_{y_2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

19. The imaging device according to claim 17,
wherein the information processing circuit derives the imaging function by merging of a plurality of scattering field functions that correspond to a plurality of combinations relating to the transmitter row and the receiver row, and
each of the plurality of scattering field functions corresponds to the scattering field function and is expressed by:

[Math. 35]

$\varphi(x_1, y_1, x_2, y_2, z_1, z_2, k) =$ $\frac{1}{(2\pi)^3} \int_{-\infty}^{\infty}\int_{-\infty}^{\infty}\int_{-\infty}^{\infty} e^{-i(k_{x_1}x_1+k_{y_1}y_1+k_{y_2}y_2)} \sum_{I,J} \{\Phi(x_1, y_1, y_J, z_I, z_J, k) \cdot$ $e^{i(k_x x_I + k_{y_1} y_I + k_{y_2} y_J)} e^{-s_3 d} e^{-s_4 z_I} e^{-s_5 z_J}\}$ $e^{s_3 x_2} e^{s_4 z_1} e^{s_5 z_2} \frac{d(k_x + is_3)}{dk_{x_1}} dk_{x_1} dk_{y_1} dk_{y_2}$ where $k_x$, $s_3$, $s_4$, and $s_5$ are defined by:

[Math. 36]

$k_x = k_{x_1} + is_3$ $s_3 = \frac{-ik_{x_1}\sqrt{k^2 - k_{y_2}^2}}{\sqrt{k^2 - k_{y_1}^2}} = \frac{-ik_x\sqrt{k^2 - k_{y_2}^2}}{\sqrt{k^2 - k_{y_1}^2} + \sqrt{k^2 - k_{y_2}^2}}$ $s_4 = \frac{i\sqrt{k^2 - k_{y_1}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$ $s_5 = \frac{i\sqrt{k^2 - k_{y_2}^2}\sqrt{\left(\sqrt{k^2 - k_{y_1}^2} + \sqrt{k^2 - k_{y_2}^2}\right)^2 - k_x^2}}{\sqrt{k^2 - k_{y_1}^2} + \sqrt{k^2 - k_{y_2}^2}}$ where $k_{x_1}$, $k_{y_1}$, and $k_{y_2}$ represent wave numbers of the scattering field function with respect to $x_1$, $y_1$, and $y_2$, d represents the distance, and $\Phi(x_I, y_I, y_J, z_I, z_J, k)$ represents the measurement data when the transmission position is located at $(x_I, y_I, z_I)$ and the reception position is located at $(x_I+d, y_J, z_J)$.

20. The imaging device according to claim 12,
wherein, when a dielectric constant that corresponds to the reflectance in the region has frequency dependence, the information processing circuit derives, as the imaging function:

[Math. 37]

$\rho(x, y, z) = \int_0^\infty \varphi(x, y, x, y, z, z, k) d\omega$ $= \frac{1}{(2\pi)^3} \int_0^\infty d\omega \int_{-\infty}^{\infty}\int_{-\infty}^{\infty}\int_{-\infty}^{\infty}$ $e^{i(k_x x + k_{y_1} y_1 + k_{y_2} y_2)} e^{-s_3 d} e^{ik_z z} \sum_{I,J}$ $\{\Phi(x_I, y_I, y_J, z_I, z_J, k) \cdot$ $e^{i(k_x x_I + k_{y_1} y_I + k_{y_2} y_J)} e^{-s_4 z_I} e^{-s_5 z_J}\} dk_x dk_{y_1} dk_{y_2}$ $= \frac{1}{(2\pi)^3} \int_0^\infty \int_{-\infty}^{\infty}\int_{-\infty}^{\infty}\int_{-\infty}^{\infty} e^{-i(k_x x + k_{y_1} y_1 + k_{y_2} y_2)}$ $e^{-s_3 d} e^{ik_z z} \sum_{I,J} \{\Phi(x_I, y_I, y_J, z_I, z_J, k) \cdot$ $e^{i(k_x x_I + k_{y_1} y_I + k_{y_2} y_J)} e^{-s_4 z_I} e^{-s_5 z_J}\} \left(\frac{d\omega}{dk}\right)\left(\frac{dk}{dk_z}\right)$ $dk_x dk_{y_1} dk_{y_2} dk_z$ where $k_x$, $k_z$, k, $dk/dk_z$, $d\omega/dk$, $s_3$, $s_4$, and $s_5$ are defined by:

[Math. 38]

$k_x = k_{x_1} + is_3$ $k_z = \sqrt{\left(\sqrt{k^2 - k_{y_1}^2} + \sqrt{k^2 - k_{y_2}^2}\right)^2 - k_x^2}$ $k = \frac{1}{2}\sqrt{k_x^2 + k_z^2 + 2(k_{y_1}^2 + k_{y_2}^2) + \frac{(k_{y_1}^2 - k_{y_2}^2)^2}{k_x^2 + k_z^2}}$ -continued $$\frac{dk}{dk_z} = \frac{k_z\left\{1 - \frac{(k_{y_1}^2 - k_{y_2}^2)^2}{(k_x^2 + k_z^2)^2}\right\}}{2\sqrt{k_x^2 + k_z^2 + 2(k_{y_1}^2 + k_{y_2}^2) + \frac{(k_{y_1}^2 - k_{y_2}^2)^2}{k_x^2 + k_z^2}}}$$

$$\frac{d\omega}{dk} = \frac{c_0^2 k + \alpha c_0^2 \omega^2 k}{(a+b)\omega + 2a\alpha\omega^2 - \alpha c_0^2 \omega k^2}$$

$$s_3 = \frac{-ik_{x_1}\sqrt{k^2 - k_{y_2}^2}}{\sqrt{k^2 - k_{y_1}^2}} = \frac{-ik_x\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

$$s_4 = \frac{ik_z\left(\sqrt{k_x^2 + k_z^2} + \frac{k_{y_2}^2 - k_{y_1}^2}{\sqrt{k_x^2 + k_z^2}}\right)}{2\sqrt{k_x^2 + k_z^2}}$$

$$s_5 = \frac{ik_z\left(\sqrt{k_x^2 + k_z^2} - \frac{k_{y_2}^2 - k_{y_1}^2}{\sqrt{k_x^2 + k_z^2}}\right)}{2\sqrt{k_x^2 + k_z^2}}$$

where (x, y, z) represents a position to be imaged, $k_{x1}$, $k_{y1}$, and $k_{y2}$ represent wave numbers of the scattering field function with respect to $x_1$, $y_1$, and $y_2$, d represents the distance, ω represents an angular frequency of the wave, $c_0$ represents a velocity of propagation of the wave in vacuum, a, b, and a represent parameters relating to Debye's relaxation, and $$\tilde{\Phi}(k_x, k_{y_1}, k_{y_2}, k) \qquad \text{[Math. 39]}$$

represents the measurement data that has undergone Fourier transform with respect to $x_1$, $y_1$, and $y_2$.

21. An imaging method comprising:
causing a plurality of transmitters included in a transmitter row and aligned in a straight line to transmit a wave to a region to be measured;
causing a plurality of receivers included in a receiver row provided at an interval from the transmitter row to receive the wave from the region, the plurality of receivers being aligned in a different straight line that is parallel to the straight line along which the plurality of transmitters are aligned; and
deriving an imaging function in accordance with measurement data and a distance and using the imaging function to image a structure of a scatterer included in an object that is present in the region, the imaging function corresponding to a scattering field function relating to scattering of the wave, the measurement data being obtained by all or some combinations of the plurality of transmitters and the plurality of receivers, the distance being a distance between the straight line along which the plurality of transmitters are aligned and the different straight line along which the plurality of receivers are aligned.

\* \* \* \* \*